US012254870B2

(12) United States Patent
Van Dyke et al.

(10) Patent No.: US 12,254,870 B2
(45) Date of Patent: Mar. 18, 2025

(54) ACOUSTIC-BASED LINGUISTICALLY-DRIVEN AUTOMATED TEXT FORMATTING

(71) Applicant: Cascade Reading, Inc., Edina, MN (US)

(72) Inventors: Julie A. Van Dyke, New Haven, CT (US); Michael Gorman, Edina, MN (US); Mark Lacek, Minneapolis, MN (US)

(73) Assignee: Cascade Reading, Inc., Edina, MN (US)

( * ) Notice: Subject to any disclaimer, the term of this patent is extended or adjusted under 35 U.S.C. 154(b) by 0 days.

(21) Appl. No.: 18/033,243

(22) PCT Filed: Oct. 6, 2022

(86) PCT No.: PCT/US2022/045924
§ 371 (c)(1),
(2) Date: Apr. 21, 2023

(87) PCT Pub. No.: WO2023/059818
PCT Pub. Date: Apr. 13, 2023

(65) Prior Publication Data
US 2024/0257802 A1    Aug. 1, 2024

Related U.S. Application Data

(60) Provisional application No. 63/262,166, filed on Oct. 6, 2021.

(51) Int. Cl.
G06F 40/103      (2020.01)
G10L 13/02       (2013.01)
(Continued)

(52) U.S. Cl.
CPC .......... G10L 15/1822 (2013.01); G10L 13/02 (2013.01); G10L 15/02 (2013.01);
(Continued)

(58) Field of Classification Search
CPC .... G06F 40/103; G06F 40/106; G06F 40/211; G06F 40/295; G06F 40/30; G06F 40/193;
(Continued)

(56) References Cited

U.S. PATENT DOCUMENTS 4,889,422 A    12/1989  Pavlidis
5,778,402 A     7/1998  Gipson
(Continued)

FOREIGN PATENT DOCUMENTS

AU    2022255037 B2    12/2023
CN      112686051 A     4/2021
(Continued)

OTHER PUBLICATIONS

"U.S. Appl. No. 17/233,339, Examiner Interview Summary mailed Aug. 20, 2021", 3 pgs.
(Continued)

Primary Examiner — Jakieda R Jackson
(74) Attorney, Agent, or Firm — Schwegman Lundberg & Woessner, P.A.

(57) ABSTRACT

Systems and techniques for acoustic-based linguistically-driven automated text formatting of acoustic input are described herein. An audio sample may be obtained that includes multiple words from human speech. The audio sample may be processed to determine a linguistic relationship of the words from the acoustic properties of the words. Based on the determined linguistic relationships, data such as an acoustical language model is generated to enable an arrangement of the words into a cascade format (e.g., a cascade format that establishes horizontal displacement and (Continued)

vertical displacement among the multiple words). A cascaded text output may be provided from the acoustical language model or other types of related data.

25 Claims, 44 Drawing Sheets

(51) Int. Cl.
*G10L 15/02* (2006.01)
*G10L 15/05* (2013.01)
*G10L 15/18* (2013.01)
*G10L 25/90* (2013.01)
*G10L 25/93* (2013.01)

(52) U.S. Cl.
CPC .............. *G10L 15/05* (2013.01); *G10L 25/90* (2013.01); *G10L 25/93* (2013.01)

(58) Field of Classification Search
CPC ..... G06F 40/205; G10L 15/26; G10L 15/063; G10L 25/90
See application file for complete search history.

(56) References Cited

U.S. PATENT DOCUMENTS

| | | | |
|---|---|---|---|
| 5,802,533 A | 9/1998 | Walker | |
| 6,088,711 A | 7/2000 | Fein et al. | |
| 6,279,017 B1 | 8/2001 | Walker | |
| 6,568,939 B1 | 5/2003 | Edgar | |
| 7,036,075 B2 | 4/2006 | Walker | |
| 7,069,508 B1 | 6/2006 | Bever et al. | |
| 7,346,489 B1 | 3/2008 | Bever et al. | |
| 7,743,324 B1 | 6/2010 | Bever et al. | |
| 7,765,471 B2* | 7/2010 | Walker | G06F 40/103 715/245 |
| 7,823,061 B2 | 10/2010 | Chan | |
| 7,861,163 B2 | 12/2010 | Walker | |
| 8,019,590 B1 | 9/2011 | Kinder | |
| 8,190,419 B1 | 5/2012 | Kinder | |
| 8,200,487 B2 | 6/2012 | Peters et al. | |
| 8,209,601 B2 | 6/2012 | Bever et al. | |
| 8,306,356 B1 | 11/2012 | Bever et al. | |
| 8,332,221 B2 | 12/2012 | Peters et al. | |
| 8,418,057 B2 | 4/2013 | Knight et al. | |
| 8,442,814 B2 | 5/2013 | Ceusters et al. | |
| 8,731,905 B1 | 5/2014 | Tsang et al. | |
| 8,918,718 B2 | 12/2014 | Burgess | |
| 9,026,907 B2 | 5/2015 | Lum | |
| 9,069,731 B2 | 6/2015 | Stern et al. | |
| 9,128,906 B2 | 9/2015 | Peters et al. | |
| 9,292,494 B2 | 3/2016 | Ceusters et al. | |
| 9,378,201 B2 | 6/2016 | Kinder | |
| 9,390,080 B2 | 7/2016 | Walker | |
| 9,430,555 B2 | 8/2016 | Duncan et al. | |
| 9,478,146 B2 | 10/2016 | Skinner et al. | |
| 9,529,795 B2 | 12/2016 | Kondadadi et al. | |
| 9,672,788 B2 | 6/2017 | Rosen et al. | |
| 9,916,295 B1 | 3/2018 | Crawford | |
| 9,940,317 B2 | 4/2018 | Walker | |
| 9,953,026 B2 | 4/2018 | Kinder | |
| 10,062,295 B2 | 8/2018 | Puvanachandran et al. | |
| 10,102,182 B2 | 10/2018 | Lum | |
| 10,180,936 B2 | 1/2019 | Mcclintock et al. | |
| 10,303,742 B2 | 5/2019 | Joshi | |
| 10,311,135 B1 | 6/2019 | Yang | |
| 10,515,138 B2 | 12/2019 | Walker | |
| 10,650,089 B1 | 5/2020 | Walker | |
| 11,170,154 B1 | 11/2021 | Van Dyke et al. | |
| 11,200,413 B2* | 12/2021 | Burdick | G06F 40/284 |
| 11,734,491 B2 | 8/2023 | Van Dyke et al. | |
| 12,086,532 B2 | 9/2024 | Gorman et al. | |
| 2003/0093275 A1* | 5/2003 | Polanyi | G09B 17/003 704/E15.045 |
| 2006/0129922 A1 | 6/2006 | Walker | |
| 2008/0222518 A1* | 9/2008 | Walker | G09B 17/04 715/256 |
| 2010/0128042 A1 | 5/2010 | Confrey et al. | |
| 2010/0332217 A1 | 12/2010 | Wintner et al. | |
| 2012/0303371 A1* | 11/2012 | Labsky | G10L 15/14 704/E13.011 |
| 2013/0035961 A1* | 2/2013 | Yegnanarayanan | G16H 10/60 705/3 |
| 2013/0041685 A1* | 2/2013 | Yegnanarayanan | G16H 50/20 705/2 |
| 2013/0297347 A1* | 11/2013 | Cardoza | G06F 16/36 705/3 |
| 2015/0213634 A1 | 7/2015 | Karmarkar et al. | |
| 2015/0262580 A1 | 9/2015 | Bisani et al. | |
| 2015/0286618 A1 | 10/2015 | Walker | |
| 2015/0348538 A1 | 12/2015 | Donaldson | |
| 2016/0062982 A1 | 3/2016 | Wroczynski et al. | |
| 2016/0111016 A1 | 4/2016 | Govindaraj et al. | |
| 2016/0188558 A1 | 6/2016 | Shikawa et al. | |
| 2017/0046311 A1 | 2/2017 | Walker | |
| 2017/0097987 A1 | 4/2017 | Bao et al. | |
| 2017/0097988 A1 | 4/2017 | Bao et al. | |
| 2017/0358238 A1 | 12/2017 | Casutt | |
| 2018/0096625 A1 | 4/2018 | Kochura et al. | |
| 2018/0253280 A1* | 9/2018 | Kawahara | G06F 3/167 |
| 2019/0019509 A1* | 1/2019 | Lee | G10L 15/22 |
| 2019/0087239 A1 | 3/2019 | Adibowo | |
| 2019/0236085 A1* | 8/2019 | Galitsky | G06F 16/322 |
| 2020/0097502 A1* | 3/2020 | Trim | G06F 16/24578 |
| 2020/0243076 A1* | 7/2020 | Kim | G10L 15/1822 |
| 2020/0286463 A1* | 9/2020 | Galitsky | G06F 16/35 |
| 2021/0019364 A1 | 1/2021 | Govindjee et al. | |
| 2021/0056263 A1 | 2/2021 | Xia et al. | |
| 2021/0056952 A1* | 2/2021 | Van Der Ploeg | G10H 1/0066 |
| 2021/0073302 A1* | 3/2021 | Srinivasaraghavan | G06F 40/205 |
| 2021/0173893 A1* | 6/2021 | Luo | G06F 17/16 |
| 2021/0200965 A1 | 7/2021 | Yerli | |
| 2021/0225358 A1* | 7/2021 | Monge Alvarez | G10L 15/187 |
| 2021/0295829 A1* | 9/2021 | Noel | G10L 15/04 |
| 2021/0327415 A1* | 10/2021 | Park | G10L 15/16 |
| 2022/0051665 A1* | 2/2022 | Bade | G06N 7/01 |
| 2022/0059077 A1* | 2/2022 | Thomson | G10L 15/065 |
| 2022/0068279 A1* | 3/2022 | Embar | G06F 40/205 |
| 2022/0115018 A1* | 4/2022 | Desserrey | G10L 15/22 |
| 2022/0335203 A1 | 10/2022 | Van Dyke et al. | |
| 2023/0123328 A1 | 4/2023 | Gorman et al. | |
| 2023/0315558 A1 | 10/2023 | Saxena et al. | |
| 2023/0351090 A1 | 11/2023 | Van Dyke et al. | |

FOREIGN PATENT DOCUMENTS

| | | |
|---|---|---|
| CN | 115769219 A | 3/2023 |
| CN | 117561516 A | 2/2024 |
| DE | 212021000356 U1 | 1/2023 |
| DE | 112022002081 T5 | 1/2024 |
| EP | 0917698 B1 | 7/2007 |
| IN | 202317076513 | 9/2024 |
| JP | H04348464 A | 12/1992 |
| JP | 2000516002 A | 11/2000 |
| JP | 2024511893 A | 3/2024 |
| JP | 7541422 B2 | 8/2024 |
| JP | 2024152832 | 10/2024 |
| KR | 20150107178 A | 9/2015 |
| KR | 20160115566 A | 10/2016 |
| WO | WO-2017058298 A1 | 4/2017 |
| WO | WO-2021207422 A1 | 10/2021 |
| WO | WO-2022217087 A1 | 10/2022 |
| WO | WO-2023059818 A1 | 4/2023 |

OTHER PUBLICATIONS

"U.S. Appl. No. 17/233,339, Non Final Office Action mailed Jun. 24, 2021", 11 pages.

"U.S. Appl. No. 17/233,339, Notice of Allowance mailed Sep. 17, 2021", 5 pgs.

(56) References Cited

OTHER PUBLICATIONS

"U.S. Appl. No. 17/233,339, Response filed Sep. 3, 2021 to Non Final Office Action mailed Jun. 24, 2021", 19 pages.
"U.S. Appl. No. 17/453,763, Non Final Office Action mailed Dec. 19, 2022", 7 pgs.
"U.S. Appl. No. 17/453,763, Notice of Allowance mailed Apr. 3, 2023", 9 pgs.
"U.S. Appl. No. 17/453,763, Preliminary Amendment filed Feb. 23, 2022", 9 pgs.
"U.S. Appl. No. 17/453,763, Response filed Mar. 20, 2023 to Non Final Office Action mailed Dec. 19, 2022", 9 pgs.
"U.S. Appl. No. 17/917,171 Preliminary Amendment filed Oct. 5, 2022", 6 pgs.
"U.S. Appl. No. 17/917,171, Non Final Office Action mailed Mar. 9, 2023", 51 pgs.
"U.S. Appl. No. 17/917,171, Response filed Jun. 9, 2023 to Non Final Office Action mailed Mar. 9, 2023", 10 pgs.
"International Application Serial No. PCT/US2021/026270, International Preliminary Report on Patentability mailed Oct. 20, 2022", 9 pgs.
"International Application Serial No. PCT/US2021/026270, International Search Report mailed Aug. 2, 2021", 3 pgs.
"International Application Serial No. PCT/US2021/026270, Written Opinion mailed Aug. 2, 2021", 7 pgs.
"International Application Serial No. PCT/US2022/024070, International Search Report mailed Jul. 25, 2022", 5 pgs.
"International Application Serial No. PCT/US2022/024070, Written Opinion mailed Jul. 25, 2022", 4 pgs.
"Software—Stanford Parser", The Stanford Natural Language Processing Group, [Online]. Retrieved from the Internet: <URL: https://nlp.stanford.edu/software/lex-parser.shtml>, (Accessed May 30, 2023), 14 pgs.
"Universal Dependency Relations", UD version 2, [Online]. Retrieved from the Internet: <URL: https://universaldependencies.org/u/dep/index.html>, (Accessed May 30, 2023), 3 pgs.
Arlot, Sylvain, et al., "A survey of cross-validation procedures for model selection", Statistics Surveys, vol. 4, (2010), 40-79.
Arsi, Hiba, et al., "Using Machine Learning Algorithms for Breast Cancer Risk Prediction and Diagnosis", Procedia Computer Science, 83, (2016), 1064-1069.
Beckman, Mary E, "The Parsing of Prosody", Language and Cognitive Processes, 11:1-2, (1996), 17-67.
Bone, Daniel, et al., "Use of machine learning to improve autism screening and diagnostic instruments: effectiveness, efficiency, and multi-instrument fusion", Journal of Child Psychology and Psychiatry, vol. 57, Issue 8, pp. 927-937, (2016), 24 pgs.
Breen, Mara, et al., "Acoustic correlates of information structure", Language and Cognitive Processes, 25:7, [Online]. Retrieved from the Internet: <URL: http://dx.doi.org/10.1080/01690965.2010.504378>, (2010), 1044-1098.
Chomsky, Carol, "Reading, Writing and Phonology", Harvard Educational Review, 40(2), (1970), 287-309.
Cooper, William, et al., "Acoustical aspects of contrastive stress in question-answer contexts", J. Acoust. Soc. Am., 77(6), (1985), 2142-2156.
Cooper, William, et al., "Syntax and Speech", Cognitive Science Series, vol. 3. Harvard University Press, [Online]. Retrieved from the Internet: <URL: https://www.hup.harvard.edu/catalog.php?isbn=9780674283947>, (1980), 288 pgs.
Craven, Timothy C., "Graphic display of larger sentence dependency structures", Journal of the American Society for Information Science 42, No. 5, (1991), 323-331.
Eady, Stephen, et al., "Speech intonation and focus location in matched statements and questions", J. Acoust. Soc. Am., 80(2), (1986), 402-415.
Fougeron, Cecile, et al., "Articulatory strengthening at edges of prosodic domains", J. Acoust. Soc. Am., vol. 101, No. 6,, (1997), 3728-3740.
Fry, D B, "Duration and Intensity as Physical Correlates of Linguistic Stress", J. Acoust. Soc. Am., 27(4), (Jul. 1955), 765-768.

Guyon, Isabelle, et al., "Gene Selection for Cancer Classification using Support Vector Machines", Machine Learning, vol. 46, Issue 1-3, [Online]. Retrieved from the Internet: <URL: https://doi.org/10.1023/A:1012487302797>, (Mar. 11, 2002), 389-422.
Hoeks, John, et al., "Processing Coordinated Structures in Context: The Effect of Topic-Structure on Ambiguity Resolution", Journal of Memory and Language, 46, (2002), 99-119.
Huang, C, et al., "An assessment of support vector machines for land cover classification", International Journal of Remote Sensing, vol. 23, Issue 4, (2002), 725-749.
Jackendoff, Ray, "", X Syntax: A study of Phrase Structure, 248 pages, Cambridge, Mass. MIT Press, (1977), 132 pgs.
James, Gareth, et al., "Chapter 5 Resampling Methods", An Introduction to Statistical Learning: with Applications in R, Springer Texts in Statistics, (2013), 175-201.
Kaan, Edith, et al., "L2 Prediction during complex sentence processing", J Cult Cogn Sci., 3, [Online]. Retrieved from the Internet: <URL: https://doi.org/10.1007/s41809-019-00038-0>, (2019), 203-216.
Kerkhofs, Roel, et al., "Discourse, Syntax, and Prosody: The Brain Reveals an Immediate Interaction", Journal of Cognitive Neuroscience, 19:9. Massachusetts Institute of Technology, (2007), 1421-1434.
Klatt, Dennis, "Vowel lengthening is syntactically determined in a connected discourse", Journal of Phonetics, 3, (1975), 129-140.
Kochanski, G, et al., "Loudness predicts prominence: Fundamental frequency lends little", J. Acoust. Soc. Am., 118(2), (Aug. 2005), 1038-1054.
Lehiste, Iise, "Rhythmic units and syntactic units in production and perception", J. Acoustic. Soc. Am., 54(5), (1973), 1228-1234.
Lehiste, Iise, et al., "Role of duration in disambiguating syntactically ambiguous sentences", J. Acoust. Soc. Am., 60(5), (Nov. 1976), 1199-1202.
Lehiste, Ilse, "Influence of fundamental frequency pattern on the perception of duration", Journal of Phonetics, 4, (1976), 113-117.
Lieberman, Philip, "Some Acoustic Correlates of Word Stress in American English", J. Acoust. Soc. Am.,32(4), (Apr. 1960), 451-454.
Miller, Justin, et al., "A Longitudinal Study of the Development of Reading Prosody as a Dimension of Oral Reading Fluency in Early Elementary School Children", Read Res Q., 43(4), pp. 336-354, (2008), 29 pgs.
Pierrehumbert, Janet, "The Phonology and Phonetics of English Intonation (Thesis)", MIT, (1980), 401 pgs.
Price, Patti, et al., "The Use of Prosody in Syntactic Disambiguation", (1991), 372-377.
Street, Lynn, "Acoustic determinants of phrase boundary perception", J. Acoust. Soc. Am., 64(6), (1978), 1582-1592.
Tate, Tamara, et al., "Visual-Syntactic Text Format: Improving Adolescent Literacy", Scientific Studies of Reading, 23(4), [Online]. Retrieved from the Internet: <URL: https://escholarship.org/uc/item/4vw2g0m6>, (2019), 19 pgs.
Turk, Alice, et al., "Multiple targets of phrase-final lengthening in American English words", Journal of Phonetics 35, (2007), 445-472.
Turk, Alice, et al., "The domain of accentual lengthening in American English", Journal of Phonetics, 25, (1997), 25-41.
Vapnik, Vladimir, "An Overview of Statistical Learning Theory", IEEE Transactions on Neural Networks, vol. 10, No. 5, (Sep. 1999), 988-999.
Walker, Randall, et al., "Live Ink®: Brain-Based Text Formatting Raises Standardized Reading Test Scores", National Educational Computing Conference, (2005), 35 pgs.
Walker, Randall C, et al., "Visual-syntactic text formatting: Theoretical basis and empirical evidence for impact on human reading", In IEEE International Professional Communication Conference, (2007), 1-14.
Walker, Stan, et al., "Visual-Syntactic Text Formatting: A New Method to Enhance Online Reading", Reading Online, ISSN, [Online] Retrieved from the internet: <http://www.liveink.com/VSTF_ReadingOnline_IRA_2005_Walker.pdf>, (May 2005), 1096-1232.

(56) References Cited

OTHER PUBLICATIONS

Warschauer, Mark, et al., "Transforming Digital Reading with Visual-Syntactic Text Formatting", Alt Call Journal ISSN vol. 7 No. 3, (Jun. 2011), 255-269.
Watson, Duane, et al., "The Role of Syntactic Obligatoriness in the Production of Intonational Boundaries.", Journal of Experimental Psychology: Learning, Memory, and Cognition, vol. 32, No. 5, [Online]. Retrieved from the Internet: <URL: http://tedlab.mit.edu/tedlab_website/researchpapers/Watson_et_al_2006_JEPLMC.pdf>, (2006), 1045-1056.
Wightman, Colin, et al., "Segmental durations in the vicinity of prosodic phrase boundaries", J. Acoust. Soc. Am., 91(3), (Mar. 1992), 1707-1717.
"Canadian Application Serial No. 3,214,349, Examiners Rule 86(2) Report mailed Nov. 2, 2023", 6 pgs.
"Korean Application Serial No. 10-2023-7038709, Voluntary Amendment Filed Nov. 9, 2023", w english claims, 29 pgs.
"U.S. Appl. No. 17/917,171, Non Final Office Action mailed Dec. 4, 2023", 74 pgs.
"Japanese Application Serial No. 2023-562214, Voluntary Amendment Filed Nov. 29, 2023", w english claims, 11 pgs.
"Remote Access to Natural Language Parsing and Enhanced Text Presentation Technology for improved Reading", Small Business Innovation Research (SBIR) and Small Business Technology Transfer (STTR) program, [Online] Retrieved from the internet:www.sbir.gov sbiresearch detail 348797, (2002), 2 pgs.
"U.S. Appl. No. 18/346,609, Third-Party Submission Under 37 CFR 1.290 mailed Dec. 31, 2023", 7 pgs.
"U.S. Appl. No. 17/917,171, Third-Party Submission Under 37 CFR 1.290, mailed Nov. 13, 2023", 6 pgs.
Chomsky, Noam, "Syntactic Structures", The Mouton Co. Publishers, The Hague, Netherlands. ISBN 90 279, (1957), 7 pgs.
Jablonkai, R Reka, "The Routledge Handbook of Corpora and English Language Teaching and Learning", Chapter 32, Section4; Visual Syntactic Text formatting and Syntactic Processing, Professor of Applied Linguistics and Asian Studies at Pennsylvania State University, J. Elllot Casal, postdoctoral scholar at Case Western Reserve University Department, (Jul. 28, 2022), 5 pgs.
Kuncoro, Adhiguna, "What Do Recurrent Neural Network Grammars Learn About Syntax?", arXiv: 1611.05774v2, (Jan. 10, 2017), 10 pgs.
Milekic, Slavoljub, "Using gaze actions to interact with a display", U.S. Pat. No. 7,561,143B1, Application granted. Independent Claims 1, 21, 22, (Jul. 14, 2009), 22 pgs.
Rayner, Keith, "The Role of Eye Movements in Learning to Head and Reading Disability", Remedial and Special Education, 6(6), [Online] Retrieved from the internet:https: doi.org 10.1177 074193258500600609, 8 pgs.
"International Application Serial No. PCT/US2022/045924, International Search Report mailed Jan. 26, 2023", 3 pgs.
"International Application Serial No. PCT/US2022/045924, Written Opinion mailed Jan. 26, 2023", 3 pgs.
"U.S. Appl. No. 17/453,763, Corrected Notice of Allowability mailed Jul. 27, 2023", 5 pgs.
"U.S. Appl. No. 17/917,171, Examiner Interview Summary mailed Aug. 9, 2023", 3 pgs.
"U.S. Appl. No. 17/917,171, Final Office Action mailed Jul. 13, 2023", 92 pgs.
"U.S. Appl. No. 17/917,171, Response filed Oct. 10, 2023 to Final Office Action mailed Jul. 13, 2023", 13 pgs.
"Canadian Application Serial No. 3,214,349, Voluntary Amendment Filed Oct. 5, 2023", 14 pgs.
"International Application Serial No. PCT/US2022/024070, International Preliminary Report on Patentability mailed Oct. 19, 2023", 6 pgs.
"U.S. Appl. No. 17/917,171, Corrected Notice of Allowability mailed Apr. 3, 2024", 2 pgs.
"U.S. Appl. No. 17/917,171, Examiner Interview Summary mailed Feb. 14, 2024", 2 pgs.
"U.S. Appl. No. 17/917,171, Notice of Allowance mailed Mar. 25, 2024", 7 pgs.
"U.S. Appl. No. 17/917,171, Notice of Allowance mailed Jul. 29, 2024", 5 pgs.
"U.S. Appl. No. 17/917,171, Response filed Feb. 29, 2024 to Non Final Office Action mailed Dec. 4, 2023", 15 pgs.
"U.S. Appl. No. 17/917,171, Supplemental Amendment filed Mar. 8, 2024", 10 pgs.
"U.S. Appl. No. 18/346,609, Preliminary Amendment filed Aug. 9, 2024", 9 pgs.
"Canadian Application Serial No. 3,214,349, Response filed Feb. 26, 2024 to Examiners Rule 86(2) Report mailed Nov. 2, 2023", 11 pgs.
"Chinese Application Serial No. 202280034092.8, Voluntary Amendment Filed May 28, 2024", w/ english claims, 14 pgs.
"International Application Serial No. PCT/US2022/045924, International Preliminary Report on Patentability mailed Apr. 18, 2024", 6 pgs.
"Israel Application Serial No. 307467, Office Action mailed Jun. 3, 2024", 7 pgs.
"Japanese Application Serial No. 2023-562214, Notification of Reasons for Rejection mailed May 14, 2024", W/English Translation, 6 pgs.
"Japanese Application Serial No. 2023-562214, Response filed Jun. 26, 2024 to Notification of Reasons for Rejection mailed May 14, 2024", w/ english claims, 11 pgs.
"Korean Application Serial No. 10-2023-7038709, Notice of Preliminary Rejection mailed Apr. 12, 2024", w/ English Translation, 16 pgs.
"Korean Application Serial No. 10-2023-7038709, Response filed Aug. 1, 2024 to Notice of Preliminary Rejection mailed Apr. 12, 2024", w/ english claims, 46 pgs.
Frey, Aline, et al., "Perceptual span, visual span, and visual attention span: Three potential ways to quantify limits on visual processing during reading", Visual Cognition, vol. 26, No. 6, (May 11, 2018), 412-429.
Gao, Wei, et al., "Visual-Syntactic Text Formatting: Developing EFL Learners' Reading Fluency Components", Journal of Psycholinguistic Research, 51, (2022), 707-727.
Ozaki, Sachiko, et al., "The effects of digital scaffolding on adolescent English reading in Japan: An experimental study on visual-syntactic text formatting", The Jalt Call Journal: Regular Papers, vol. 16, No. 3, (2020), 147-165.
Park, Youngmin, et al., "Scaffolding learning of language structures with visual-syntactic text formatting", British Journal of Educational Technology, vol. 0 No. 2018, [Online]. Retrieved from the Internet: <URL: https://escholarship.org/uc/item/6235t25b>, (Jul. 1, 2019), 1-17.
Reichle, Erik, et al., "The E-Z Reader model of eye-movement control in reading: Comparisons to other models", Behavioral and Brain Sciences, 26, (2003), 445-476.
Veldre, Aaron, et al., "Understanding the Visual Constraints on Lexical Processing: New Empirical and Simulation Results", Journal of Experimental Psychology: General, vol. 152, No. 3. American Psychological Association., (2023), 693-722.

\* cited by examiner

| Acoustic Analyzer | | | | | | | | |
|---|---|---|---|---|---|---|---|---|
| Time (s) | Words | Mean intensity (dB) | Intensity Min (dB) | Intensity Max (dB) | Mean Pitch (Hz) | Pitch Slope (+/-) | Pitch Min (Hz) | Pitch Max (Hz) |
| 1.5049-2.5377 | The Principal Noticed | 65.45 | 39.17 | 74.77 | 229.8 | -+ | 168.30 | 420.83 |
| 2.5386-2.7049 | <pause> | | | | | | | |
| 2.7049-3.3555 | That the Janitor | 52.1 | 38.7 | 69.9 | 190.2 | +-+ | 160.3 | 247.4 |
| 3.3555-3.7965 | Who Cleaned | 59.64 | 43.4 | 63.4 | 193.5 | - | 176.9 | 234.1 |
| 3.8037-4.3820 | In the Classroom | 59.82 | 42.6 | 65.2 | 167.6 | - | 154.7 | 182.0 |
| 4.3823-4.9097 | Every Night | 59.68 | 46.2 | 65.6 | 179.2 | -+ | 153.5 | 218.5 |
| 4.898-5.0543 | <Pause> | | | | | | | |
| 5.0543-5.7193 | Left Quickly | 57.89 | 32.3 | 65.01 | 221.5 | -+ | 145.5 | 272.2 |
| 5.7193-6.0446 | <Pause> | | | | | | | |
| 6.0519-7.3675 | After the Last Announcement | 55.59 | 23.85 | 65.35 | 146.5 | +-+ | 76.0 | 192.2 |

1100

1105

The principal
noticed
 that the janitor
  who cleaned
   in the classroom
  every night
 left quickly
  after the last announcement.

1110

Since the virus
  first appeared
   in late January,
William
has played down
 the risks
  of infection.

VERTICAL LINES FOR ILLUSTRATION AND ARE NOT PRESENTED AS OUTPUT.

*FIG. 11*

| Time (s) | Words | Mean Intensity (dB) | Intensity Min (dB) | Intensity Max (dB) | Mean Pitch (Hz) | Pitch Slope (+/-) | Pitch Min (Hz) | Pitch Max (Hz) |
|---|---|---|---|---|---|---|---|---|
| .9690-1.7846 | The Patient | 63.83 | 30.92 | 71.57 | 205.9 | -+ | 171.7 | 311.72 |
| 1.7890-1.9020 | <pause> | | | | | | | |
| 1.9024-3.0712 | Who the Girl Liked | 64.17 | 24.92 | 70.38 | 160.2 | -+-++- | 86.06 | 414.79 |
| 3.0712-3.3111 | <pause> | | | | | | | |
| 3.3155-4.2227 | Was Coming Today | 56.71 | 27.55 | 64.67 | 214.4 | +++ | 91.61 | 346.56 |
| 1.911-2.5522 | Who the Girl | 65.5 | 32.21 | 70.39 | 157.7 | -+-++ | 86.06 | 414.79 |
| 2.5522-3.0669 | Liked | 61.77 | 24.92 | 67.17 | 171.3 | -- | 162.97 | 190.52 |
| 3.2980-3.8650 | Was coming | 57.48 | 28.58 | 64.67 | 167.4 | ++ | 91.61 | 346.56 |
| 3.8650-4.2402 | Today | 54.61 | 26.20 | 61.07 | 318.7 | -+ | 297.46 | 334.55 |

2905
OBTAIN A TEXT PORTION FROM AN INTERFACE

2910
SEGMENT THE TEXT PORTION INTO A PLURALITY OF DEPENDENT SEGMENTS

2915
ENCODE THE PLURALITY OF DEPENDENT SEGMENTS ACCORDING TO CUING RULES DESCRIBING A HIERARCHICAL POSITION FOR EACH SEGMENT

2920
DISPLAY THE ENCODED PLURALITY OF DEPENDENT SEGMENTS ON A USER INTERFACE IN ACCORDANCE WITH USER PREFERENCES

┌─ 3005
    ┌───────────────────────────────────────────────────────────┐
    │  BUILD THE MODEL OF THE TEXT FROM ACOUSTIC DATA OBTAINED FROM │
    │  ACOUSTIC ANALYSIS AND FROM DEPENDENCY AND CONSTITUENCY DATA  │
    │            OBTAINED BY PARSING THE TEXT                    │
    └───────────────────────────────────────────────────────────┘
                                    │
                                    ▼
        ┌─ 3010
    ┌───────────────────────────────────────────────────────────┐
    │   GENERATE THE CASCADED TEXT DATA STRUCTURE ACCORDING TO   │
    │      CASCADE RULES APPLIED TO A MODEL OF THE TEXT          │
    └───────────────────────────────────────────────────────────┘
                                    │
                                    ▼
        ┌─ 3015
    ┌───────────────────────────────────────────────────────────┐
    │   DISPLAY THE SENTENCE OF TEXT IN RESPONSE TO A CASCADED TEXT │
    │                    DATA STRUCTURE                          │
    └───────────────────────────────────────────────────────────┘
```

*FIG. 30*

┌─ 3105
OBTAIN AUDIO OF A TEXT PORTION FROM AN INTERFACE

┌─ 3110
PROCESS THE AUDIO OF THE TEXT PORTION THROUGH NLP-SERVICES TO OBTAIN LINGUISTIC ENCODINGS AND ACOUSTIC ENCODINGS

┌─ 3115
APPLY ML CLASSIFIER TO THE LINGUISTIC ENCODINGS AND THE ACOUSTIC ENCODINGS TO DETERMINE CASCADE

┌─ 3120
DISPLAY THE CASCADE ON A USER INTERFACE IN ACCORDANCE WITH USER PREFERENCES

*FIG. 31*

ACOUSTIC-BASED LINGUISTICALLY-DRIVEN AUTOMATED TEXT FORMATTING

PRIORITY CLAIM

This application is a U.S. National Stage Filing under 35 U.S.C. 371 from International Application No. PCT/US2022/045924, filed Oct. 6, 2022, and published as WO 2023/059818 on Apr. 13, 2023, which application claims the benefit of priority to U.S. Provisional Patent Application No. 63/262,166, filed Oct. 6, 2021, which are incorporated by reference herein in their entirety.

TECHNICAL FIELD

Embodiments described herein generally relate to machine automated text formatting, driven by large-scale natural language processing (NLP) techniques derived from theoretical linguistics. More specifically, the current embodiments employ acoustic analyses of speech to derive prosodic information, which is combined with constituent and dependency parsing in a Language Model (LM). The said language model is used to produce cascaded text for the purposes of improving reading comprehension.

BACKGROUND

Standard text formatting entails presenting language in blocks, with little formatting beyond basic punctuation and line breaks or indentation indicating paragraphs. The alternative text format described herein presents text so that linguistic relationships are accentuated, providing support for comprehension processes which may increase accuracy or reduce reading time.

Cascaded text formatting transforms conventional block-shaped text into cascading patterns for the purpose of helping readers identify grammatical structure and related content. Text cascades make the syntax of a sentence visible. Syntactic phrases are the building blocks of a sentence, with particular phrases able to be embedded within other units of the same or different type. In this way, language can encode complicated relationships between objects or concepts. Skilled readers use their language experience to recognize "chunks" of text that constitute syntactic phrases, and interpret how these phrases relate to other phrases within a sentence. Hence, individuals with more language experience are more adept at understanding relationships within texts. Those with less reading or language experience can benefit from visual cues that make linguistic phrases and relationships easier to identify. Cascaded text provides these cues in a format that allows readers to immediately perceive how a phrase relates to the other phrases that precede or follow it, thus making reading comprehension more accurate and efficient.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 11 illustrates an example of cascaded text with vertical lines (for illustrative purposes only) marking indentation levels of linguistically-related constituents, according to an embodiment.

FIG. 17 illustrates acoustic properties captured from the waveform in FIG. 16, according to an embodiment.

FIG. 29 illustrates a flowchart of an example method for acoustic-based linguistically-driven automated text formatting, according to an embodiment.

FIG. 30 illustrates a flowchart of another example method for acoustic-based linguistically-driven automated text formatting, according to an embodiment.

FIG. 31 illustrates a flowchart of another example method for cascading text using a machine learning classifier for acoustic-based linguistically-driven automated text formatting, according to an embodiment.

DETAILED DESCRIPTION

Figure 1:
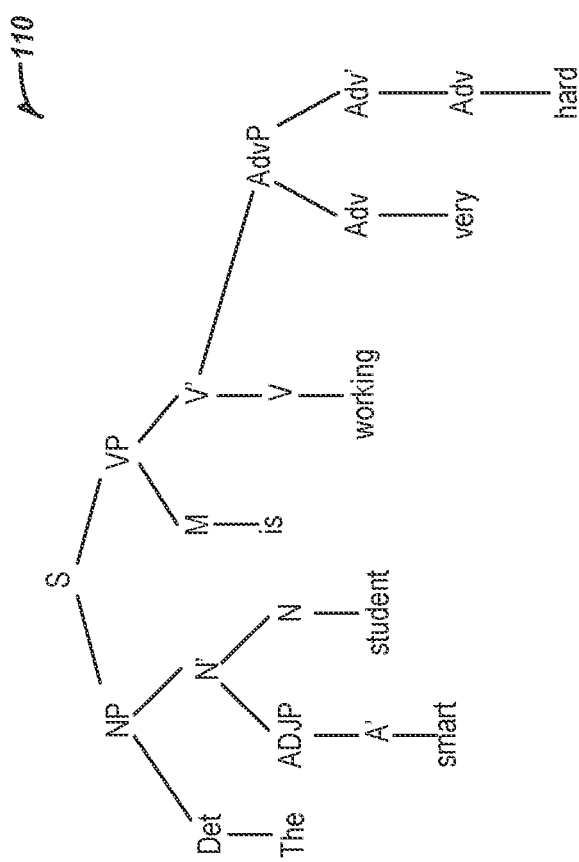
FIG. 1 illustrates an example of a parse tree defining constituents to be used for acoustic-based linguistically-driven automated text formatting, according to an embodiment.

Language knowledge is acquired acoustically from a very early age-we hear language before we read it. Becoming a fluent language user means learning to produce and interpret acoustic signals that contain pauses and pitch changes; speakers use these to mark linguistic units and provide acoustic signals that allow others to understand the relationships communicated in speech. Acoustic-based linguistically-driven text formatting presents a method for translating acoustic signals into linguistic phrase markers, which populate a language model used to produce cascaded text.

The systems and methods discussed herein utilize automated acoustic analyses of auditory language and mappings between acoustic signals and linguistic theory to determine cascades. Such analyses take advantage of state-of-the-art speech recognition systems, automated acoustic analyzers, and natural language processing (NLP) parsers (hereafter, NLP Services). These NLP Services capitalize on artificial intelligence and deep learning methods to process raw audio data into component pieces which are then used to produce a linguistically-driven visual text format. This text format is referred to in previous patent applications by the presently named inventors as a 'cascade', including in International Patent Cooperation Treaty (PCT) Patent Application No. PCT/US2021/026270, published as WO 2021/207422, and in U.S. patent application Ser. No. 17/233,339, published as U.S. Pat. No. 11,170,154, both of which are incorporated by reference in their entireties.

The systems and methods discussed herein use NLP combined with Audio Processing Services (e.g., a speech recognition system, an acoustic analyzer, a constituency parser, a dependency parser, etc.) to parse incoming text from speech into linguistic constituents and to show the relationships between different linguistic constituents. Display rules, referred to as cascade rules, are then applied to these constituents to create different presentation formats reflecting the specific dependency relationships between constituents. In this way, the following approaches apply NLP and audio processing technology to make linguistic relationships more visible for the reader.

A linguistic constituent is a word, or group of words, that fills a particular function in a sentence. For example, in the sentence "John believed X", X could be substituted by a single word ("Mary") or ("facts") or by a phrase ("the girl")

or ("the girls with curls") or ("the girl who shouted loudly") or by an entire clause ("the story was true."). In this case, all of these are constituents that fill the role of the direct object of "John believed." Notably, constituents have a property of completeness "the story was" is not a constituent because it cannot stand alone as a grammatical unit. Similarly, "girl who" or "the" is not a constituent. In addition, constituents may be embedded within other constituents. For example, the phrase "the girls with curls" is a constituent, but so is "the girls" and "with curls." However, the phrase "girls with" is not a constituent because it cannot stand alone as a grammatical unit. Consequently, "girls with" cannot fill any grammatical function, whereas the constituent phrases "the girls" or "with curls" are both eligible to fill necessary grammatical functions in a sentence.

A part of speech is a category of syntactic function (e.g., noun, verb, preposition, etc.) of a word. Unlike parts of speech that describe the function of a single word, constituency delineates sets of words that function as a unit to fill particular grammatical roles in the sentence (e.g., subject, direct object, etc.). Hence, the concept of 'constituency' provides more information about how groups of words are related within the sentence.

The systems and methods discussed herein are capable of implementing constituent cascading, in which constituents are displayed following a set of rules that determine various levels of indentation. Rules are jointly based on information from a constituency parser and a dependency parser. The constituency parser is an NLP Service that identifies constituents as just described using a theory of phrase structure (e.g., X-bar Theory). The dependency parser is an NLP Service that provides labeled syntactic dependencies for each word in a sentence, describing the syntactic function held by that word (and the constituent it heads.) The set of syntactic dependencies is enumerated by the universal dependency initiative (UD, http://universaldependencies.org) which aims to provide a cross-linguistically consistent syntactic annotation standard. Apart from English, the syntactic analysis may support a variety of additional languages, by way of example and not limitation, including: Chinese (Simplified), Chinese (Traditional), French, German, Italian, Japanese, Korean, Portuguese, Russian, and Spanish.

Through implementing a process of text cascading, the systems and methods discussed herein provide a cascade that includes visual cues to the underlying linguistic structure in texts. These cues serve a didactic function, and numerous embodiments are presented that exploit these cues to promote more accurate and efficient reading comprehension, greater ease in teaching grammatical structures, and tools for remediation of reading-related disabilities.

In an example, the cascade is formed using line breaks and indentations based on constituency and dependency data obtained from parsing operations. Cascade rules are applied such that prioritization is placed on constituents remaining complete on a line, or indicated as a continuous unit in situations where device display limitations may prevent display on a single line. This promotes easy identification of which groups of words serve together in a linguistic function, so that constituents can be identified more easily. Accurate language comprehension requires the ability to identify relationships between the entities or concepts presented in the text. A prerequisite to this is the ability to parse out constituents (i.e., units of text that serve a discrete grammatical function.) Evidence suggests that poor comprehenders have substantial difficulties identifying syntactic boundaries that define constituents during both reading and oral production (e.g., Breen et al., 2006; Miller and Schwanenflugel, 2008). Moreover, boundary recognition is especially important for complex syntactic constructions of the sort found in expository texts (i.e., textbooks, newspapers, etc.). These facts suggest that the ability to identify syntactic boundaries in texts is especially important for reading comprehension, and that methods of cuing these boundaries may serve as an important aid for struggling readers. However, standard text presentation methods (i.e., presenting texts in left-justified blocks) do not explicitly identify linguistic constituents, or provide any means to support the process of doing so. The systems and methods discussed herein present a means of explicitly cuing syntactic boundaries and dependency relationships via visual cues such as line-breaks (e.g., carriage return, line feed, etc.), indentations, highlighting in color, italics, underlining, etc.

Linguistic theory provides established diagnostic tests for linguistic constituents (also called phrases) and formalisms for representing the relationships between them. These tests include by way of example, and not of limitation, i) do-so/one substitution, ii) coordination, iii) topicalization, iv) ellipsis, v) clefting/pseudoclefting, vi) passivization, vii) wh-fronting, and viii) right-node-raising, ix) pronominal replacement, and x) question answering, xi) omission, and xii) adverbial intrusion. For example, the constituent status of the entire phrase "the smart student" is attested by the possibility of applying topicalization to the entire phrase, but not to parts of it (i.e., "It was the smart student who was working very hard" but not "It was the smart who student is working very hard."). Similarly, prominimalization replaces the entire phrase (i.e., "She is working very hard." But not "The smart she is working very hard."). The constituent status of the VP can be attested by applying ellipsis, as in "The smart student was working very hard and so was Mary"—where it is understood that Mary "is working very hard."

A predominant theory known as X' Theory (pronounced as "X-bar Theory") describes how constituent phrases are created (Chomsky, 1970; Jackendoff, 1977). This theory abstracts over particular parts of speech (e.g., nouns, verbs, etc.) and asserts that all types of phrases, described as XPs or X-Phrases (e.g., if X=a noun then it is a noun phrase; if X=verb then it is a verb phrase, etc.), are created via three general binary-branching re-write rules. First, a phrase ("XP) consists of an optional 'Specifier' and a required 'X-bar' (denoted as X') in any order. Second, an X-bar (X') may optionally consist of an X' and an adjunct, of any type licensed to modify the X'. Third, the X' consists of the obligatory head of the phrase (e.g., a word of any part of speech) and, optionally, any number of complement phrases licensed by the head, occurring in any linear order. These rules may be used to create parse trees (e.g., as shown in FIG. 1), such that specifiers and X-bars, and heads and complements are in a sister-hood relationship, and XPs are in a maximal position in the hierarchy, dominating the X', which in turn dominates the X.

FIG. 1 illustrates an example of a parse tree defining constituents to be used for linguistically-driven automated text formatting, according to an embodiment. For example, as shown in parse tree 110 in FIG. 1, a verb phrase 'is working very hard' may be represented as a VP with the V head and the ADVP complement, which is in turn represented as a ADV' with a ADV in the specifier position (i.e., left branch) and the ADV' as the projection from the ADV head. Note also that other adjunct phrases (like prepositional or adjectival phrases) could be further attached to any X', such as the ADJP phrase attached to the N' that dominates 'student'. Instances of a specifier have been simplified in FIG. 1, but these are also understood to be XP phrases.

Figure 3:
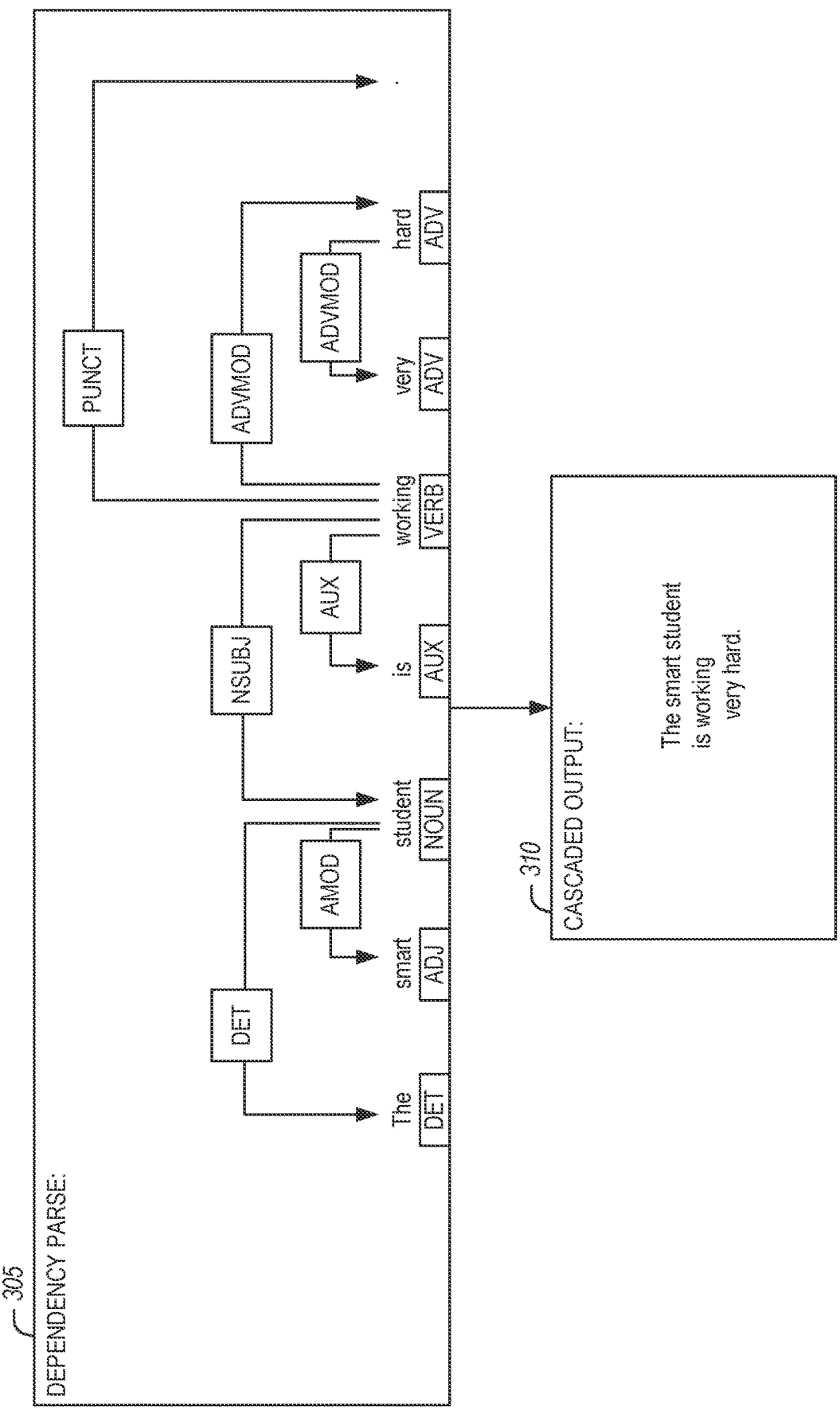
FIG. 3 illustrates a block diagram of an example of a dependency parse and cascaded text output from acoustic-based linguistically-driven automated text formatting, for the sentence in FIG. 1, according to an embodiment.

In an example, the parse tree 110 defines constituents to be used for acoustic-based linguistically-driven automated text formatting. Such parse trees demonstrate the output of a constituency parser, which provides input for acoustic-based linguistically-driven automated text formatting. For example, the primary constituents in the parse tree 110 (for the sentence, "The smart student is working very hard.") are dominated by NP ["the smart student", VP "is working", and AdvP "very hard"] nodes. In an example, such constituents are defined according to the X-bar theory. The subject is the entire NP and the predicate is the entire VP. Thus, in the example sentence used in FIG. 1, the modifier "smart" is part of the NP and the modifier "very hard" is part of the VP. The cascade will keep the entire subject on a single line, put the predicate on the next line aligned with that subject, and "very hard" on the next line under 'is working' because it is a separate constituent modifier of the verb (e.g., as shown in FIG. 3).

In spoken language, constituents can be recognized by their acoustic properties. For example, words that precede constituent boundaries are lengthened (Fougeron & Keating, 1997b; Klatt, 1975; Lehiste et al., 1976b; Price, Ostendorf, Shattuck-Hufnagel, et al., 1991; Turk & Shattuck-Hufnagel, 2007; Wightman et al., 1992); silence between words is more likely (and longer) at boundary locations (Cooper & Paccia-Cooper, 1980; Klatt, 1975; Lehiste, 1973); and speakers tend to raise or lower their pitch at boundary locations (Pierrehumbert, 1980; Streeter, 1978). These acoustic cues correspond to XP structures in the parse tree 110.

Figure 2:
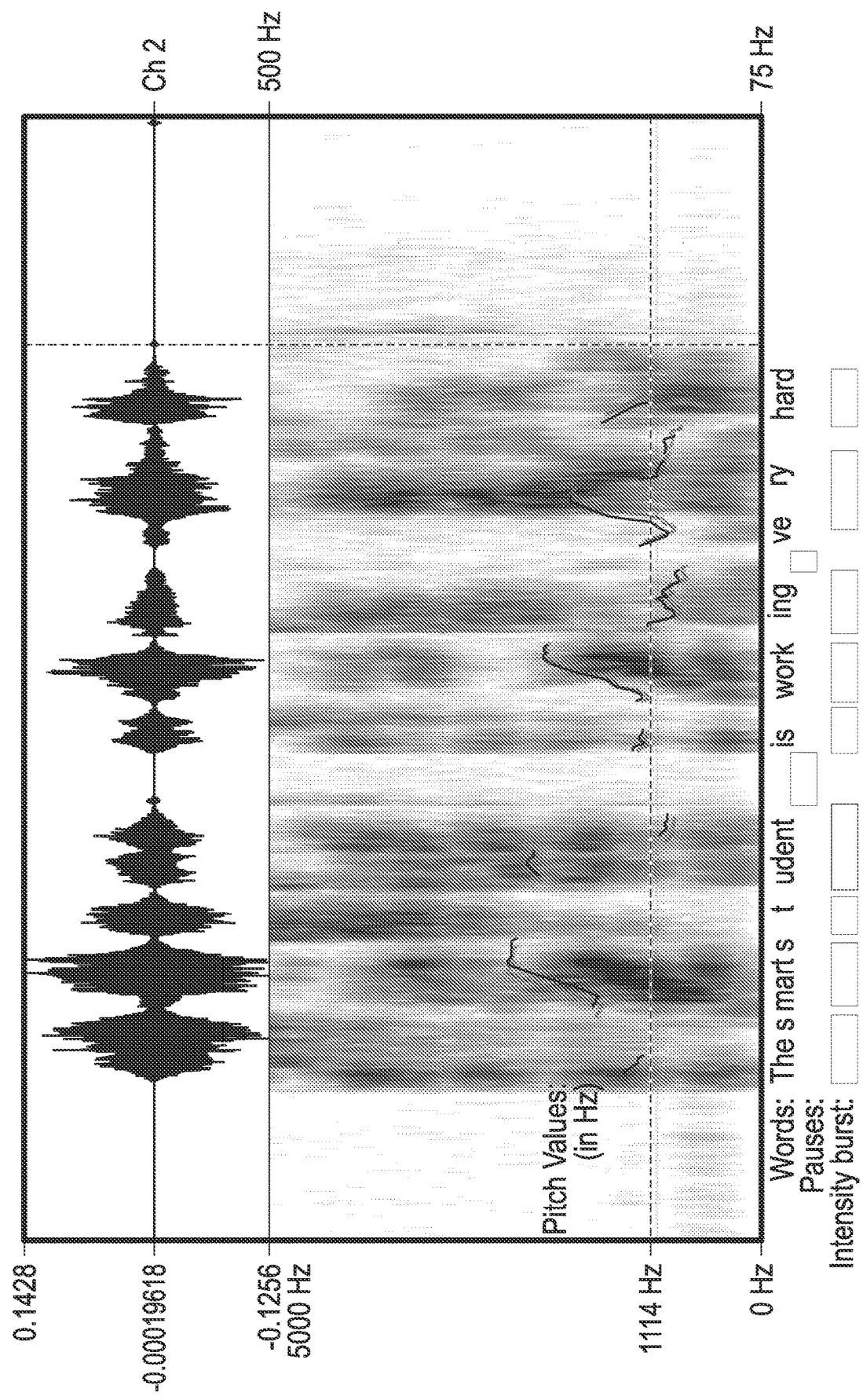
FIG. 2 illustrates a waveform and spectrogram for the analysis of the sentence in FIG. 1, according to an embodiment.

FIG. 2 illustrates a waveform (top) and spectrogram (bottom) for the sentence in FIG. 1 ("The smart student is working very hard"), according to an embodiment. In an example, such a waveform provides input to an algorithm for the acoustic definition of constituents for acoustic-based linguistically-driven automated text formatting.

Acoustic-based constituent definitions are demonstrated in FIG. 2 by the pause between "the smart student" and "is working very hard". In general, constituents are marked in speech via pauses (e.g., after the word "student"), lengthening of words preceding boundaries (e.g., of the word "student"), and raised or lowered pitch values (e.g., of the word "very"). Final words are characterized by falling pitch (e.g., for the word "hard"). The hierarchical relationship seen in parse tree 110 between 'very hard' and 'is working' is also expressed in the acoustic signal. The constituent "very hard" is signaled as subordinate to the constituent "is working" because the length of the pause that proceeds it is reduced compared to the pause that precedes "is working". The system of acoustic-based linguistically-driven text formatting will use these acoustic properties, which are derived either from direct measurement of the acoustic signal (i.e., pauses, pitch values, vowel length) or comparisons within the acoustic signal (pause 1 vs. pause 2, pitch on word 1 vs. pitch on word 2) to derive visual cues describing how a text should be read aloud and comprehended.

FIG. 3 illustrates a block diagram of a dependency parse 305 for the sentence in FIG. 1 ("The smart student is working very hard") and the corresponding cascaded text output 310 for linguistically-driven automated text formatting. For example, the cascade shown in the cascaded text output 310 implements a line break between each constituent, and the constituent "very hard" is indented under "is working" to indicate its dependent status. The comparative acoustic properties in FIG. 2 correspond to hierarchical relationships in a dependency parse, such as those shown in the parse 305 in FIG. 3. A constituent marked with a smaller pause indicates it is in a dependency relation with the constituent marked with a longer pause.

In an example, acoustic markers of phrase boundaries are determined in Part 1 of a 2-part process of Constituent Cuing. Part 1 stipulates how to divide a sentence into smaller pieces for display. Namely, sentences are broken up into constituent pieces, such that no words are separated from their dominating XP phrase (e.g., as shown in the parse tree 110). XP phrases may be determined by acoustic cues (e.g., pauses, vowel lengthening, pitch shifts) or via linguistic analysis from a constituency parser. For example, in the example of FIG. 3, a linebreak between 'smart' and 'student' would not happen because 'student' is dominated by the NP headed by 'student' which also contains the ADJP (as shown in the parse tree 110 of FIG. 1). This is evidenced in speech by the coarticulation of the /t/ at the end of smart and the /s/ at the beginning of student (as shown in the waveform at the top of FIG. 2). Similarly, 'is' would not occur on a separate line from 'working' because they are both dominated by the VP headed by 'working'. Acoustically, this is portrayed by the vowel elongation and raised pitch in "is working".

Hence, a segment, for the purposes of the cascade generator, is defined as a phrase dominated by an XP which will stay together on a presentation line. A break between 'working' and 'very' could happen, because 'very' is dominated by a separate XP phrase from 'working' (i.e., 'working' is dominated by a VP and 'very' is dominated by an ADVP). Line breaks occur at the presence of an XP because this characterizes a new constituent.

Example embodiments of Part 1 may utilize other phrase structure theories (e.g., Bare Phrase Structure, etc.) as a representative language for delimiting constituents. Some aspects of the systems and methods discussed herein are that line breaks occur at constituent boundaries and that constituent boundaries are established based on established linguistic diagnostic tests (e.g., substitution, movement, clefting, questioning, etc.). The constituent boundaries are constant regardless of specific phrase structure representation.

Figure 4A:
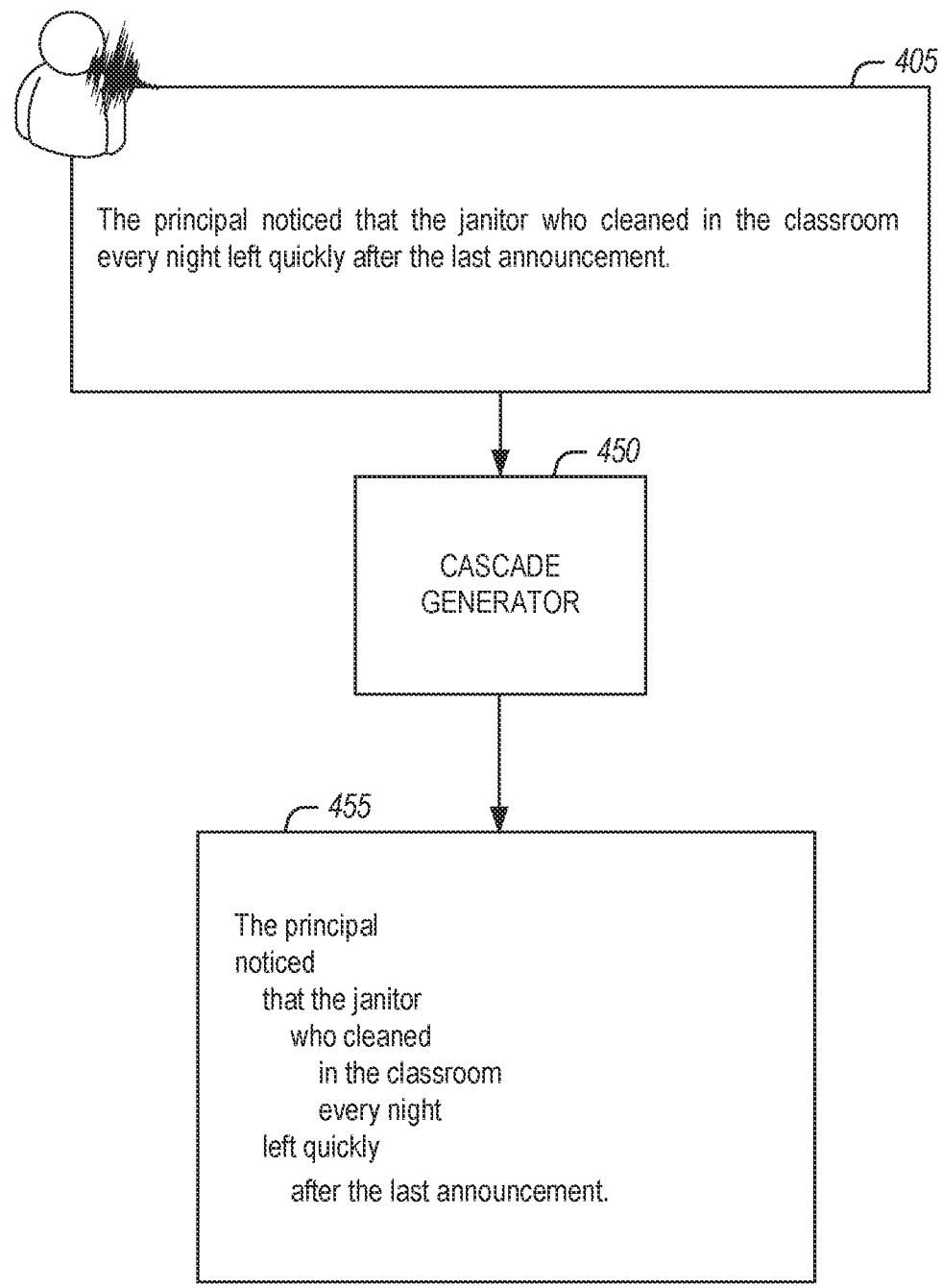
FIG. 4A illustrates a text portion transformed to include indentations in a cascade using acoustic-based linguistically-driven automated text formatting, according to an embodiment.

As described herein, there are provided various embodiments of systems and methods for generating cascaded text displays. FIG. 4A illustrates a text portion 405 transformed to include indentations in a cascade 455 using acoustic-based linguistically-driven automated text formatting, according to an embodiment. Here, the cascade 455 has a hierarchical position specified for each segment via text formatting provided by a cascade generator 450. In this example, a text portion (the sentence, "The principal noticed that the janitor who cleaned in the classroom every night left quickly after the last announcement.") is obtained from acoustic processing of an audio sample, and transformed into the cascade 455.

Figure 4B:
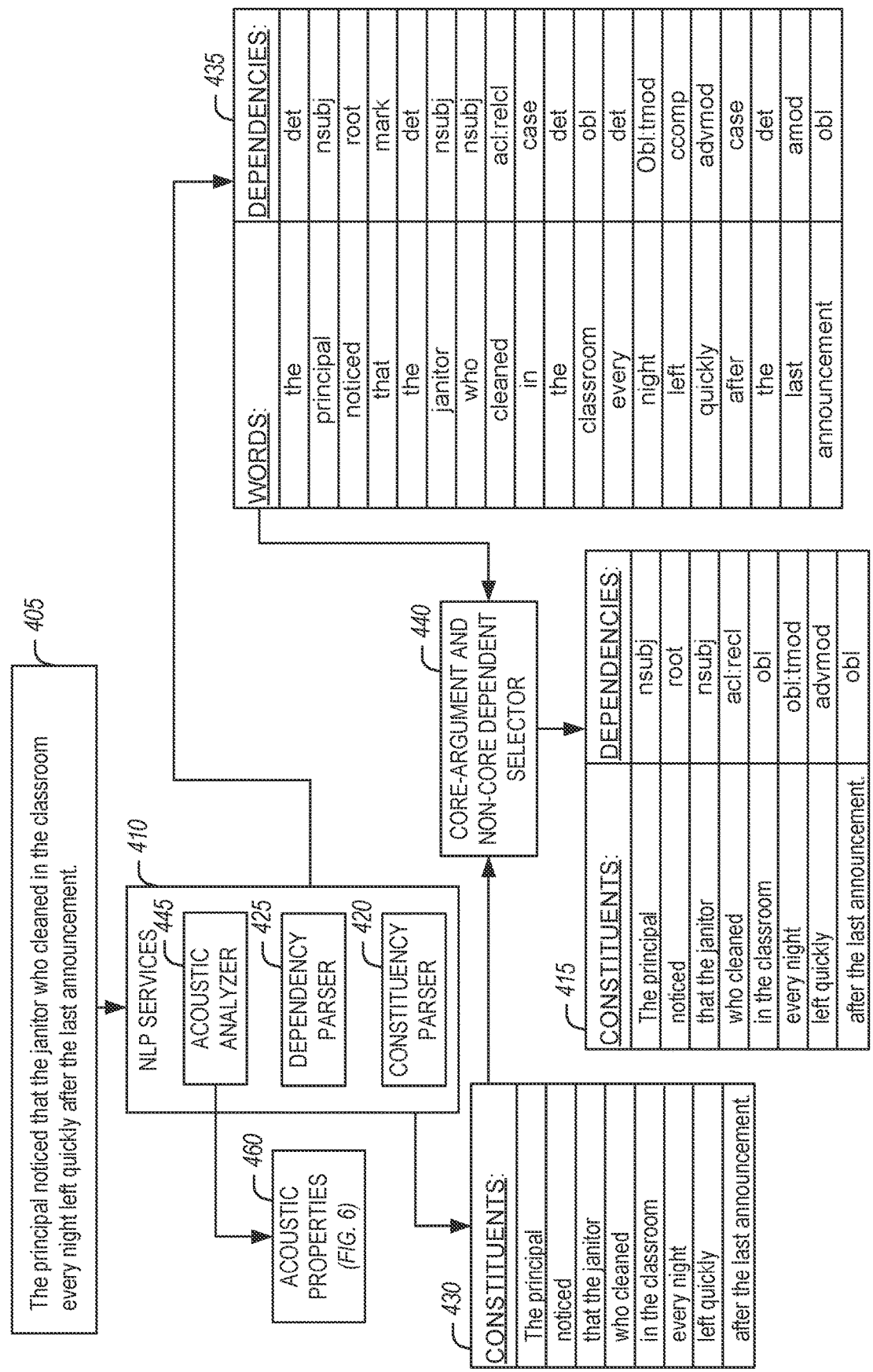
FIG. 4B illustrates features and data processing of a cascade generator, using acoustic-based linguistically-driven automated text formatting, according to an embodiment.

Features and data processing of the cascade generator 450, including the use of NLP services 410, are depicted in the embodiment in FIG. 4B. A text portion 405 is segmented into a plurality of text segments based on grammatical information determined from the output of the NLP services 410. These include constituents 430, as defined by the constituency parser 420, a set of dependency roles 435 as determined by the dependency parser 425, and acoustic features 460 identified via the acoustic analyzer 445. Additional details on the acoustic features 460 are described below with reference to FIG. 6.

In the example of FIG. 4B, constituents are identified by their maximal projection (XP) and assigned to the dependency relation associated with the head of that projection (X), in table 415. For example, the constituent 'the principal' has two dependencies associated with it (det and nsubj), but the full NP constituent is assigned as an nsubj for interpretation by the cascade generator 450. This is because only the nsubj relation has a direct effect on horizontal displacement rules that define the shape of the cascade.

Figure 5:
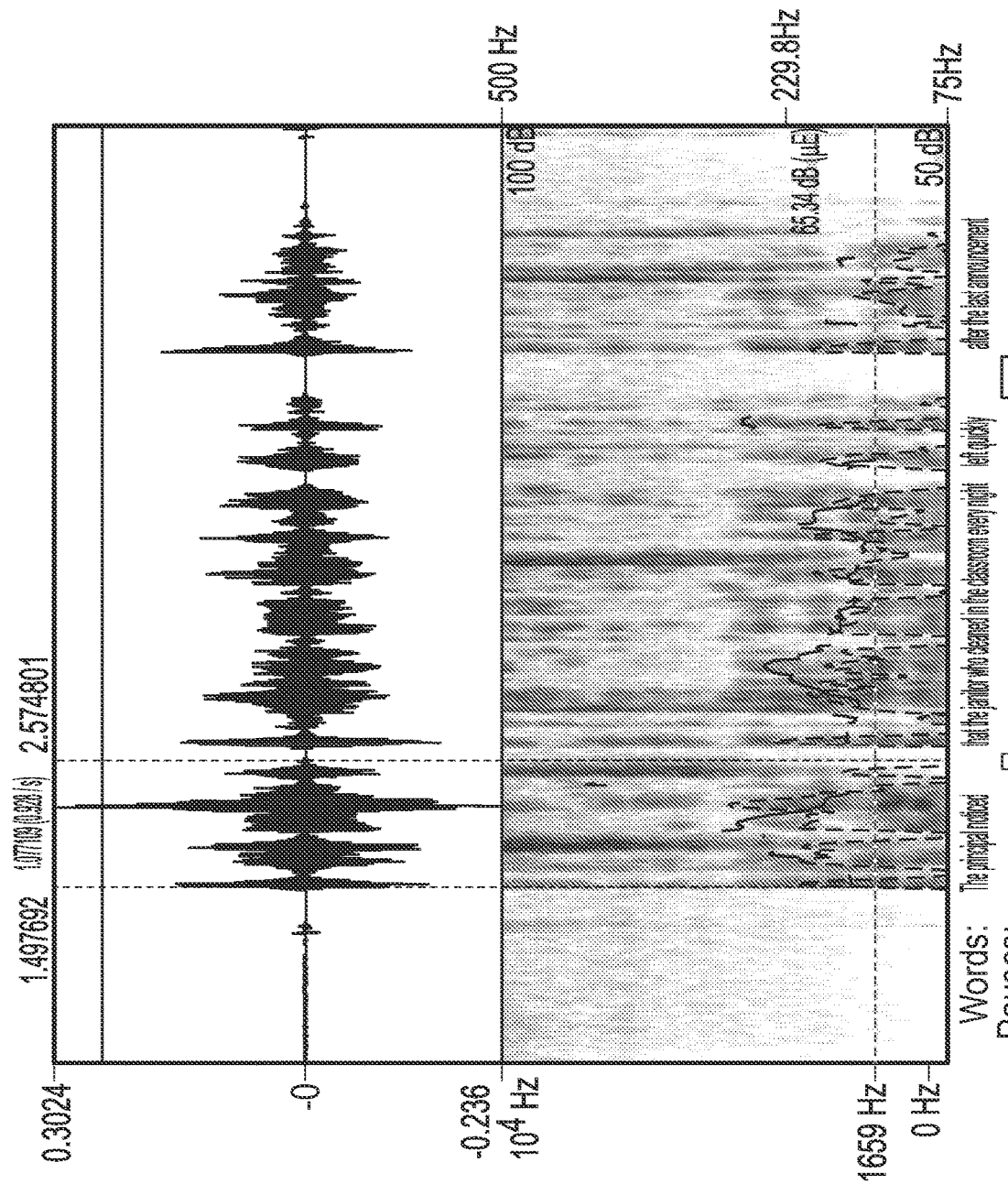
FIG. 5 illustrates a waveform and spectrogram for the analysis of the sentence in FIGS. 4A and 4B, according to an embodiment.

FIG. 5 illustrates a waveform (top) and spectrogram (bottom) for the sentence in FIGS. 4A and 4B ("The principal noticed that the janitor who cleaned in the classroom every night left quickly after the last announcement."), according to an embodiment.

Acoustic-based constituent definitions are demonstrated in FIG. 5 by a pause between "the principal noticed" and "that the janitor who cleaned in the classroom every night left quickly" and a pause between "that the janitor who cleaned in the classroom every night left quickly" and "after the last announcement." The system of acoustic-based linguistically-driven text formatting uses acoustic properties, which are derived either from direct measurement of the acoustic signal (i.e., pauses, pitch values, vowel length) or comparisons within the acoustic signal (pause 1 vs. pause 2, pitch on word 1 vs. pitch on word 2) to derive visual cues describing how a text should be read aloud and comprehended.

Figure 6:
FIG. 6 illustrates acoustic properties captured from the waveform in FIG. 5, according to an embodiment.

FIG. 6 illustrates acoustic properties captured from the waveform in FIG. 5, according to an embodiment. The acoustic properties are collected by the acoustic analyzer 445 as described in FIG. 4B. As shown in FIG. 6, properties include, but are not limited to, temporal information of a segment (word, phrase, pause, etc.), words associated with the segment, mean intensity, minimum intensity, maximum intensity, pitch slope, minimum pitch, and maximum pitch. The acoustic properties provide the data elements used to identify a constituent within the waveform shown in FIG. 5.

For example, the cascade shown in the cascaded text output 455 implements a line break between each constituent, and the constituent "after the last announcement" is indented under "left quickly" to indicate its subordinate (or dependent) status. The comparative acoustic properties in FIG. 6 correspond to hierarchical relationships in a dependency parse. A constituent marked with a smaller pause (e.g., as indicated by the acoustic properties shown in FIG. 6) indicates it is in a dependency relation with the constituent marked with a longer pause.

Figure 7A:
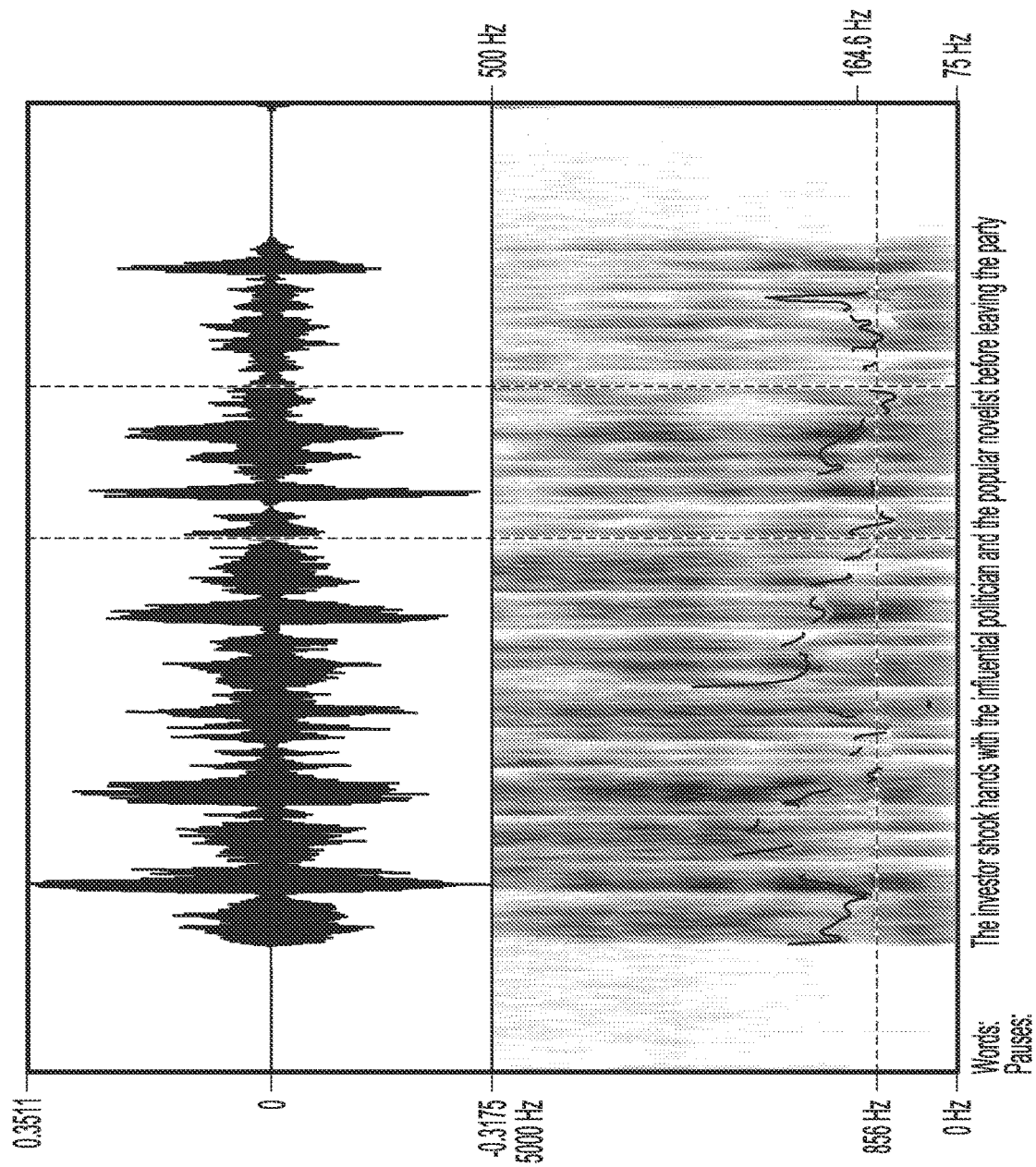
FIGS. 7A and 7B illustrate waveforms and spectrograms for the analysis of an additional sentence, according to an embodiment.
Figure 7B:
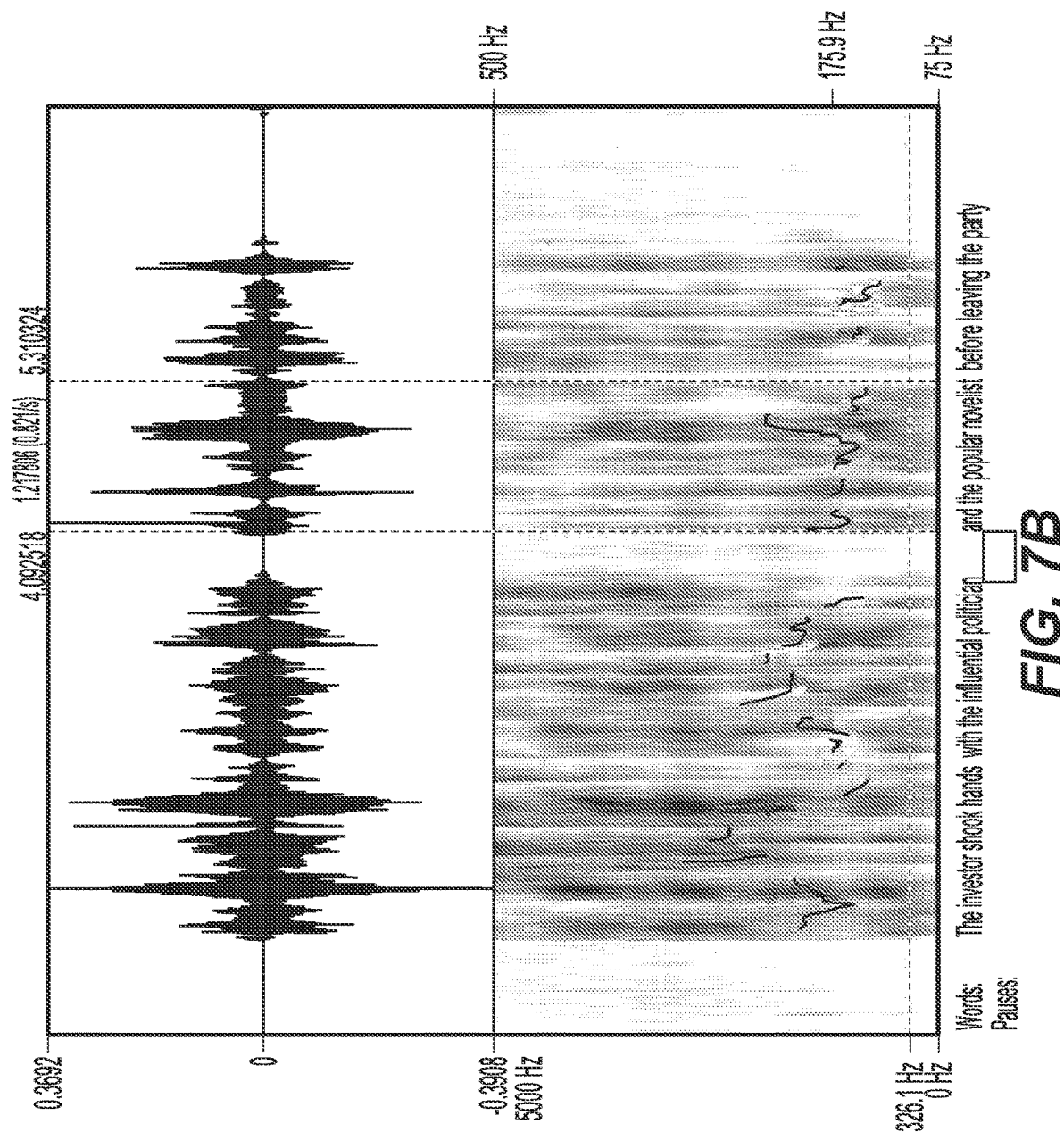

Acoustic properties can also give cues to clause boundaries that are not present in written text. This is shown in FIGS. 7A and 7B, which illustrate waveforms and spectrograms for the analysis of additional spoken sentences that include the same words. As depicted, the noun phrase "popular novelist" occurs in the sentence "The investor shook hands with the influential politician and the popular novelist before leaving the party." and also in the sentence "The investor shook hands with the influential politician and the popular novelist discussed her book." However, the intonational contour is different in each case, as shown in a comparison between FIG. 7A and FIG. 7B. The waveform for the phrase 'the popular novelist' is very similar in both cases (e.g., in the waveform at the top of FIGS. 7A and 7B, between the dashed vertical lines), but FIG. 7B shows a positive pitch slope over the phrase "popular novelist" that is absent in FIG. 7A. This wide-range pitch excursion indicates that "popular novelist" is the beginning of a new clause, while the more contained pitch range in FIG. 7A suggests that the phrase closes off the current clause.

Thus, access to the acoustic properties associated with these sentences provides cues to the correct interpretation that are not present in the written text (and hence, not present in the constituent or dependency parse output this written text). Without such access, readers have been shown to misinterpret the phrase 'the popular novelist' as part of a conjunction with 'the influential politician' so that the initial understanding is that the investor shook hands with two people instead of only one (e.g., Hoeks et al., 2002; Kaan et al, 2019; Kerkhofs et al., 2007). In the present examples, acoustic-based linguistically-driven text formatting uses acoustic information contained in spoken text to provide added information about when line breaks are necessary so that constituents (or sentences) that should be separate according to their meaning are displayed separately when rendered visually.

In an example embodiment, the acoustic processor is used with or without an automated constituent parser to provide constituents for use in the Cascade generator. However, the cascade generator does not depend on use of an automated parser or on any particular automated parser. This parser is denoted as an NLP Service (e.g., such as the constituency parser 1425 of the NLP services 1420 as discussed in FIG. 14, etc.). It will be understood that a variety of parsing techniques and services may be used to identify constituents that are then processed by the cascade generator.

Part 2 of the Constituent Cuing process specifies an indentation scheme to provide visual cues that describe hierarchical linguistic structure. These cues may be based on relationships within the acoustic signal either alone, or in combination with, output from an automated dependency parser. Hierarchy is denoted in the acoustic signal via contrasts between parts of the signal (i.e., differences in pause length, pitch contour, or intensity between speech segments.). These contrasts are calculated after extracting acoustic properties from the speech signal (e.g., by the acoustic analyzer 445 as described in FIG. 4B, or the acoustic analyzer 1415 as described in FIG. 14 and thereafter). Hierarchy is denoted in the dependency parser by a set of pre-defined relationships that describe specific linguistic functions.

A dependency parser may adopt various labeling conventions with which to specify linguistic functions. The systems and methods discussed herein incorporate the use of any dependency set for specifying word-to-word linguistic functions, including those based on syntax, semantics, or prosody. In an example embodiment, the dependency set from the Universal Dependency (UD) initiative is adopted, which is a cooperative, open-source, international project for developing a cross-linguistically valid dependency set. The set of relations is available at https://universaldependencies.org/u/dep/index.html.

The UD dependency set is split into core arguments for nominals and clauses and dependents of other types, including non-core dependents (i.e., oblique arguments, adverbial clauses, relative clauses) and nominal modifiers (i.e., adjectives, noun attributes, and clausal modifiers). The Process of Constituent Cuing stipulates that core arguments and non-core dependents should be obligatorily indented under their heads. This indentation provides a visual cue to the core relationships within the sentence.

In an example, dependents of nominals may also be indented under their heads. These include a varied set of nominal and adjectival modifiers (i.e., partitives, reduced relative clauses, numeric modifiers, and appositive phrases). Thus, a cascaded text output can include indentations based on the dependency parse. The amount of indentation may be specified in system preferences, as described below. In an example embodiment, dependent nominals are treated on a case-by-case basis depending on the length of the line or the type of constituent. Different amounts of indentation may optionally be applied to different dependent types in order to distinguish them visually.

Figure 8:
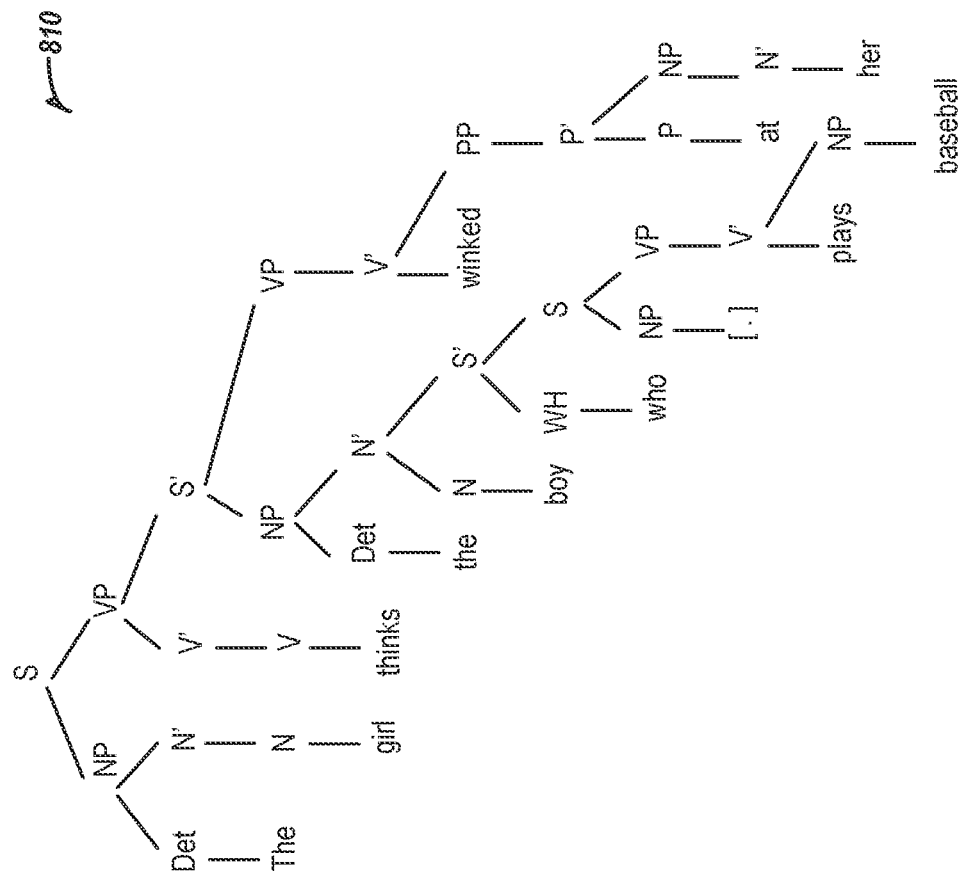
FIG. 8 illustrates another example of a parse tree defining constituents to be used for acoustic-based linguistically-driven automated text formatting, according to an embodiment.
Figure 9:
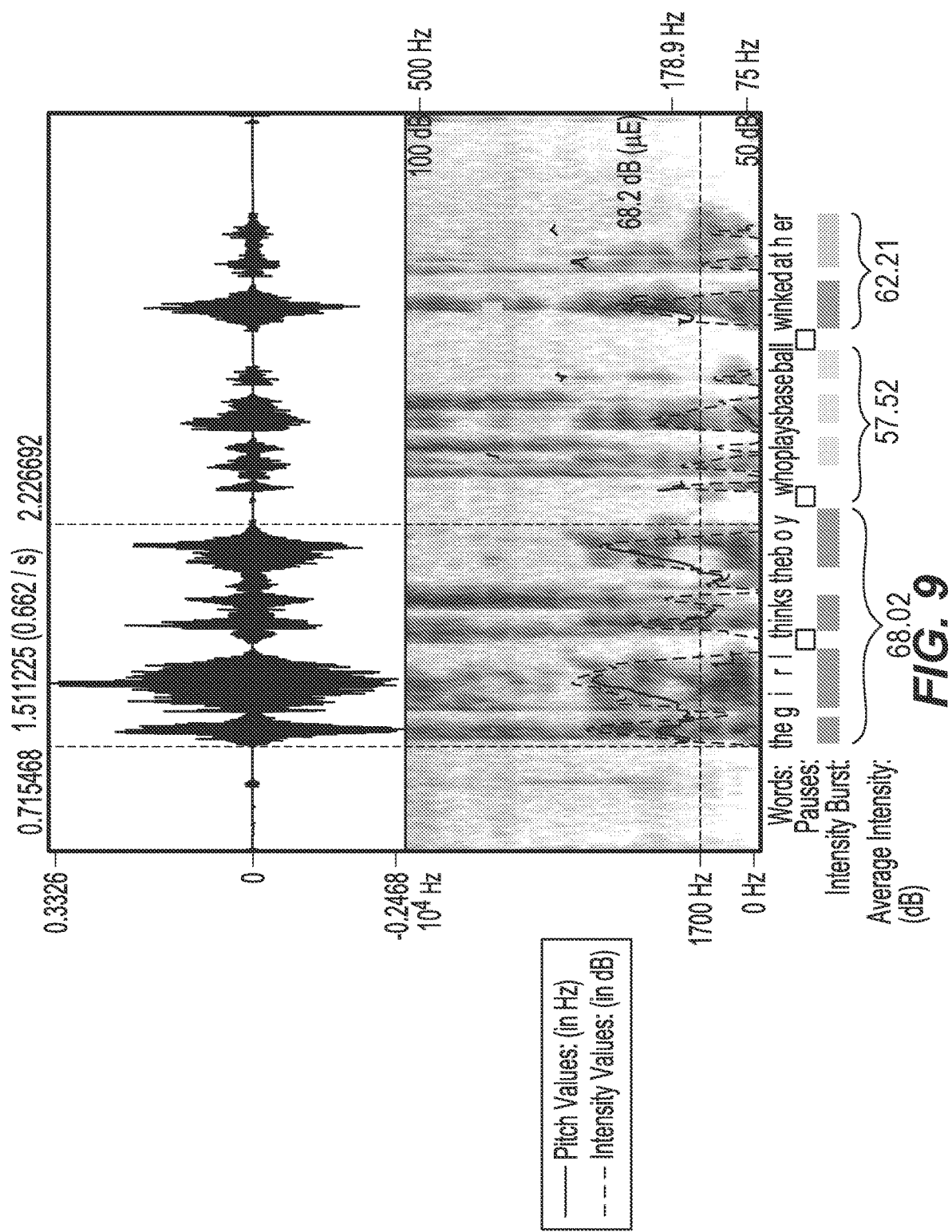
FIG. 9 illustrates a waveform and spectrogram for the analysis of the sentence in FIG. 8, according to an embodiment.
Figure 10:
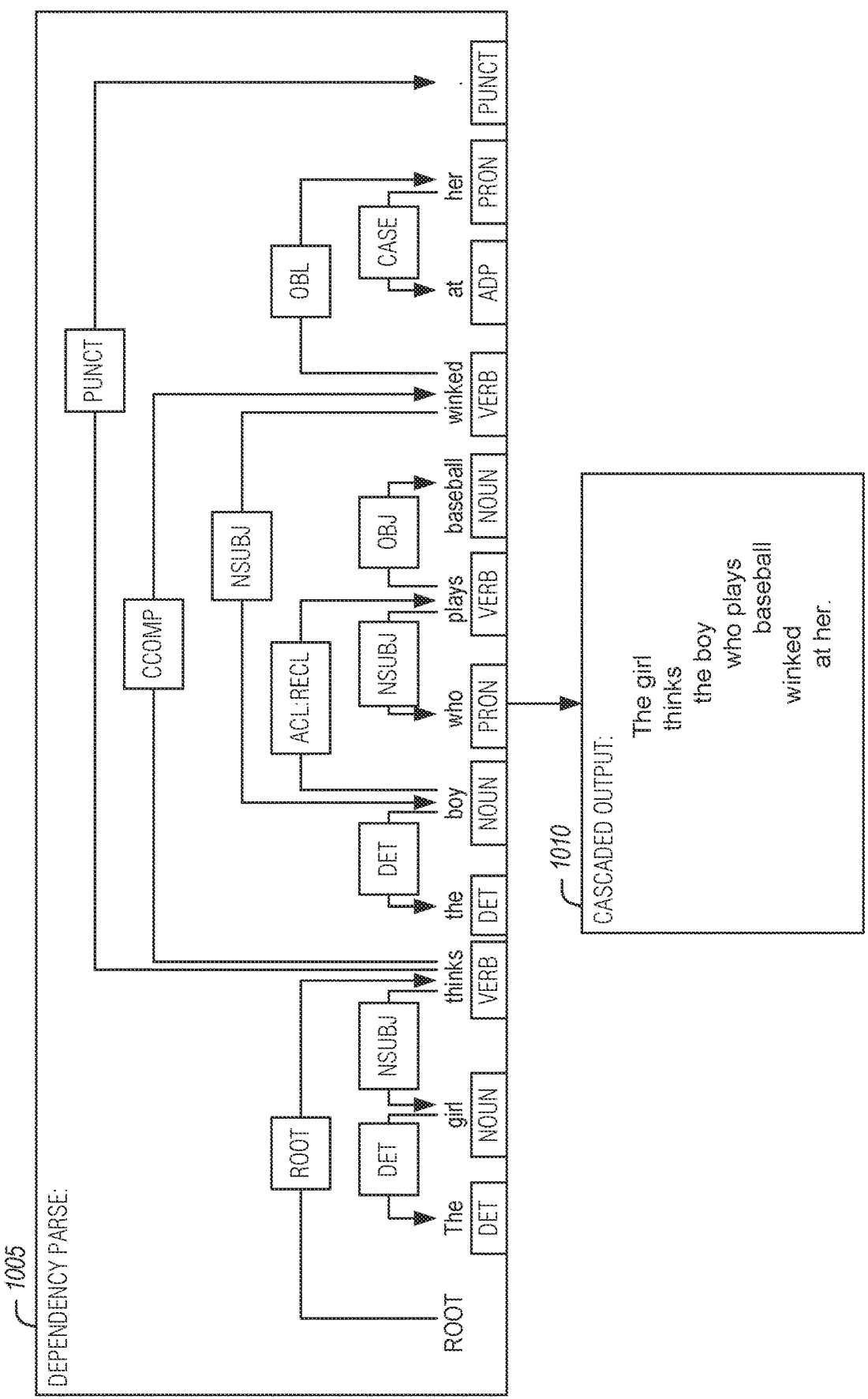
FIG. 10 illustrates a block diagram of an example of a dependency parse and cascaded text output for the sentence in FIG. 8, according to an embodiment.

FIG. 8 illustrates another example of a parse tree 810 for a dependency parse with constituents defined according to the X-bar theory, according to an embodiment. FIG. 9 illustrates a waveform (top) and spectrogram (bottom) for the analysis of the sentence in FIG. 8. FIG. 10 illustrates a block diagram of an example of a dependency parse 1005 and cascaded text output 1010 for acoustic-based, linguistically-driven automated text formatting, according to an embodiment. Here, the analyzed sentence is "The girl thinks the boy who plays baseball winked at her". Of note, the predicate includes an embedded sentence (S') which also has an embedded sentence (S').

This hierarchical relationship is portrayed by the X-bar structure by situating the S' "who plays baseball" as a fully contained phrase within the NP. This is portrayed in the cascaded output (e.g., as shown in FIG. 10) with an "un-indent," reflecting the fact that the main NP 'the boy' and the main 'VP' "winked" of the embedded S' stand in a sisterhood relation (i.e., they are at the same level in the parse tree). Thus, indentation rules ensure that subjects and verbs of sentences (even when embedded) are at the same horizontal displacement level. When there is further modification of the subject NP (in this case, 'who plays baseball') the "un-indent" pattern results from the need to both (i) indicate that the modifying information is dependent on the NP by further indenting it; and (ii) align the verb 'winked' with its subject 'the boy.'

This identical relationship is portrayed acoustically in the waveform of FIG. 9, by the intensity difference between the phrase "who plays baseball" and the surrounding phrases "the girl thinks" and "winked at her", both of which have higher average intensity values. Hence, acoustic-based linguistically-driven text formatting can place indentations between constituents corresponding to relative differences between intensity, pitch values, and pauses between those constituents. In this case, the 'un-indent' pattern is produced by the resumption of a higher average intensity value in the 'winked at her' phrase, after the embedded phrase 'who plays baseball' which is produced with a lower average intensity. Syntactic embeddings such as these may also manifest as a U-shaped pattern in pitch values, where the embedded information has a lower overall pitch than constituents in the surrounding clause.

The cascade pattern is produced from the overall result of applying acoustic, constituent, and dependency rules derived from the output of NLP services, including phrase boundaries, line breaks, and horizontal displacement. Accordingly, the cascaded text output (e.g., output 1010) includes the indentations based on the dependency information (e.g., dependency parse 1005 or acoustic analysis (FIG. 9; or acoustic properties 460 in FIG. 4B) according to cascade rules specified in the cascade generator. These rules may refer to dependency relations, hierarchical relationships in the parse tree, or relationships between acoustic variables calculated over segments of an audio text.

Additional processing may be used to modify cascade output when displayed on devices with display limitations. For example, additional characters or other signals may be inserted to indicate that a constituent wraps to an additional line, etc. In these cases, horizontal displacement remains consistent for the wrapped constituent (e.g., if the constituent begins at location 40, then the wrapped segment will also begin at location 40 and will bear visual marking (e.g., bracketing, shading, etc. to indicate that it is a continuation.)

FIG. 11 illustrates examples of cascaded text output 1105, 1110 from acoustic-based linguistically-driven automated text formatting, according to an embodiment. It is noted that the vertical lines shown in FIG. 11 are for illustrative purposes; they are not part of the text output. Horizontal positions indicate constituents that should be associated together. For example, the positioning of the verb "left" indicates that its subject is "the janitor" (and not "the principal", for example.) as shown in cascade 1105. Similarly, the positioning of the phrase "every night" indicates that it goes with the verb "cleaned" and not "noticed", for example.)

Horizontal displacement is similarly used to signal preposed subordinate clauses by indenting the initial clause with respect to the matrix clause as shown in cascade 1110. This technique provides clear cues as to the central information in the sentence, and to the subordinate status of the initial clause.

Figure 12:
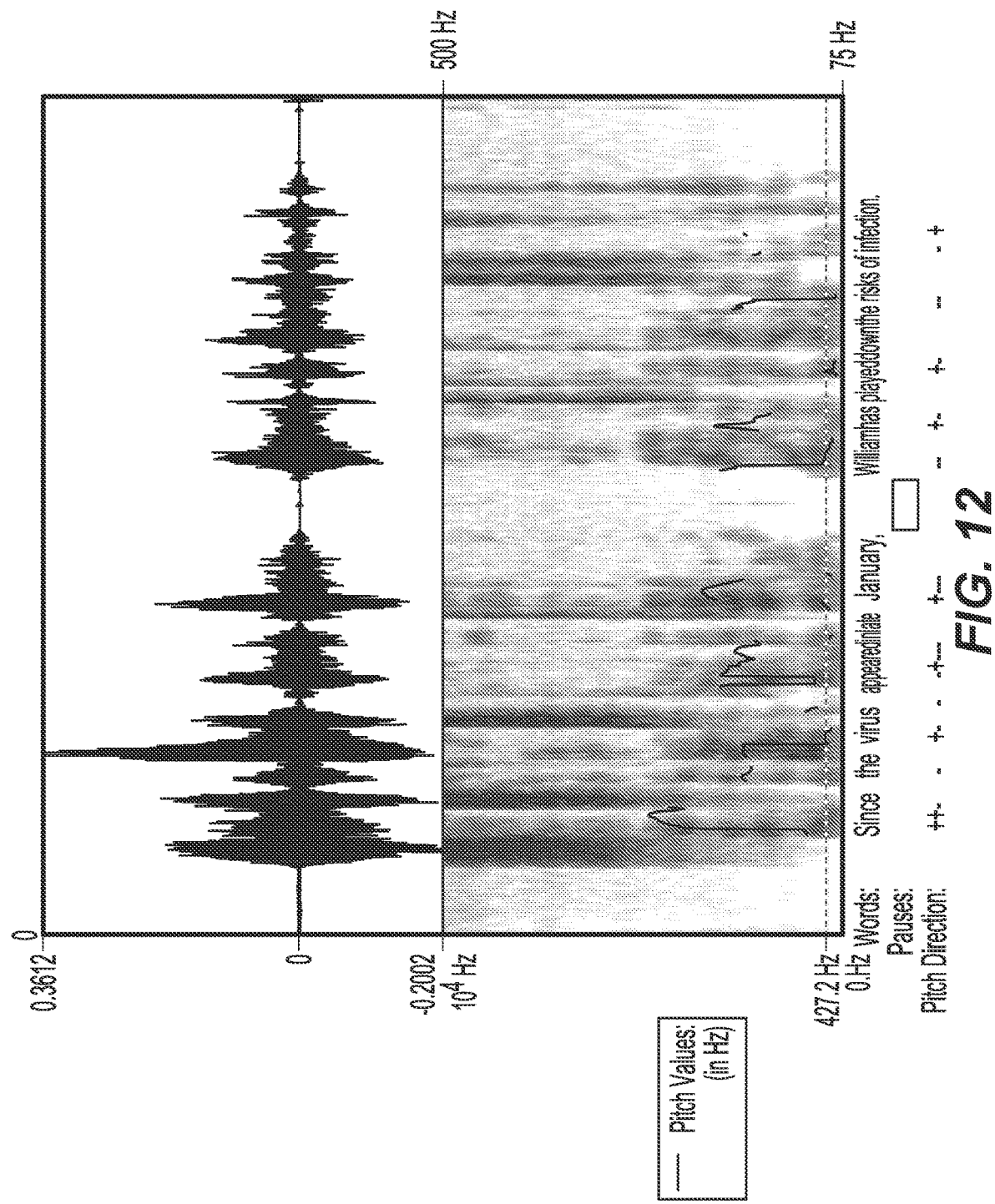
FIG. 12 illustrates a waveform and spectrogram for the analysis of another sentence, according to an embodiment.

Subordinate clauses are signaled acoustically by a rising initial pitch contour on the subordinate clause, followed by a longer than usual pause between clauses, and a falling initial pitch contour on the main clause. FIG. 12 demonstrates this pattern in a waveform and spectrogram, demonstrating positive or negative pitch directions (slopes) associated with words in each clause. Here, the analyzed sentence is depicted in the cascade 1110 of FIG. 11, "Since the virus appeared in late January, William has played down the risks of infection." In this example, a pattern of rising and then falling pitch directions between the two clauses can be identified via acoustic analysis, and encoded into the language model for this sentence. Indentation rules will create an indentation whenever an initial clause contains this type of a rising pitch feature.

Figure 13:
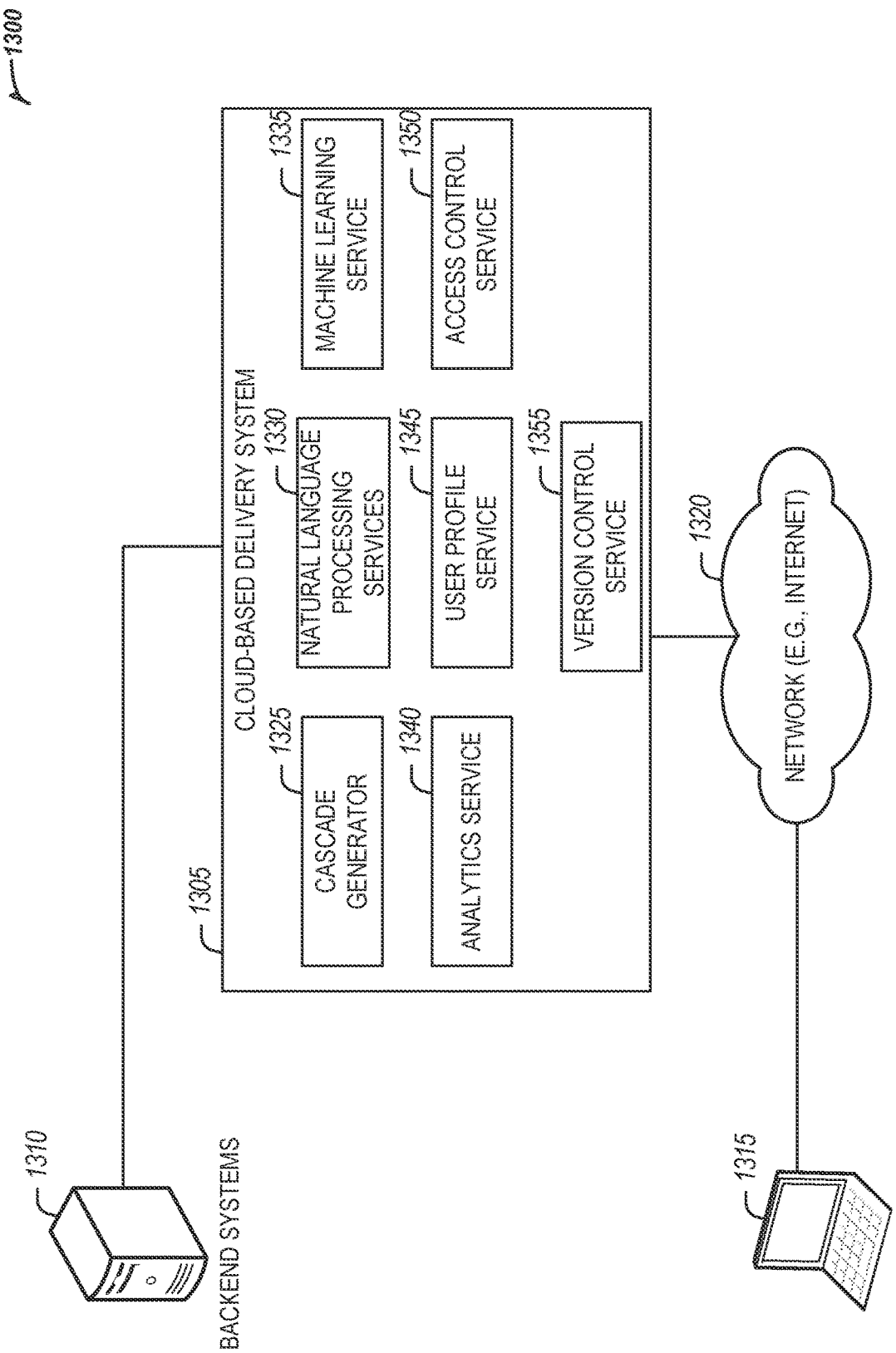
FIG. 13 illustrates a block diagram of an example of an environment and system for acoustic-based linguistically-driven automated text formatting, according to an embodiment.

FIG. 13 is a block diagram of an example of an environment 1300 and a system 1305 for implementing linguistically-driven automated text formatting, according to an embodiment. FIG. 13 may provide features as described in FIGS. 1 to 3, 4A to 4B, 5 to 6, 7A to 7B, and 8-12. The environment may include the system 1305 which may be a cloud-based delivery system (or other computing platform (e.g., a virtualized computing infrastructure, software-as-a-service (SaaS), internet of things (IoT) network, etc.)). The system may be distributed amongst a variety of backend systems 1310 that provide infrastructure services such as computing capacity and storage capacity for a cloud services provider hosting the system 1305. The system 1305 may be communicatively coupled (e.g., via wired network, wireless network, cellular network, shared bus, etc.) to a network 1320 (e.g., the internet, private network, public network, etc.). An end-user computing device 1315 may be communicatively connected to the network and may establish a connection to the system 1305. The end-user device may communicate with the system 1305 via a web-browser, downloaded application, on-demand application, etc. In an example, components of the system may be prepared for delivery to the end-user computing device 1315 via an installed application providing offline access to features of the system 1305.

The system 1305 may provide direct online connection via the end-user computing device 1315, may distribute a set of packaged services to end-user application on the end-user computing device 1315 that operates offline without internet connectivity, and as a hybrid with an end-user application that connects (e.g., via a plug-in, etc.) to the cloud service (or other computing platform) over the internet. Hybrid mode enables the user to read in cascade format regardless of connectivity, but still provides data to improve the system 1305. The end-user application may be deployed in a number of forms. For example, a browser plug-in and extensions may enable users to change the formatting of the text they read on the web and in applications using the cascading format. In yet another example, the end-user application may be an augmented image enhancement that translates live view from a camera and may apply optical character recognition (OCR) to convert the image to text and render the layout in cascade format in real time. In still another example, the end-user application may provide an augmented display of a cascade for words that are captured from audio in an environment and converted with speech-to-text processing. The version control service 1355 may track application versions and may provide periodic updates to the portable components provided to the application executing on the end-user computing device 1315 when connected to the internet.

According to an example embodiment, end-user computing device 1315 may include a microphone that enables the user to capture an audio sample (e.g., on their phone, etc.) and have the audio instantly converted (in "real-time") into cascade formatted text and displayed on an output device (e.g., as discussed in the examples below). According to an embodiment, the end-user computing device 1315 may include or be mounted in a user-worn device such as smart glasses, smart contact lenses, and the like, where input of text seen by the user (or, words heard by the user) is converted into cascaded format for enhanced comprehension. In this way the text may be converted and output in real-time by the user's personal viewing device. According to another example embodiment, end-user computing device 1315 provides augmented video (AV), augmented reality (AR), and virtual reality (VR) application of the cascade formatting may be completed within user-worn visual display devices, including AV and VR headsets, glasses, and contact or implantable lenses to allow the user to see text in the cascade format.

The systems and methods discussed herein are applicable to a variety of environments where audio is provided and text can be rendered on a device via cascade formatting. Display of text on a screen requires instructions on rendering and the cascade instruction set may be inserted in the command sequence. This may even apply to a document type (e.g., PDF, etc.) and to systems with a rendering engine embedded where the call to the rendering engine may be intercepted and the cascaded formatting instructions inserted.

The system 1305 may include a variety of service components that may be executing in whole or in part on various computing devices of the backend systems 1310 including a cascade generator 1325, natural language processing (NLP) services 1330 (which, as discussed below, operates text and acoustic processing components), a machine learning service 1335, an analytics service 1340, a user profile service 1345, an access control service 1350, and a version control service 1355. The cascade generator 1325, the NLP services 1330, the machine learning service 1335, the analytics service 1340, the user profile service 1345, the access control service 1350, and the version control service 1355 may include instructions including application programming interface (API) instructions that may provide data input and output from and to external systems and amongst the other services.

The cascade generator 1325 may receive text input (e.g., text produced from speech-to-text processing of an audio sample) and may pass the text to a parser of the NLP services 1330 to generate linguistic data. The linguistic data may include, by way of example and not limitation, parts of speech, word lemmas, a constituent parse tree, a chart of discrete constituents, a list of named entities, a dependency graph, list of dependency relations, table of acoustic features, linked coreference table, linked topic list, list of named entities, output of sentiment analysis, semantic role labels, entailment-referenced confidence statistics. Hence, for a given text, linguistic analysis may return a breakdown of words with a rich set of linguistic information for each token. This information may include a list of relationships between words or constituents that occur in separate sentences or in separate paragraphs. The cascade generator 1325 may apply cascade formatting rules and algorithms to a language model generated by the machine learning service 1335 created using constituency data and dependency data to generate probabilistic cascade output.

Figure 14:
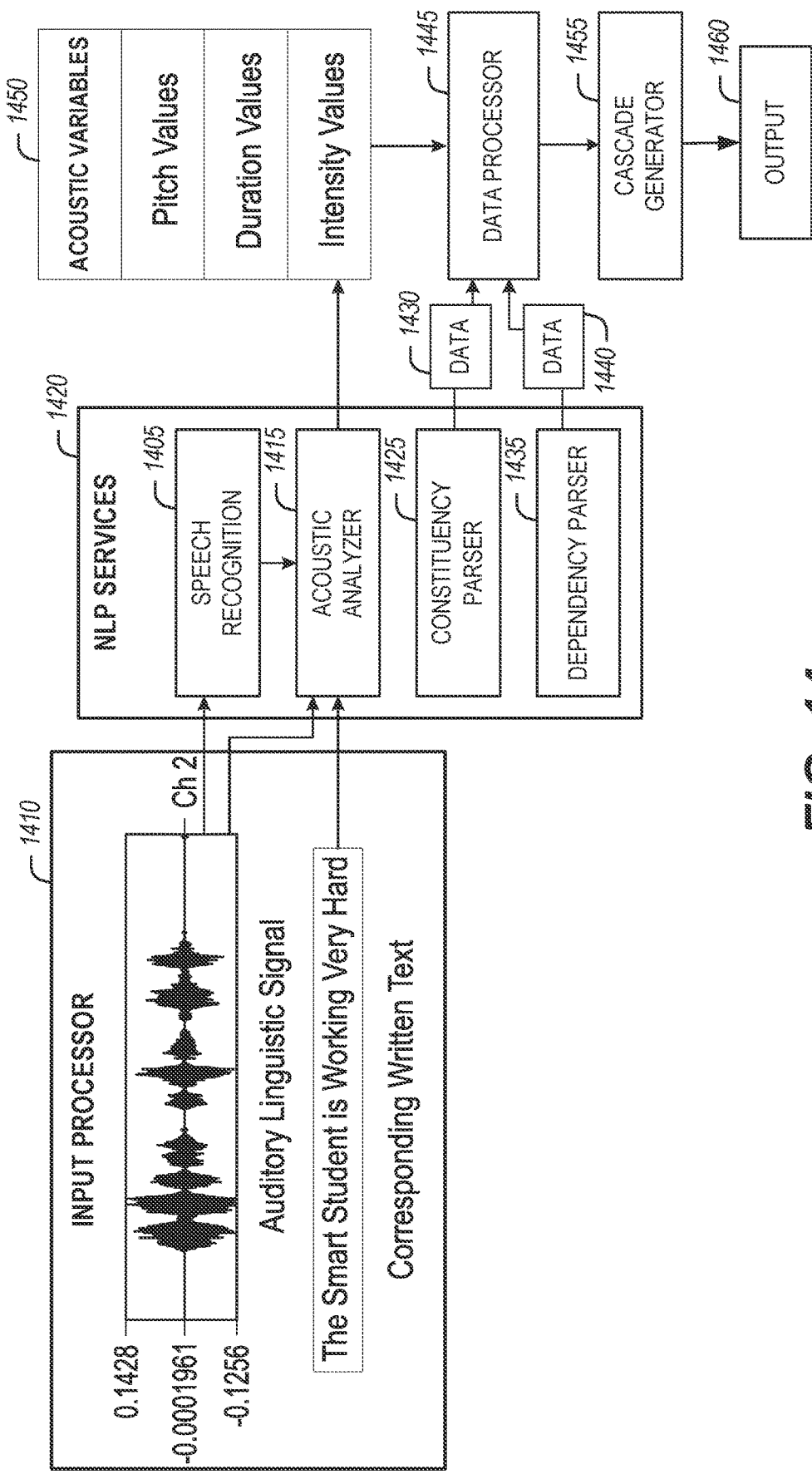
FIG. 14 illustrates a data flow diagram of system components for acoustic-based linguistically-driven automated text formatting, according to an embodiment.

FIG. 14 illustrates a data flow diagram of system components for acoustic-based linguistically-driven automated text formatting, according to an embodiment. Specifically, this drawing shows the use of an input processor 1410 to produce an auditory linguistic signal (e.g., a signal from a recording of an audio segment of human-spoken words) and corresponding written text (e.g., the sentence, "The smart student is working very hard.") for analysis.

In an example, the analysis of the auditory or textual information is performed among one or more NLP services 1420. Here, four NLP services are depicted: speech recognition engine 1405, acoustic analyzer 1415, constituency parser 1425, and dependency parser 1435. In the various embodiments discussed among FIGS. 15 to 21, different implementations are discussed for aspects of cascading based on speech-to-text, auditory information alone, or combinations of speech, text (analyzed via the constituency parser 1425 or dependency parser 1435), and auditory information. Thus, the NLP services 1420 may help generate cascades from scenarios where speech only is provided, where speech is concurrently converted into text, where speech is matched with known text, or when no acoustic information is provided.

As will be appreciated, in many settings, the dependency parser 1435 alone cannot identify linguistic constituents. While the constituency parser 1425 and the acoustic analyzer 1415 can identify constituents, they alone cannot identify specific linguistic relationships that may guide indentations. Hence, in some examples, acoustic-based linguistically-driven text formatting relies on assembling outputs from the NLP services into a Language Model, which links constituent, dependency, and acoustic information together. In the case of the dependency parser, dependency relations are assigned to words, and not to constituents.

The language model (e.g., the acoustic language model 1530 in FIG. 15, and similar language models referred to in FIGS. 15 to 21) links a full constituent with the specific dependency associated with the head of that constituent (e.g., as shown in the parse trees discussed above). For example, the head of a constituent, XP, is the X; viz., the head of a noun phrase (NP) is the noun (N), the head of a prepositional phrase (PP) is the preposition (P). The dependency associated with the head of core arguments and non-core dependents is used to trigger horizontal displacement. The dependency parser (e.g., the dependency parser 1435 as described in FIG. 14, etc.) generates dependency output (e.g., the dependency data 1440 as described in FIG.

14, etc.) that provides dependencies for words in the text. A core-argument and non-core dependent selector (e.g., the core-argument and non-core dependent selector 440 as described in FIG. 4B, etc.) receives constituency output (e.g., the constituency data 1430 as described in FIG. 14, etc.) from the constituency parser (e.g., the constituency parser 1425 as described in FIG. 14, etc.) and the dependency output and selects dependencies related to the constituents to generate the linguistic structure (e.g., the acoustic language model 1530 as described in FIG. 15, etc.).

The language model also includes acoustic information related to specific words or constituents. This may include quantification of pauses, pitch and intensity values, and the relationships between these values calculated over words or constituents within a speech segment. For example, for the phrase 'the popular novelist' in FIGS. 7A and 7B, the language model will include i) a definition of the constituent as an NP as derived from the constituency parser; ii) a definition of the grammatical relation it holds within the sentence as derived from the dependency parser; and iii) acoustic information describing the pitch contour over the constituent (i.e., if it is rising, falling, or generally flat). Cascade rules make use of all or some of this information to determine the final shape of the cascade.

An alternative embodiment may include only a dependency parser, but also requires additional rules that define linguistic constituents (e.g., phrase structure rules). Such rules do not have to comprise a computationally implemented parser, but may include any collection of rules based on linguistic theory that describes constituents. This includes, but is not limited to, heuristics for identifying constituents based on keywords (e.g., prepositions, subordinating clause markers (viz., that, which, who), clause conjunctions (viz., either, but, and), and other single-word indicators of phrase structure. In acoustic-based linguistically-driven text formatting, acoustic information may be used to delimit constituents via pauses, vowel lengthening, and pitch excursions, according to the methods discussed herein.

Figure 15:
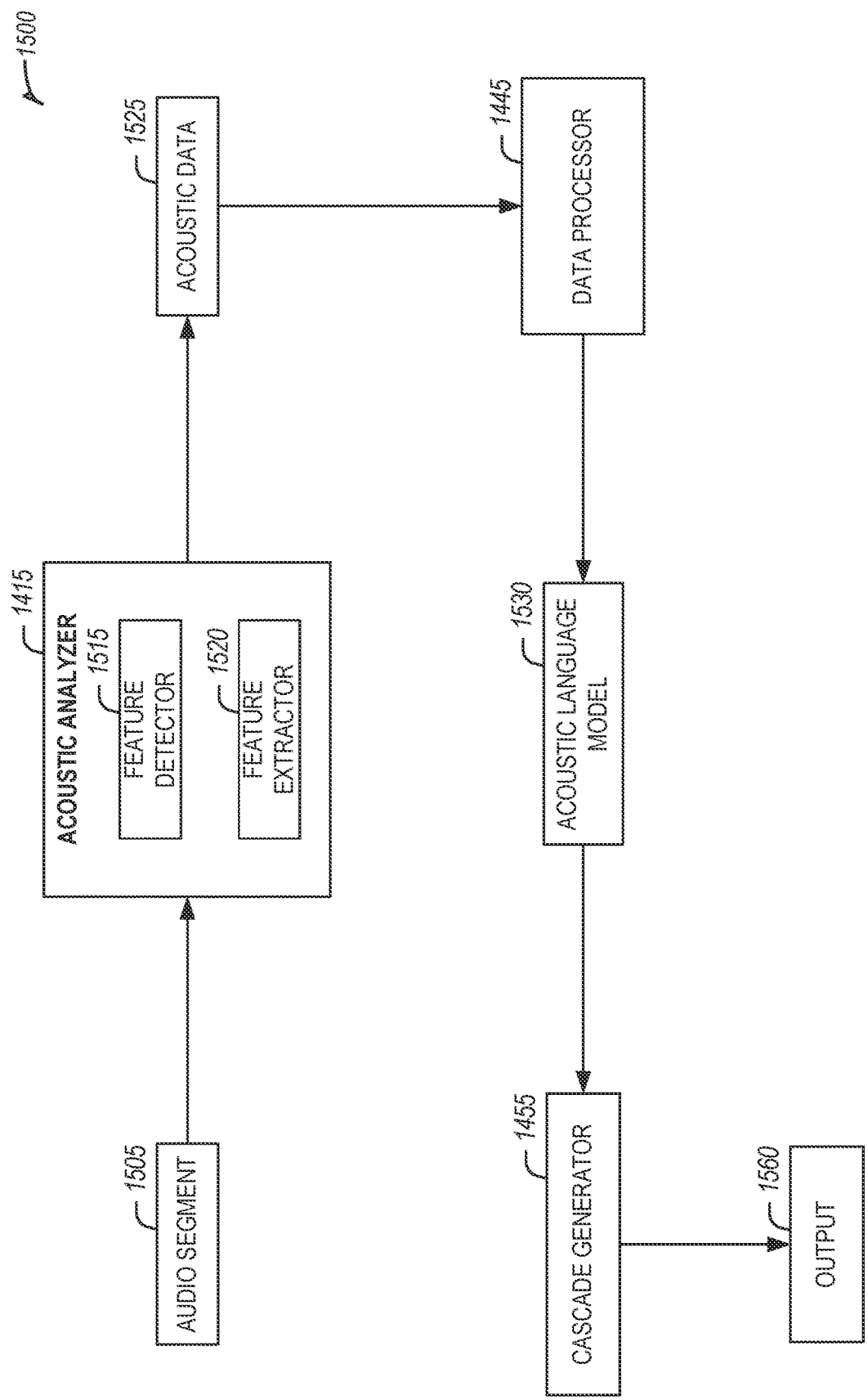
FIG. 15 illustrates a data flow diagram for acoustic feature extraction and linguistically-driven automated text formatting based on analysis of the acoustic features, according to an embodiment.

FIG. 15 illustrates an example of a system 1500 for audio feature extraction and linguistically-driven automated text formatting based on analysis of the audio features with an acoustic model, according to an embodiment. The system 1500 may provide features as described in FIGS. 1 to 3, 4A to 4B, 5 to 6, 7A to 7B, and 8-14. The system 1500 may coordinate a variety of components including an acoustic analyzer 1415 which receives as input an audio segment 1505 and which produces as output acoustical data 1525, a data processor 1445 (e.g., as described in FIG. 14) that may generate an acoustic language model 1530 (e.g., from acoustic properties as shown in FIG. 6) for the audio segment 1505, and a cascade generator 1455 (e.g., as described in FIG. 14) that may take the acoustic language model 1530 as input to produce cascaded output 1460 (e.g., as described in FIG. 14).

The audio segment 1505 may include spoken language, including individual words, sentences, or full texts. Acoustic features in acoustic data 1525, generated by an acoustic analyzer 1415, may include measures of pitch values such as minimum, maximum, and mean F0 (fundamental frequency), measures of pitch change and directional slope, pitch duration and intensity and their fluctuations, measures of segmental and suprasegmental intonational contours, normalized values of such duration and intensity values for words, phrases, or pauses, and the like.

The acoustic analysis engine 1510 may use a variety of components such as a feature detector 1515 and a feature extractor 1520. These constitute another type of NLP service 1420, specialized for speech analysis (e.g., Praat, Smaart, BRP-PACU, WavePad, etc.). The components of the acoustic analysis engine may analyze spoken text present in the audio segment 1505. For example, the analysis may include measures of duration, pitch, and intensity for each word in a sentence of the audio segment 1505. The feature detector 1515 may determine audio features present in the audio segment 1505. By way of example and not limitation, the audio features may include duration of a word in the audio segment 1505, intonations present in the audio segment 1505, pauses in the audio segment 1505, pitch and pitch changes in the audio segment 1505, intensity of portions of the audio segment 1505, and other prosodic features of the audio segment.

The feature extractor 1520 may extract feature attributes for features detected by the feature detector 1515. For example, the feature extractor may convert audio segments to text and may encode or otherwise map features to words output from the audio segment 1505. The output of the feature extractor 1520 may be a set of acoustical data 1525. The set of acoustical data 1525 may be provided as input to the data processor 1445. The data processor 1445 may generate the acoustical language model 1530 for the audio segment. The acoustical language model 1530 may include an encoded model of the words output from the audio segment 1505. For example, the acoustical language model 1530 may include metadata, extensible markup language (XML) tags, or other descriptive data that links acoustical features to words and sentences in textual output of the audio segment 1505.

The acoustical language model 1530 may be provided as input to the cascade generator 1455. The cascade generator 1455 may apply a set of cascade formatting rules to the text output of the audio segment 1505 based on the acoustical features of words included in the text of the audio segment 1505 as indicated by the acoustical language model 1530. Specifically, acoustic features can be used either on their own, or together with the constituency parser 1425, to define constituents. For example, silences between words, and changes in duration, intensity, or pitch slope signal a constituent boundary, triggering a rule of the cascade generator 1455 to insert a line break when generating the output 1560. Constituent boundaries for relative clauses, adverbial phrases, or series of items or events, are signaled by producing phrase-final words with greater pitch variability, and increased duration relative to non-phrase-final words. Additionally, adult readers produce conjuncts followed by commas with greater pitch variability and longer durations compared to the preceding context to form coordinate structures.

Acoustic information may also indicate linguistic dependencies. For example, pitch and intensity changes with respect to preceding material in the audio segment 1505 may trigger indentations. In particular, speakers signal new and important discourse elements, through longer duration, greater intensity and higher pitch. Contrasting information can be signaled by changes in overall intonational contours, as speakers generally produce a new or preferred alternative with greater pitch variability, greater intensity, and longer duration than the given or dispreferred alternative.

Figure 16:
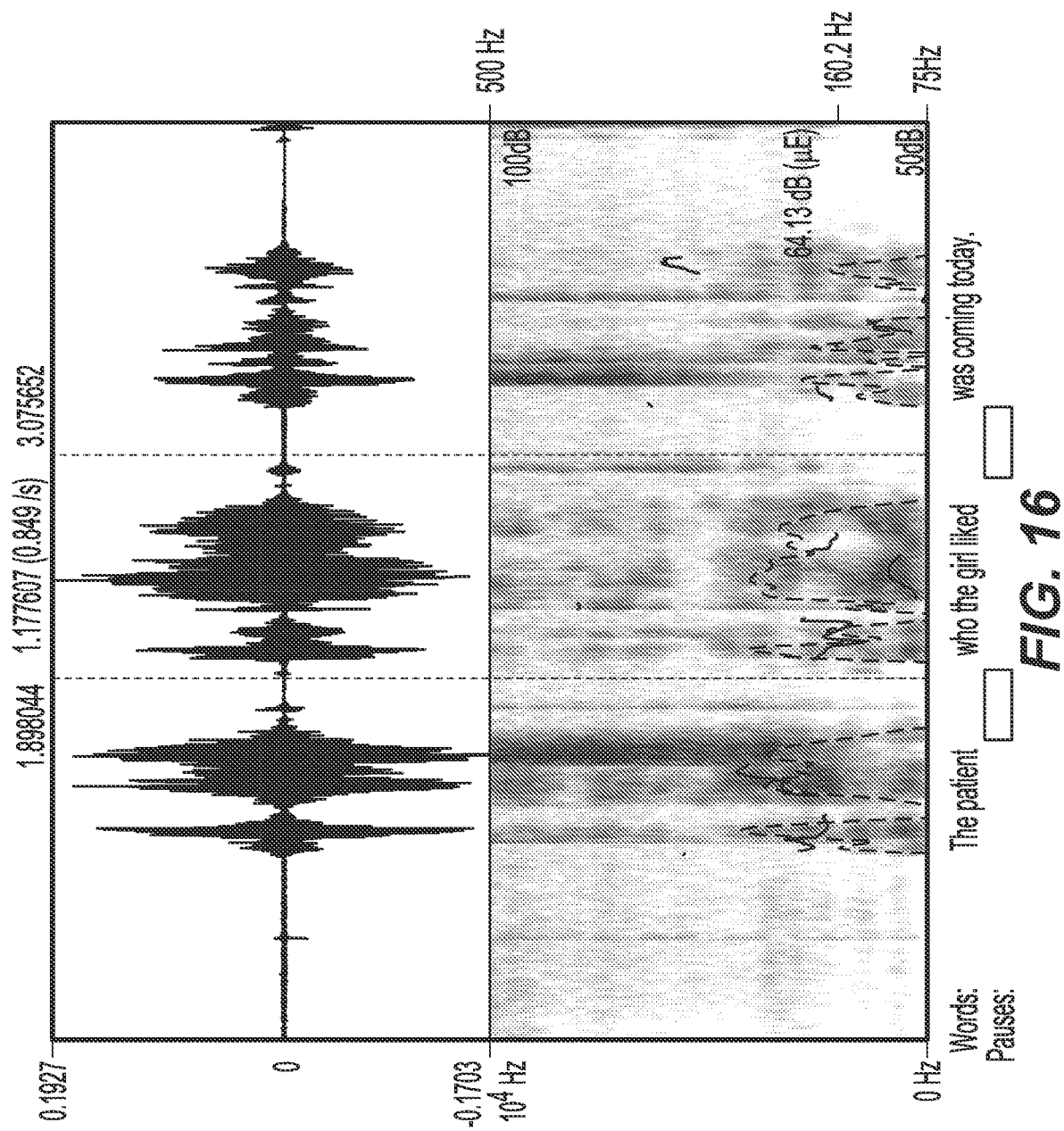
FIG. 16 illustrates a waveform and spectrogram for the analysis of another sentence, according to an embodiment.

Dependency relationships thus may be identified via the acoustic analyzer 1415, through comparing acoustic variables associated with identified constituent segments. FIG. 16 illustrates a waveform and spectrogram for the analysis of the sentence "The patient who the girl liked was coming today", and FIG. 17 illustrates acoustic properties captured from this waveform. These acoustic properties demonstrate how dependencies may be signaled by pitch changes and pause comparisons between constituents. Here, the acoustic data in FIG. 17 shows that the pause established between "who the girl liked" and the other sentence parts signals a dependent relationship between the constituents "The patient" and "was coming today."

Likewise, referring to the acoustic data in FIG. 6, the reduced intensity of 'that the janitor who cleaned in the classroom every night' compared with 'The principal noticed' would signal a dependent relation between these constituents. In a similar manner, as shown in the acoustic data in FIG. 6, the constituent 'left quickly' would be identified as hierarchically higher than the preceding phrase because of the sharp pitch increase compared to previous segments of the sentence. In this example, 'after the last announcement' is preceded by a longer pause compared to previous pauses, signaling a dependency with respect to the previous segment.

Figure 18:
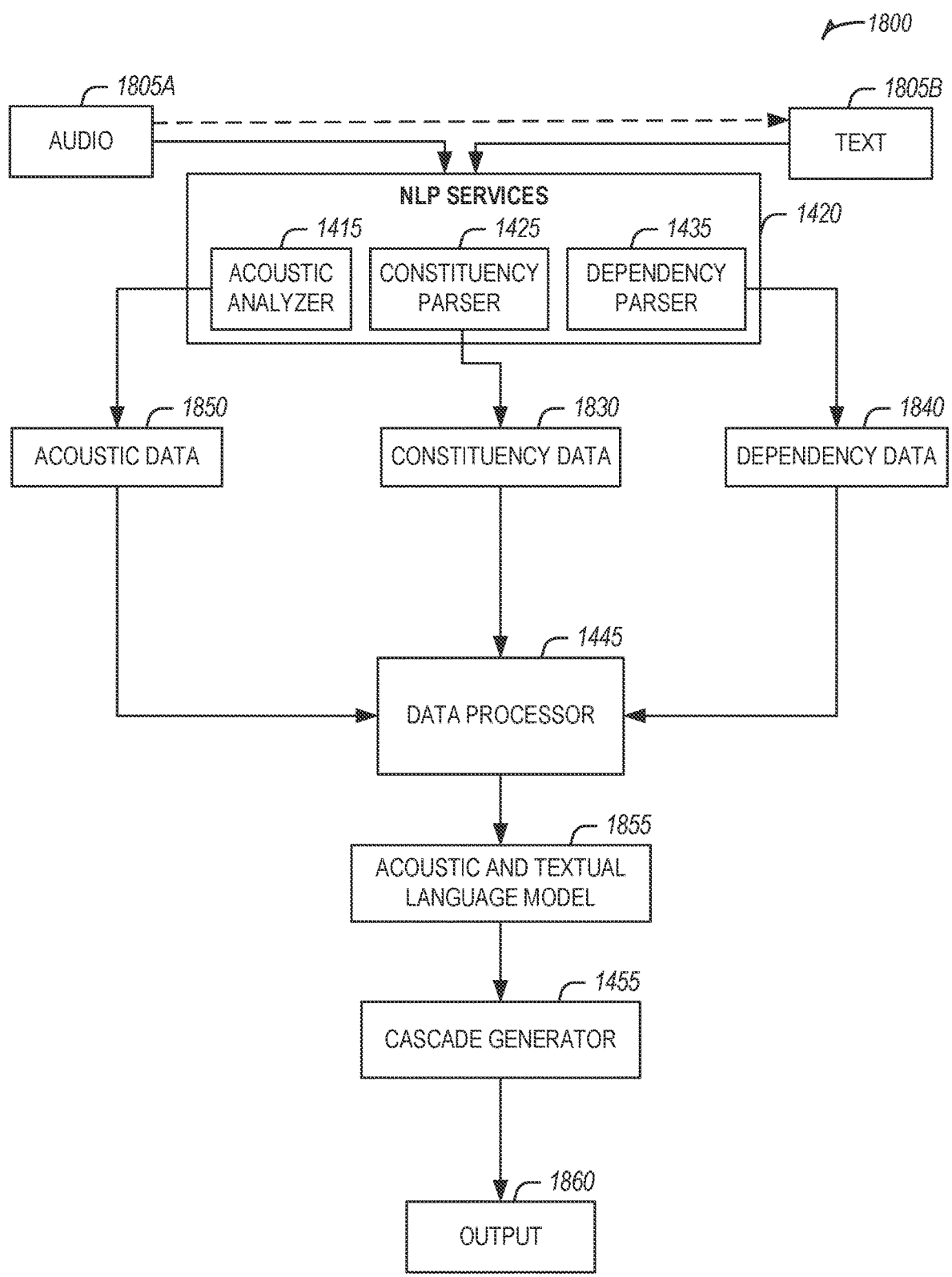
FIG. 18 illustrates another data flow for acoustic-based linguistically-driven automated text formatting of textual output of an audio segment using merged acoustical data and linguistic data, according to an embodiment.

FIG. 18 illustrates an example of a system 1800 and data flow for linguistically-driven automated text formatting of textual output of an audio segment using merged acoustical data and linguistic data, according to an embodiment. The system 1800 may provide features as described in FIGS. 1 to 3, 4A to 4B, 5 to 6, 7A to 7B, and 8-17. The system 1800 specifically provides a more detailed approach for NLP processing than that depicted in FIG. 15, as the system 1800 potentially includes use of the acoustic analyzer 1415 in addition to the constituency parser 1425, and optionally, the dependency parser 1435. The resulting data model is an acoustic and textual language model 1855, in contrast to the acoustic language model 1530 depicted in FIG. 15.

The system 1800 operates NLP services 1420 (e.g., as described in FIG. 14) including: the acoustic analyzer 1415 that may receive audio 1805A as input and output acoustical data 1850; the constituency parser 1425 that may receive the audio 1805A as input (and optionally, text 1805B) and output constituency data 1830 (e.g., similar to constituency data 1430 as described in FIG. 14); and the dependency parser 1430 that may that may receive the audio 1805A as input (and optionally, text 1805B) and output dependency data 1840 (e.g., similar to dependency data 1440 as described in FIG. 14). The system 1800 further includes a data processor 1445 (e.g., as described in FIG. 14) that may receive the acoustical data 1825, constituency data 1830, and the dependency data 1840 as input, to generate an acoustical and textual linguistic model 1810. Finally, the system 1800 includes the cascade generator 1455 that may apply rules to text recognized in the audio 1805A—based on information included in the acoustical and textual linguistic model 1855—to produce cascade output 1860.

The acoustical and textual linguistic model 1855 may include encoded or otherwise descriptive data that links words, sentences, and other elements of the text of the audio 1805A to acoustical and textual linguistic data. For example, the acoustical and textual linguistic model 1855 may include metadata, XML tags, and other information that represents a model data structure for text of the audio 1805A that includes hierarchical and other data that may be used by the cascade generator 1455 to calculate horizontal and vertical placement of elements of the text including words, phrases, punctuation, etc.

There may be variations in cascade formatting provided by acoustical data or constituency/dependency data. By merging the acoustical data and the constituency/dependency data, a robust model may be generated for input audio 1805A that represents features that may be present in the acoustical information, but not the textual information or vice-versa. This enables the model to accurately represent multidimensional elements of language in written and spoken form. The cascade generator 1455, applies rules using the multidimensional data to generate a cascaded output 1860 of text of the audio 1805A in a format that will accommodate the nuances of the spoken word while staying true to linguistic rules of the written word.

Figure 19:
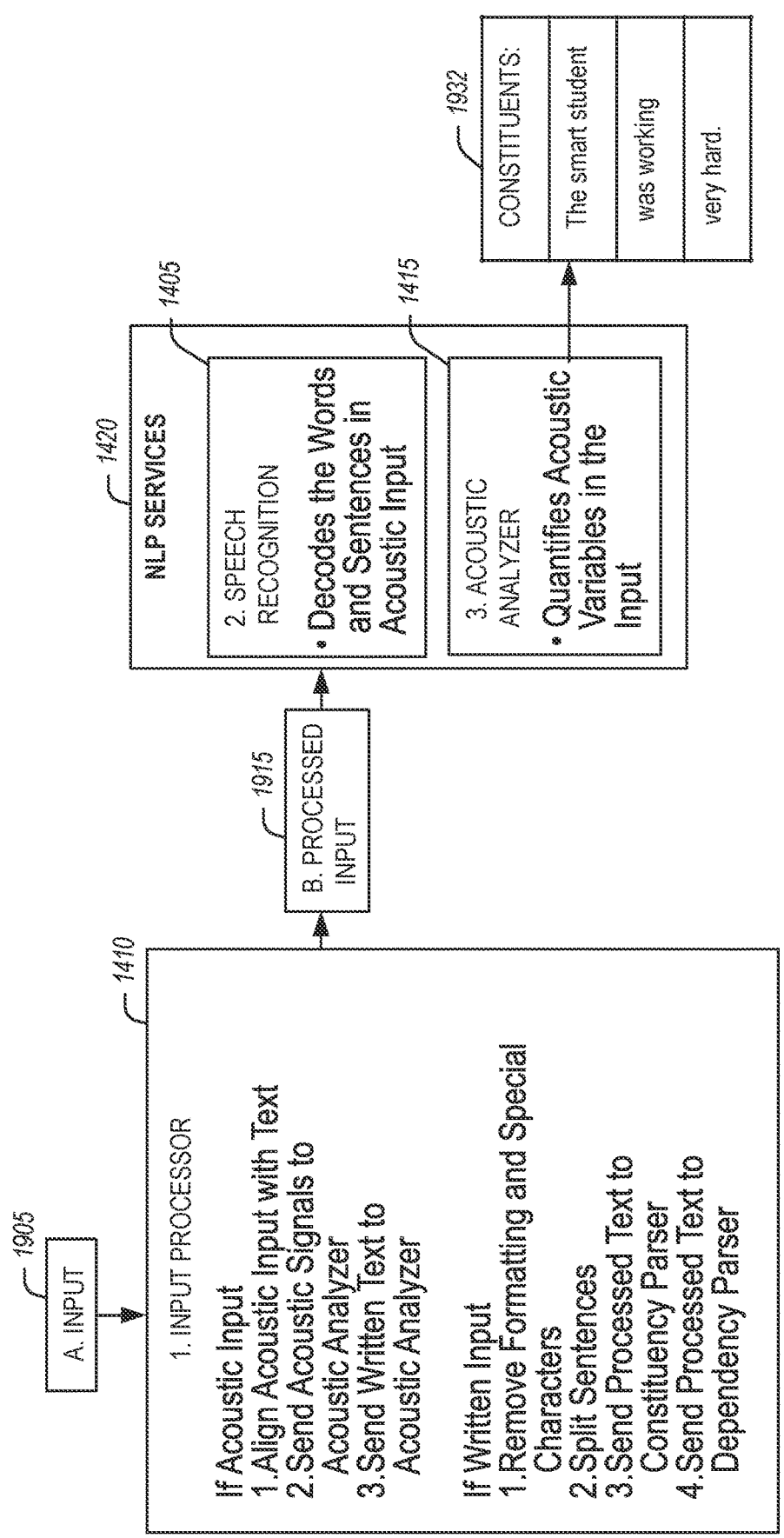
FIG. 19 illustrates a data flow diagram of a system for acoustic-based linguistically-driven automated text formatting, according to an embodiment.
Figure 20:
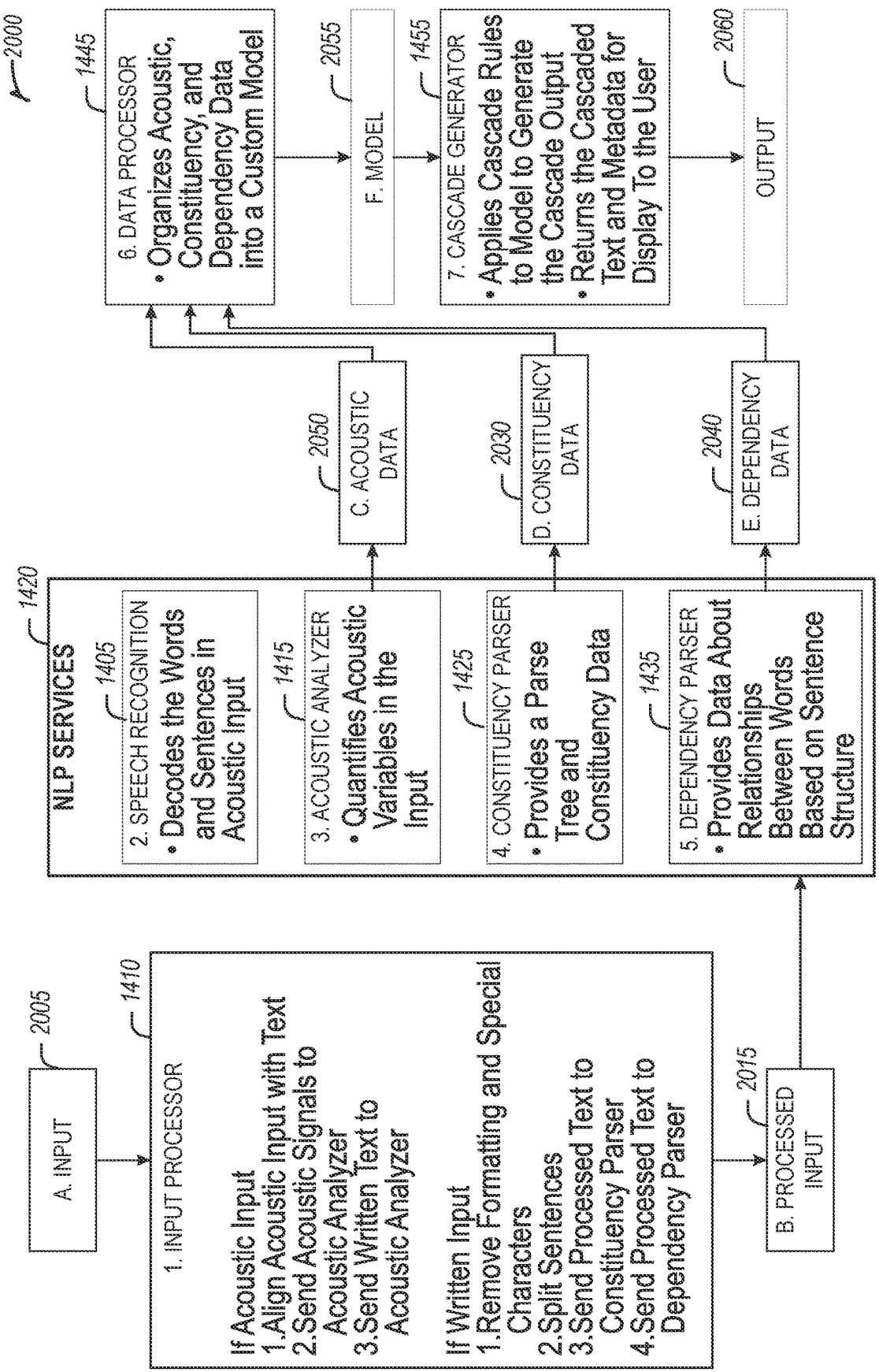
FIG. 20 illustrates a data flow diagram of another system for acoustic-based linguistically-driven automated text formatting, according to an embodiment.
Figure 21:
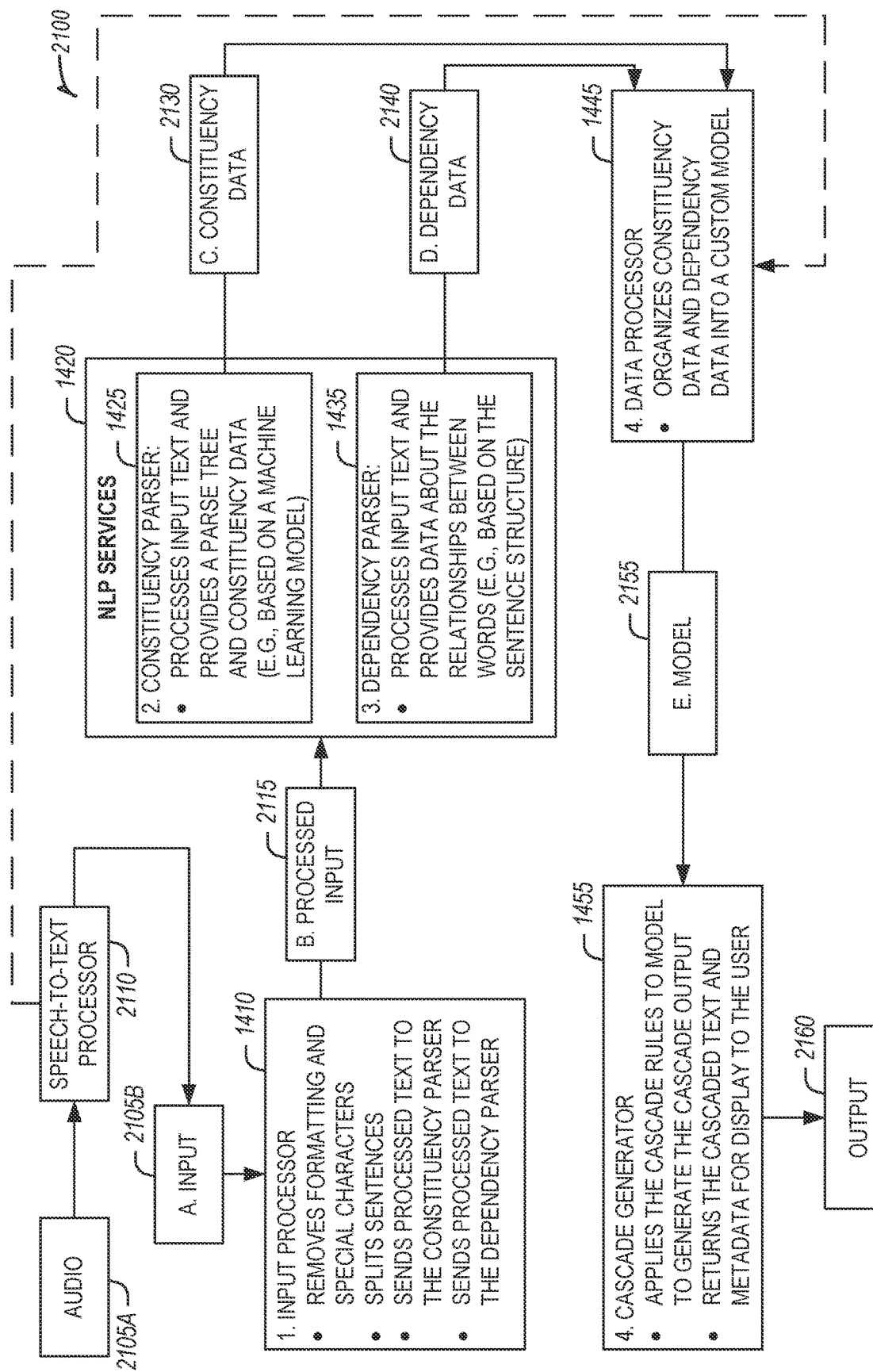
FIG. 21 illustrates a data flow diagram of another system for acoustic-based linguistically-driven automated text formatting, according to an embodiment.

FIGS. 19 to 21 provide further illustration of the input processing operations and the role of the various NLP services discussed above. First, FIG. 19 illustrates a data flow diagram for a system 1900 for acoustic-based linguistically-driven automated text formatting, which produces a listing of constituents 1932 from the speech recognition 1405 and the acoustic analyzer 1415. FIG. 20 illustrates a data flow diagram for a similarly configured system 2000 for acoustic-based linguistically-driven automated text formatting, which produces a model 2055 from use of the speech recognition 1405, acoustic analyzer 1415, constituency parser 1425, and dependency parser 1435. FIG. 21 illustrates a data flow diagram for a similarly configured system 2100 for acoustic-based linguistically-driven automated text formatting, based on speech-to-text features, which produces a model 2155 from use of the constituency parser 1425 and the dependency parser 1435. Each of the systems 1900, 2000, 2100 may provide features as described in FIGS. 1 to 3, 4A to 4B, 5 to 6, 7A to 7B, and 8-16.

A user may provide input 1905, 2005, 2105B that includes acoustic input or written input (text), or both. In an example, the text of written input may be provided as entered text, text captured using OCR processing, text captured via an application or browser plugin, hypertext markup language (HTML), etc. The text may also include visual content, including figures, tables, graphs, pictures, and visually-enhanced text, including headings with font size or style enhancements. Input may also come directly from the user, such that, for example, the user may speak audio of the sentence "The patient who the girl liked was coming today." which is converted using a speech-to-text processor (e.g., processor 2110). Accordingly, this audio can be converted into a text string (or, matched with a known text string), and an input processor 1410 may process the text content to remove formatting and special characters and, in the case of paragraphs, split text into individual sentences.

In the example of FIG. 21, speech-to-text processing is performed on an audio sample in lieu of (or in addition to) processing the acoustic features of the audio sample. The system 2100 may include a variety of components that include a speech-to-text processor 2110 that may receive audio 2105A as input and may output text of corresponding spoken words (similar as performed with the audio 1805A and text 1805B as described in FIG. 18). Accordingly, the input processor 1410 can receive the output text as input 2105B to form processed input 2115.

Processed input 1915, 2015, 2115 (that includes processed text) may be provided by the input processor 1410 to a set of NLP services 1420. For instance, in the examples of FIGS. 20 and 21, the constituency parser 1425 may process the input text and may generate and transmit constituency data 2030, 2130 to the data processor 1445. Such constituency data may include a parse tree (e.g., a constituency parse), a chart of discrete constituents, parts of speech, word lemmas, and metadata.

Example with Acoustic Information Only. In a first example, a system (e.g., system 1900) can perform text cascading, based only on acoustic information, using the following operations. The example refers to the acoustic signal illustrated in FIG. 16 for the sentence "The patient who the girl liked was coming today." And the corresponding acoustic language model in FIG. 17 (first 5 rows).

1. Segment the speech stream into constituents via acoustic analysis. In this case, pauses identify three constituents: "the patient", "who the girl liked" and "was coming today". These are added to the language model.
2. Identify dependent relationships by applying acoustic rules that check for differences in acoustic values between constituents. In this case, note that the phrase "who the girl liked" has a much lower average pitch than the surrounding phrases. Encode these relationships in the Language model by denoting relationships between constituents.
3. Apply cascade rules to the information in the language model to produce the resulting cascade. In this case, a single embedding is indicated by the reduced pitch of the middle constituent and that entire constituent is indented. This produces the result in the following TABLE 1:

TABLE 1

| The patient |
| who the girl liked |
| was coming today. |

Returning to the system of FIG. 19, constituency information may be processed by the acoustic analyzer 1415, which includes segments corresponding to constituents, together with their associated acoustic features. The acoustic processor will use pauses, vowel elongations, and pitch changes to identify constituents that can become part of a language model (e.g., model 1530). For instance, referring to the example of FIGS. 5 and 6, a constituent 'The principal noticed' is denoted by the pause at time 2.5386 sec into the utterance (e.g., as shown in FIG. 6), a constituent 'that the janitor' is identified by the rising pitch over 'janitor' with a shifted pitch slope marking a new constituent 'who cleaned in the classroom' which is pronounced with decreasing pitch over the segment. The following constituent 'every night' is marked by a pitch increase and a subsequent pause, and then a final constituent marked by lower intensity and deemphasized pitch.

Example with Acoustic Information and Constituency Information from Constituency Parser. In a second example, the systems (e.g., system 2000, 2100) can perform text cascading, based on acoustic information and with a constituency parser, using the following operations. The same sentence from the above example is used in FIGS. 16 and 17).

1. Segment the speech stream into constituents via acoustic analysis. In this case, pauses identify three constituents: "the patient", "who the girl liked" and "was coming today".
2. Parse the corresponding text with a constituency parser to extract constituents. In this case, identify the constituents "the patient", "who the girl liked", "was coming", "today". The constituency parser gives the associated grammatical trees for each constituent, including X-bar denotations. X-bar denotations allow identifying subconstituents of longer phrases identified by the acoustic analyzer (i.e., 'who the girl' and 'liked' and 'was coming' and 'today'.) Elaborate the acoustic-based constituents in the language model with this additional information (e.g., as shown in FIG. 17, rows 6-9).
3. Identify dependent relationships by applying acoustic rules that check for differences in acoustic values between constituents. In this case, the constituents are further divided, so finer grained analysis of the acoustic data for each constituent can be done. In this case, identify dependent relationship between 'who the girl' and 'liked' based on pitch excursion before 'liked' and between 'was coming' and 'today' based large pitch change between constituents.
4. Apply cascade rules to the information in the language model to produce the resulting cascade. In this case, the rules from the previous example are augmented with the new information that 'who the girl' and 'liked' are separate constituents. Since the constituency parser identifies them as subject and verb, apply the rule that a line-break occurs after a subject, with subjects and predicates aligned. The constituency information further supports the analysis from the acoustic analyzer by verifying that 'the patient' and 'was coming' are related subject and predicates, so these are also aligned as above. This produces the result in the following TABLE 2:

TABLE 2

| The patient |
| who the girl |
| liked |
| was coming |
| today. |

Example with Acoustic Information, Constituency Information from Constituency Parser, and Dependency Information from Dependency Parser. In a third example, the systems (e.g., system 2000, 2100) can perform text cascading, based on acoustic information and with an acoustic analyzer, constituency and dependency parsers, using the following operations. The same sentence from the above example is used in FIGS. 16 and 17.

1. and 2. Steps 1 and 2 are identical to those discussed above for Constituency Information.
3. Parse the corresponding text with a Dependency parser to identify dependencies among words. The output is shown below; this is added into the Language Model as an elaboration on each word in the constituency parse.

TABLE 3

| The | det |
| patient | nsubj |
| who | obj |
| the | det |
| girl | nsubj |
| liked | acl:relcl |
| was | aux |
| coming | root |
| today | obl:tmod |

4. Compare the set of dependencies identified by the Dependency parser to those that influence horizontal positioning. Notice that only 'nsubj', 'obj', 'acl:relcl', and 'obl:tmod' trigger indentations, others are ignored.

5. Identify the entire constituent (defined by the constituency parser) associated with each dependency relationship. This produces the result:

TABLE 4

The patient
who
the girl
liked
was coming
today

6. Apply cascade rules as required for each dependency relation. Note that in this case, the dependency parser interprets the structure of the 'who the girl' constituent as 'who' being the direct object 'obj' of 'liked'. Hence, the indentation rules indent who with respect to 'liked' by one additional step because 'who' is a dependent of liked.
This produces the result:

TABLE 5

The patient
who
the girl
liked
was coming
today.

Returning to the system of FIGS. 20 and 21, the constituency parser 1425 may generate the constituency data 2030, 2130 based only on the linguistic analysis of the text string. In an example, the constituency data for the sentence "The patient who the girl liked was coming today." is shown in the following TABLE 6.

TABLE 6

```
{
  "class_probabilities": [[1.0, 1.8036938609355957e-10, 8.350951190055824e-15, ...]],
  "hierplane_tree": {
    "linkNameToLabel": { "VB": "pos", "VBD": "pos", "VBG": "pos", ...},
    "nodeTypeToStyle": { "ADD": ["color0"], "ADJP": ["color5"], ...},
    "root": {
      "attributes": ["S"],
      "children": [
        {
          "attributes": ["NP"],
          "children": [...],
          "link": "VP",
          "nodeType": "VP",
          "word": "was coming today"
        },
        ...
      ],
      ...
    },
    "text": "The patient who the girl liked was coming today ."
  },
  "num_spans": 55,
  "pos_tags": ["DT", "NN", "WP", "DT", "NN", "VBD", "VBD", "VBG", "NN", "." ],
  "spans": [[ 0, 0 ], [ 0, 1 ], [ 0, 2 ], [ 0, 3 ], ...],
  "tokens": ["The", "patient", "who", "the", "girl", "liked", "was", "coming", "today", "."],
  "trees": "(S (NP (NP (DT The) (NN patient)) (SBAR (WHNP (WP who)) (S (NP (DT the) (NN girl))
(VP (VBD liked))))) (VP (VBD was) (VP (VBG coming) (NP (NN today)))) (..))"
}
```

The processed input 2015, 2115 that includes processed text may be transmitted by the input processor to a dependency parser 1435 of the NLP services 1420. The dependency parser 1435 may process the input text and may generate and transmit dependency data 2040, 2140, which provides data about dependency relationships between words to the data processor 1445. The dependency data 2040, 2140 may include a parse tree or directed graph, describing dependent children embedded under a root note with additional hierarchical embeddings (e.g. as shown in the dependency examples discussed above), tokens, dependency labels, and metadata.

In an example, the dependency parser 1435 may generate dependency data 2040, 2140 for "The patient who the girl liked was coming today." in the format shown in the following TABLE 7.

TABLE 7

```
"stanza" : [
{
  "lemma" : "the",
  "feats" : "Definite=Def|PronType=Art",
  "deprel" : "det",
  "head" : 2,
  "misc" : "start_char=0|end_char=3",
  "xpos" : "DT",
  "id" : 1,
  "text" : "The",
  "upos" : "DET"
},
{
  "lemma" : "patient",
  "feats" : "Number=Sing",
  "deprel" : "nsubj",
  "head" : 8,
  "misc" : "start_char=4|end_char=11",
```

TABLE 7-continued

```
    "id" : 2,
    "xpos" : "NN",
    "upos" : "NOUN",
    "text" : "patient"
},
{
    "lemma" : "who",
    "feats" : "PronType=Rel",
    "head" : 6,
    "deprel" : "obj",
    "misc" : "start_char=12|end_char=15",
    "id" : 3,
    "xpos" : "WP",
    "text" : "who",
    "upos" : "PRON"
},
{
    "lemma" : "the",
    "feats" : "Definite=Def|PronType=Art",
    "deprel" : "det",
    "head" : 5,
    "misc" : "start_char=16|end_char=19",
    "upos" : "DET",
    "text" : "the",
    "id" : 4,
    "xpos" : "DT"
},
{
    "feats" : "Number=Sing",
    "lemma" : "girl",
    "xpos" : "NN",
    "id" : 5,
    "text" : "girl",
    "upos" : "NOUN",
    "misc" : "start_char=20|end_char=24",
```

TABLE 7-continued

```
    "deprel" : "nsubj",
    "head" : 6
},
{
    "xpos" : "VBD",
    "id" : 6,
    "upos" : "VERB",
    "text" : "liked",
    "head" : 2,
    "deprel" : "acl:relcl",
    "misc" : "start_char=25|end_char=30",
    "feats" : "Mood=Ind|Tense=Past|VerbForm=Fin",
    "lemma" : "like"
},
{
```

In the scenarios of FIGS. 20 and 21, the data processor 1445 may generate a model 2055, 2155 using the constituency data 2030, 2130 respectively and the dependency data 2140, 2150 respectively, and information from any other NLP services. Thus, the model 2055, 2155 may include parts of speech, word lemmas, a constituent parse tree, a chart of discrete constituents, a list of named entities, a dependency graph, a list of dependency relations, table of acoustic features, linked coreference table, linked topic list, output of sentiment analysis, semantic role labels, entailment-referenced confidence statistics.

In an example, the data processor 1445 may generate the model 2055, 2155 for "The patient who the girl liked was coming today." as shown in the following TABLE 8. Acoustic properties, while not expressly shown in this table, may also be included.

TABLE 8

```
{
    "pos_tags" : ["DT", "NN", "WP", "DT", "NN", "VBD", "VBD", "VBG", "NN", "."],
    "tokens" : ["The", "patient", "who", "the", "girl", "liked", "was", "coming",
"today", "."],
    "root" : {
        "link" : "S",
        "children" : [
            {
                "attributes" : ["NP"],
                "word" : "The patient who the girl liked",
                "children" : [...],
                "link" : "NP",
                "nodeType" : "NP"
            },
            ...,
            {
                "constituency_pos" : ".",
                "previous_constituency_pos" : "NN",
                "dependency" : "punct",
                "attributes" : ["."],
                "dependency_pos" : "PUNCT",
                "word" : ".",
                "nodeType" : ".",
                "previous_dependency" : "tmod",
                "link" : "."
            }
        ],
        "nodeType" : "S",
        "word" : "The patient who the girl liked was coming today .",
        "attributes" : ["S"]
    },
    "trees" : "(S (NP (NP (DT The) (NN patient)) (SBAR (WHNP (WP who)) (S (NP
(DT the) (NN girl))
(VP (VBD liked))))) (VP (VBD was) (VP (VBG coming) (NP (NN today)))) (..))",
    "dependencies" : ["dep", "nsubj", "prep", "det", "nsubj", "dep", "cop", "root",
"tmod", "punct"],
    "pos" : ["DET", "NOUN", "PRON", "DET", "NOUN", "VERB", "AUX", "VERB",
"NOUN", "PUNCT"]
}
```

In the examples of FIGS. 20 and 21 the models 2055, 2155 may be processed by a cascade generator 1455. The cascade generator 1455 may apply cascade rules to the model to generate cascaded output (e.g., output 2060, 2160). Cascade rules are operations that are triggered for execution based on detection of specific constituents, dependencies, or acoustic features or relationships in the parsing output. The operations executed by the cascade rules may include determining whether a line break should be inserted into output, an indent level for a line of text, and other output generation operations that create cues for a user.

In an example, the cascade rules may be used to generate a text model that includes data identifying the placement of indentations and line breaks in text output to be displayed on a display device. The cascade generator 1455 may return the cascaded text and metadata in the cascaded output. For example, the cascade generator 1455 may generate cascaded output using cascade rules as shown in the various examples above.

Figure 22:
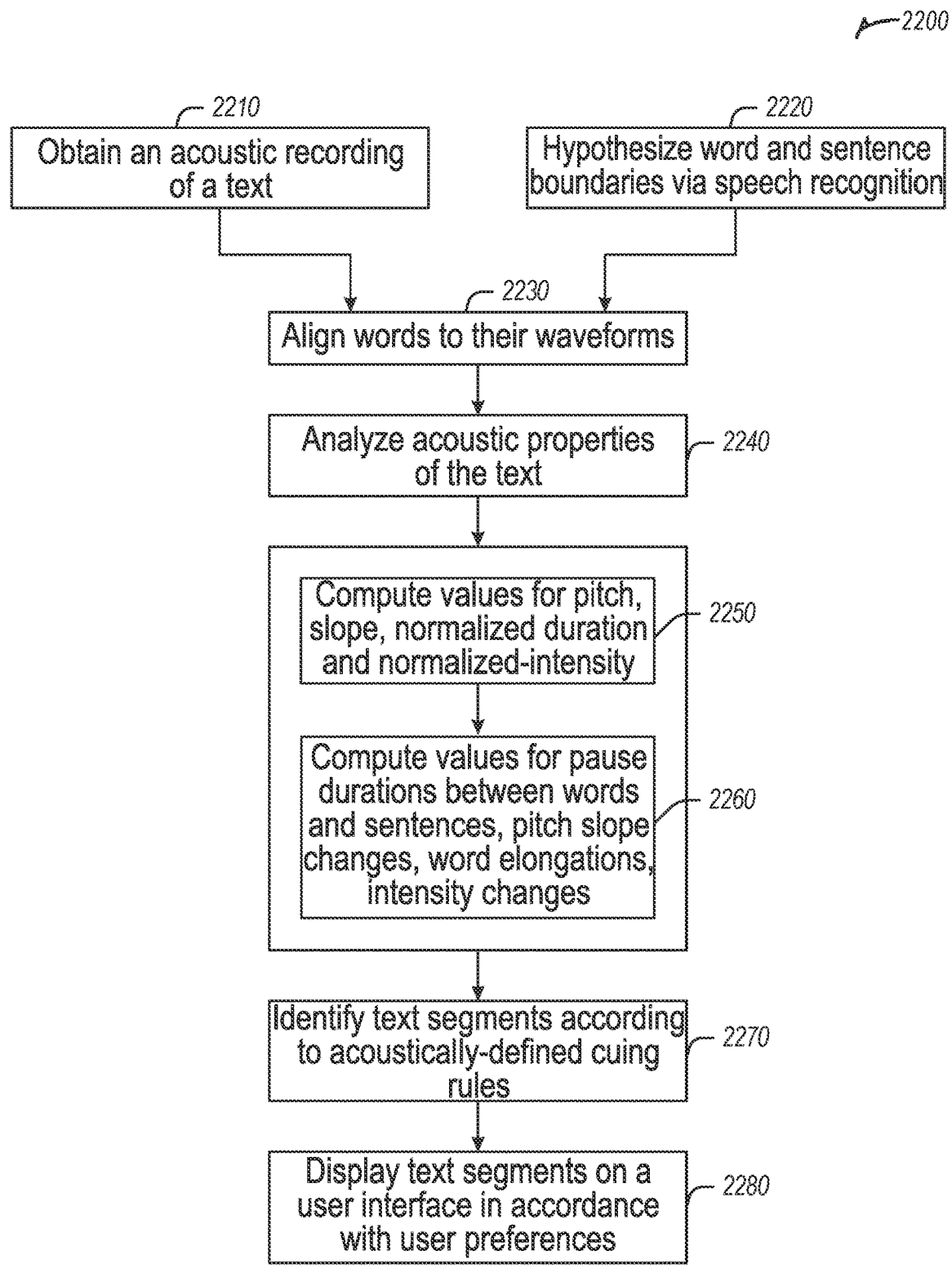
FIG. 22 illustrates an example of a method for acoustic-based linguistically-driven automated text formatting, according to an embodiment.
Figure 23:
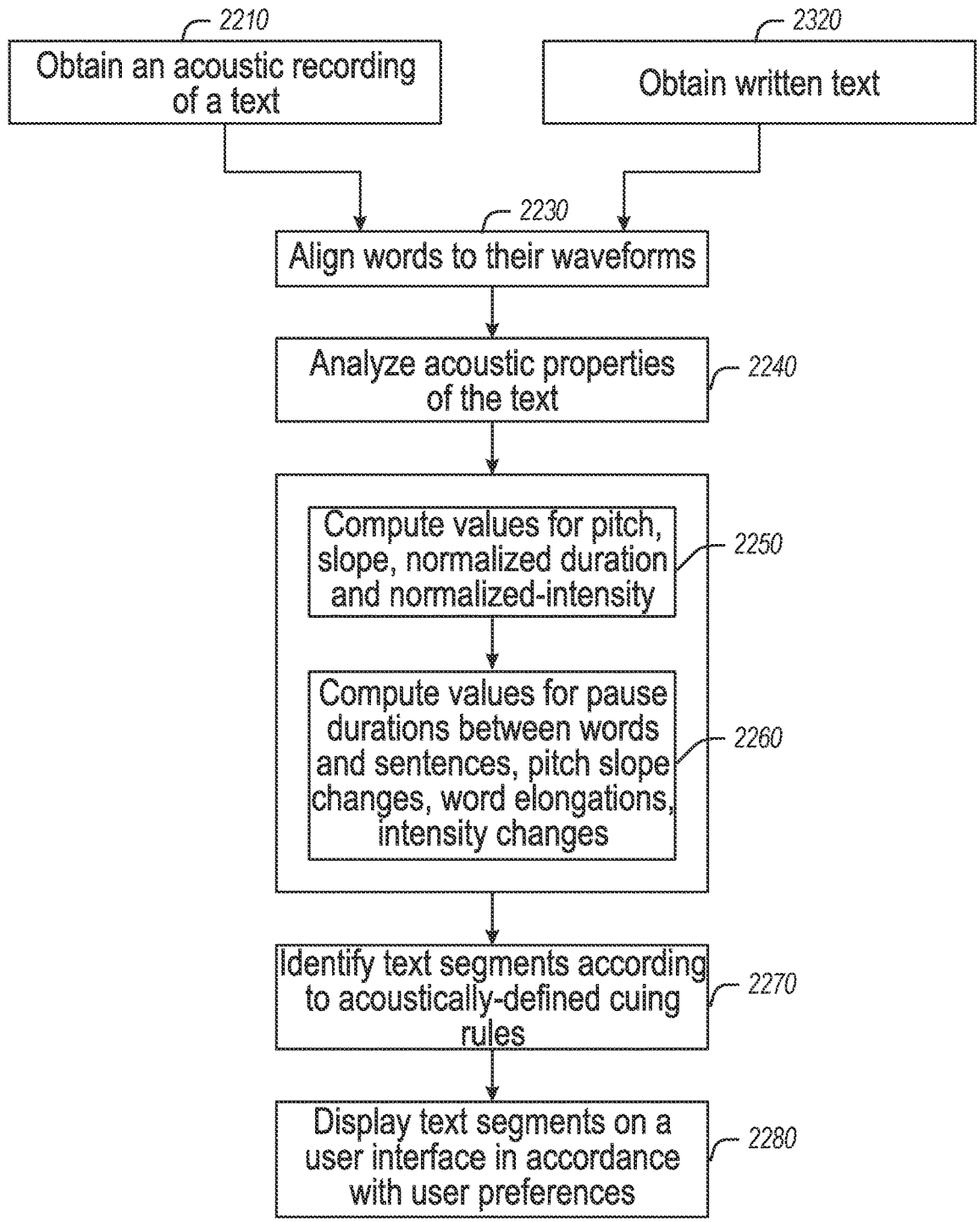
FIG. 23 illustrates a flowchart of another method for acoustic-based linguistically-driven automated text formatting, according to an embodiment.

FIG. 22 illustrates a flowchart of an example method 2200 for acoustic-based linguistically-driven automated text formatting, and FIG. 23 illustrates a flowchart of another example method 2300 for acoustic-based linguistically-driven automated text formatting. Each of the methods 2200, 2300 may provide features as described in FIGS. 1 to 3, 4A to 4B, 5 to 6, 7A to 7B, and 8-21.

Here, the methods 2200, 2300 begin with an operation 2210 to obtain an acoustic recording of a text. The text itself is identified in method 2200 by performing speech recognition on the recording at operation 2220, which produces the text and also is used to hypothesize word and sentence boundaries. The text itself is identified in method 2300 by obtaining the written text from some data source. The acoustic recording and the written text is processed at operation 2230 to align words to their waveforms.

Next, operation 2240 is performed to analyze acoustic properties of the text, including acoustic properties identified or derived from individual words, phrases, and sentences, and acoustic events such as pauses. Specific values of the acoustic properties that may be identified for individual words include, at operation 2250, to compute values for pitch, slope, normalized duration, and normalized intensity (e.g., on a per-word basis). Specific values of the acoustic properties that may be identified for sentences include, at operation 2260, to compute values for pause duration between words and sentences, pitch slope changes, word elongations, intensity changes (e.g., on a per-clause, per-phrase, per-sentence basis).

The acoustic properties are used, at operation 2270, to identify one or more segments of the text (and, relationships of the text) according to acoustically-defined cuing rules. Finally, these identified segments, identified relationships, and other derived acoustic properties are used at operation 2280, to display text segments in a user interface as a cascade, in accordance with user preferences.

Figure 24:
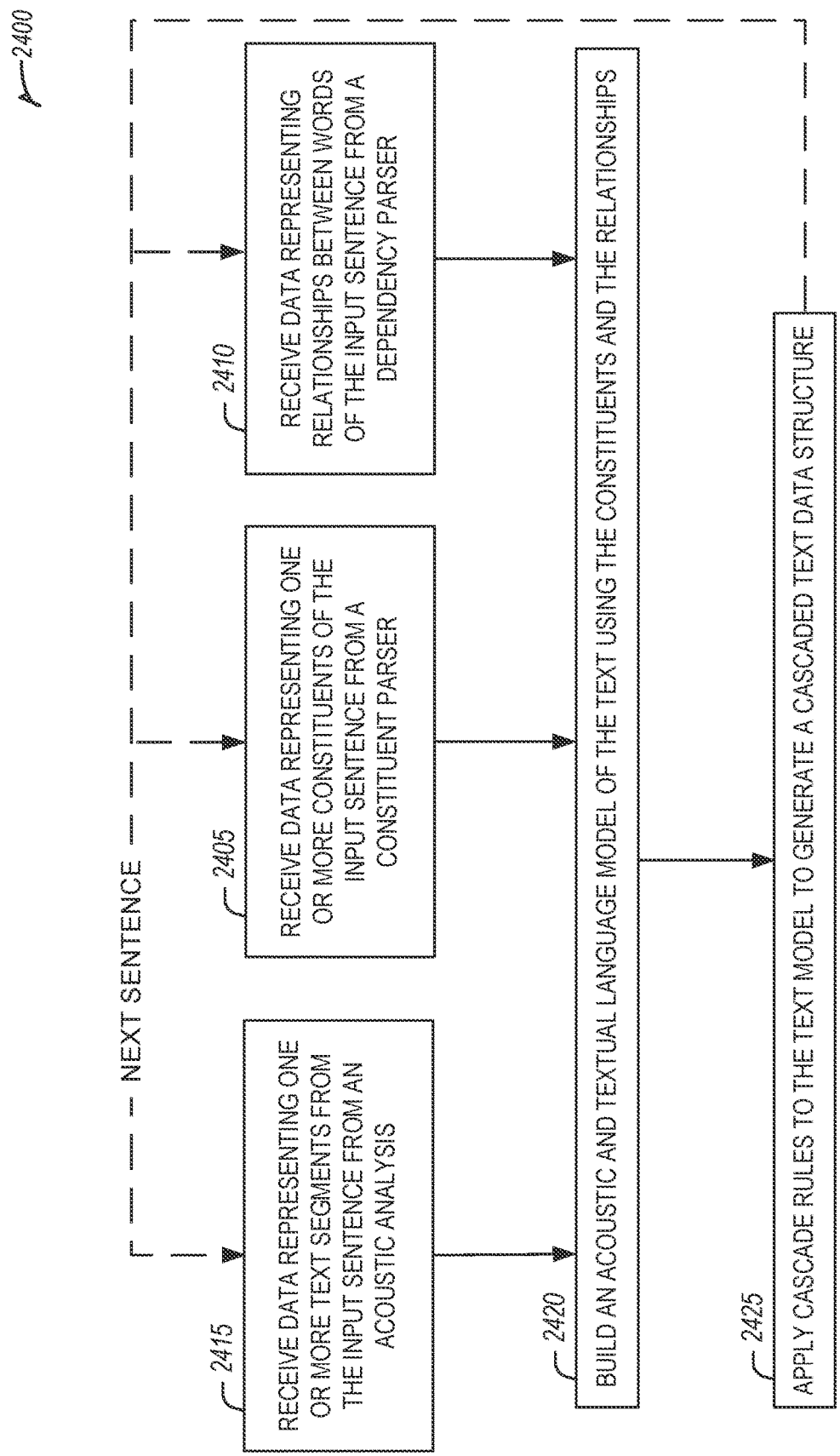
FIG. 24 illustrates a flowchart of a data processing method for acoustic-based linguistically-driven automated text formatting, where the corresponding written text is supplied, according to an embodiment.

FIG. 24 illustrates a flowchart of a data processing method for acoustic-based linguistically-driven automated text formatting, where the corresponding written text is supplied, according to an embodiment. The method 2400 may provide features as described in FIGS. 1 to 3, 4A to 4B, 5 to 6, 7A to 7B, and 8-23.

At operation 2405, data representing one or more constituents of the input sentence may be received from a constituency parser (e.g., the constituency parser 1425 as described in FIG. 14, etc.). The data representing one or more constituents may be generated based on an evaluation of the input sentence using the constituency parser. In an example, the constituency parser may identify constituents of the sentence. In an example, a constituent may be a word or a group of words that function as a single unit within a hierarchical structure.

At operation 2410, data representing relationships between words of the input sentence may be received from a dependency parser (e.g., the dependency parser 1435 as described in FIG. 14, etc.). The relationships may be based on the sentence structure and may be derived based on evaluation of the input sentence using the dependency parser. In an example, a dependency may be a one-to-one correspondence so that for an element in the input sentence there is exactly one node in the structure of the input sentence that corresponds to the element.

At operation 2415, data representing one or more text segments is received from the input sentence from an acoustic analysis (e.g., by the acoustic analyzer 1415 as described in FIG. 14, etc.) of audio of a speaker uttering the input sentence. In an example, the data includes acoustic properties derived from analysis of the utterance by the acoustic analyzer. For example, the acoustic properties may include, but are not limited to pauses, pitch, pitch intensity, pitch changes (e.g., slope, etc.), etc.

At operation 2420, an acoustic and textual language model (e.g., the acoustic and textual language model 1855 as described in FIG. 18, etc.) may be built (e.g., by the input processor 1410 as described in FIG. 14, etc.) using the constituents and the dependency relationships (e.g., as shown in FIG. 4B, etc.) and the acoustic properties (e.g., as shown in FIG. 6, etc.). In an example, the acoustic and textual language model may be further elaborated by linguistic features produced by additional NLP-Services, including by example but not limitation, coreference information, sentiment tracking, named entity lists, topic tracking, probabilistic inference evaluation, prosodic contours, and semantic analysis.

At operation 2425, cascade rules may be applied (e.g., by the cascade generator 1455 as described in FIG. 14, etc.) to the acoustic and textual language model to generate a cascaded text data structure. In an example, the cascaded text data structure comprises text and metadata specifying display parameters for the text based on the constituent data, dependency data, and acoustic data defined in the acoustic and textual language model. In an example, the cascade text data structure comprises a file (e.g., an extensible markup language (XML) file, etc.) organized according to a schema (e.g., an XML schema, etc.). In an example, the schema comprises a specification for components and arrangement of the components in the file. In an example, the acoustic and textual language model may be a data structure that describes acoustic data and constituents and dependencies of words included in the input sentence. In an example, the acoustic and textual language model may be a data structure including a parse tree, parts of speech, tokens, constituent chart, dependencies and acoustic properties for the text. In an example, the cascade rules comprise formatting rules that create line breaks and indents defined corresponding to acoustic data and constituents and dependencies.

In an example, metadata may be generated that is associated with the cascaded text. In another example, the cascaded text comprises a set of formatted text segments including line breaks and indents for display on a display device. In some examples, the input sentence of text may be received from a source specified by a user.

In an example of a paragraph or a collection of sentences, the text may be processed before it is provided to the constituency parser or dependency parser to split text into a list of sentences. Each sentence may be processed individually via a constituency parser and a dependency parser. In an example, the method 2400 is applied to each sentence in the text. For example, sentences may be displayed sequentially with each being cascaded separately, but in accordance with user preferences. In some examples, sentences may be grouped into paragraphs via visual cues other than indentation (e.g., background shading, specialized markers, etc.).

Figure 25:
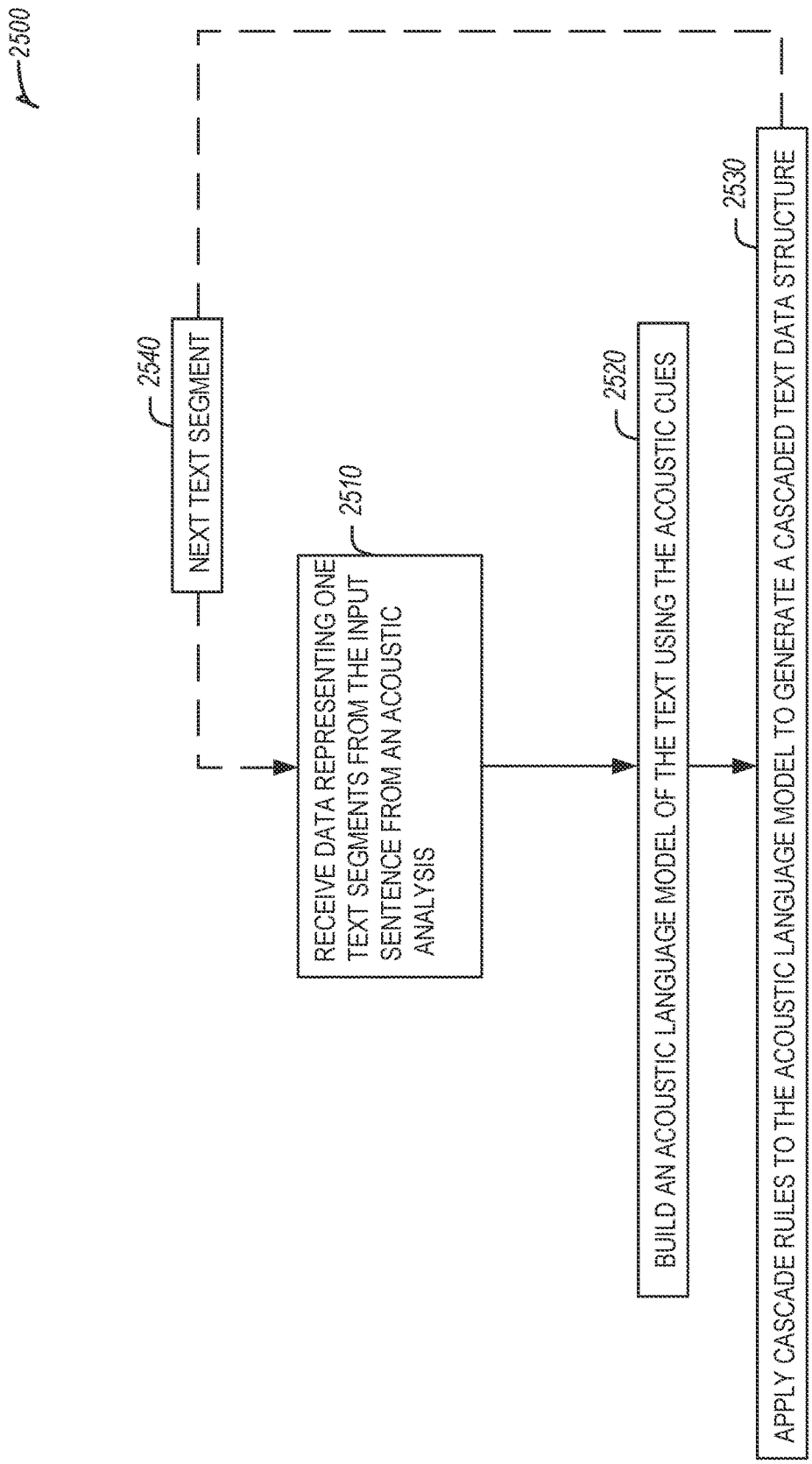
FIG. 25 illustrates a flowchart of a data processing method for text transformation for displaying sentences in a cascaded format for linguistically-driven automated text formatting, where the corresponding written text is not supplied, according to an embodiment.

FIG. 25 illustrates a flowchart of a data processing method 2500 for text transformation for displaying sentences in a cascaded format for linguistically-driven automated text formatting. The method 2500 may provide features as described in FIGS. 1 to 3, 4A to 4B, 5 to 6, 7A to 7B, and 8-23.

At operation 2510, data representing one or more text segments is received from the input sentence from an acoustic analysis (e.g., by the acoustic analyzer 1415 as described in FIG. 14, etc.) of audio of a speaker uttering the input sentence. In an example, the data includes acoustic properties derived from analysis of the utterance by the acoustic analyzer. For example, the acoustic properties may include, but are not limited to pauses, pitch, pitch intensity, pitch changes (e.g., slope, etc.), etc.

At operation 2520, an acoustic language model (e.g., the acoustic and textual language model 1530 as described in FIG. 15, etc.) may be built (e.g., by the input processor 1410 as described in FIG. 14, etc.) using the acoustic properties (e.g., as shown in FIG. 6, etc.).

At operation 2530, cascade rules may be applied (e.g., by the cascade generator 1455 as described in FIG. 14, etc.) to the acoustic language model to generate a cascaded text data structure. In an example, the cascaded text data structure comprises text and metadata specifying display parameters for the text based on the acoustic data defined in the acoustic language model. In an example, the cascade text data structure comprises a file (e.g., an extensible markup language (XML) file, etc.) organized according to a schema (e.g., an XML schema, etc.). In an example, the schema comprises a specification for components and arrangement of the components in the file. In an example, the acoustic language model may be a data structure that describes constituents and dependencies of words included in the input sentence as determined based on the acoustic properties. In an example, the acoustic language model may be a data structure including a parse tree, parts of speech, tokens, constituent chart, and dependencies for the text. In an example, the cascade rules comprise formatting rules that create line breaks and indents defined corresponding to constituents and dependencies.

In an example, metadata may be generated that is associated with the cascaded text. In another example, the cascaded text comprises a set of formatted text segments including line breaks and indents for display on a display device. In some examples, the input sentence of text may be received from a source specified by a user.

In an example, the method 2500 is applied to each sentence in the text (e.g., at operation 2540). For example, sentences may be displayed sequentially with each being cascaded separately, but in accordance with user preferences. In some examples, sentences may be grouped into paragraphs via visual cues other than indentation (e.g., background shading, specialized markers, etc.).

As noted above, different NLP services can add additional information to the Language Model from which the Cascade is generated. Cascades may be generated from all NLP services integrated together, or from individual NLP Services. The shape of the cascade will reflect the degree of linguistic specificity contained in the Language Model. The ability to use all or some of the NLP Services allows the system to maximize available information in all contexts—in particular, sometimes acoustic information is available and sometimes it will not be. Sometimes text is available (which is required by the constituency and dependency parsers) and sometimes it may not be.

The following are alternative implementations which presume dependency parse output is available:

TABLE 9

1. Identify the initial constituent in the sentence and check dependency type of the head of the constituent. If a subordinate clause, then indent word 1. If beginning of the matrix clause, then no indent.
2. Identify the smallest constituent and its associated dependency and print on a line according to the rules for that dependency. Here, 'the patient' is identified as an NP with an nsubj dependency. Print on current line.
   The patient
3. Constituency Parser identifies the next constituent. In this example "who the girl liked" is identified as an SBAR constituent with the dependency label acl:relcl, which indicates that it is a nominal modifier. The SBAR contains two XP sub-constituents, an NP and a VP. The NP holds the dependency nsubj, which triggers a line break at the beginning of the NP with indentation:
   The patient
     who the girl
4. The remaining portion of the SBAR (viz., the VP) is comprised of the 'liked'. Its acl:relcl dependency triggers a line break with indent:
   The patient
     who the girl
       liked
5. Constituency parser identifies 'was coming' as the next constituent. Dependency parser identifies 'coming' as the root associated with 'patient'. Unindent to the same level as 'the patient'.
   The patient
     who the girl
       liked
   was coming
6. Insert line break and indent before "today" because dependency parser marked the node as "obl:tmod":
   The patient
     who the girl
       liked TABLE 9-continued

```
was coming
   today
7. Append punctuation:
The patient
   who the girl
      liked
was coming
   today.
```

In another example, the cascade generator 1455 may generate cascaded output 1460 using cascade rules as shown in the following TABLE 10.

TABLE 10

```
1. Append "The patient" as no other rules applied:
The patient
2. Constituency Parser marked "who" as a "WP" part of speech. Apply a line
break and indent:
The patient
   who
3. Parser marked phrase "the girl liked" as an S, which is comprised of an NP
with an nsubj dependency and a VP with an acl:relcl dependency. Apply line
break at the end of the NP:
The patient
   who the girl
4. Since the NP is an nsubj in relation to the VP, apply linebreak with indent
under 'who the girl' and display VP
The patient
   who the girl
      liked
4. Because 'liked' is the end of the VP constituent, unindent the next word "was"
to the level of the phrase previous to the S (i.e., "The patient"):
The patient
   who the girl
      liked
was
5. Append "coming" to current line because it is in the same constituent as 'was'
(viz. under a VP):
The patient
   who the girl
      liked
was coming
6. Insert line break and indent before "today" because dependency parser
marked the node as "obl:tmod" (viz., oblique temporal modifier)
The patient
   who the girl
      liked
was coming
   today
7. Append punctuation:
The patient
   who the girl
      liked
was coming
   today.
```

Other examples of cascaded text are shown in the following TABLE 11.

TABLE 11

```
We the people
   of the United States,
      in order to
         form
            a more perfect Union,
         establish
            Justice,
         insure
            domestic Tranquility,
         provide
            for the common defense,
```

TABLE 11-continued

```
         promote
            the general Welfare,
      and
         secure
            the Blessings
               of Liberty
                  to ourselves
            and
               our Posterity,
      do ordain
   and
      establish
         this Constitution
            for the United States of America.
```

TABLE 11-continued

```
The senator
    who the report
        criticized
    referred
        to the chairman
            of the committee.
The principal
    noticed
        that the janitor
            who cleaned
                in the classroom
                    every night
            left quickly
                after the last announcement.
```

While cascading is used as an example, the systems and methods discussed herein are applicable to a variety of visual, audible, and tactile outputs that provide a user with a reduced cognitive load when engaging a text. In another example embodiment, other formatting may be used to effectuate cuing for the user to reduce cognitive load. In an example embodiment, cuing may be achieved by modification of text formatting and/or accentuation such as using colors, italics, providing video output, vibratory output, audio output (e.g., tones, etc.), and the like using parsing outputs such as constituency data and dependency data.

A further embodiment of the Constituent Cascading operation is based on a characterization of constituents, dependencies, and acoustic features within a sentence, plus any other linguistic features provided by the enlisted NLP-Services, including by way of example but not of limitation, coreference, sentiment analysis, named entity recognition, and topic tracking. In addition to cascading, the output from these parsers may be used to modify text via highlighting, color-coding, underlining, accompanying audio information, and the like to provide cognitive cues to reduce the cognitive load on the user.

In another example embodiment, the Cascading process uses the Specifier and Complement positions from an X-bar theory analysis to determine indentations, without reference to specific syntactic dependencies as given by a dependency parser. This capitalizes on the fact that specifier and complement positions do themselves specify general dependencies between constituents in the sentence. However, in an embodiment limited to 2 types of dependencies (e.g., a Specifier and Complement, etc.), the information available for cuing the linguistic structure within a sentence is more limited, producing different indentation patterns as compared to a more elaborate Dependency model. Likewise, an example embodiment in which the Cascading process uses only acoustic information to determine indentations will create cascades with fewer indentations and/or line breaks as compared to a system that uses a Dependency parser, as acoustic markers are less informative regarding the specific linguistic relationships between constituents.

In another example embodiment, the Cascading process determines indentations according to a list of particular dependencies with associated indentation amounts, which may be supplied by the user. For example, a user may prefer that direct objects be indented 4 spaces, but indirect objects will be indented only 2 spaces. In one embodiment, these user specifications are made by a teacher or tutor who may wish to emphasize particular grammatical relationships as part of an integrated lesson plan. Such specification may occur on a case-by-case basis, or for categories of dependency types. For example, a user may specify that core arguments should be indented more than non-core modifiers.

Note that the Constituent Cascading operation determines IF a constituent is indented based on its dependency type or acoustic properties; the user preferences determine how much indentation is reflected in the formatting. User preferences may additionally affect display attributes of the cascade, such as font type, font size, font color, line length, etc.

Cascade styling may be further modified, in an education setting for example, by via teacher or tutor preferences by determining that certain parts of a sentence should be temporarily hidden from view, via clickable tabs. This allows an instructor to draw attention to certain components of the cascade, or to focus on some components of a sentence vs. others. Clickable tabs may also be used in conjunction with parameters specifying the number of indentation levels to display. Such a system could be used to produce summarized sentences and/or texts.

In an example embodiment, the cascade automatically adjusts to fit constraints of the display device. For example, a computer screen may allow longer line lengths than display on a tablet or phone. If the line length is too small to allow line breaks between XPs, then line breaks will occur at X' levels, with no additional horizontal displacement. Hence, the visual cue associated with horizontal displacement is reserved to signal the beginning of a new linguistic dependency. Additional cuing (e.g., brackets, font styling, color) may be added to preserve easy identification of the constituent), Linguistic properties other than those based on constituents or dependencies may be signaled in a cascade. For example, a coreference parser may be used to identify referential relationships between words or phrases in the text such that visual cues (e.g., color, style changes, etc.) identify the antecedent of pronouns in a text. Alternative NLP Services that produce analyses that show other linguistic relationships within the text may also be incorporated into the language model used by the Cascade Generator. Examples include, but are not limited to, named entity recognition, sentiment analysis, semantic role labeling, textual entailment, topic tracking, prosodic analysis. These may be implemented either as rule-based or probabilistic inference systems. The output of these NLP Services provides information that may be used to modify display properties of the cascade in ways that emphasize linguistic relationships. These modifications may occur within sentences or between sentences and serve as cues to aid a reader or learner in maintaining coherence as s/he reads.

Figure 26:
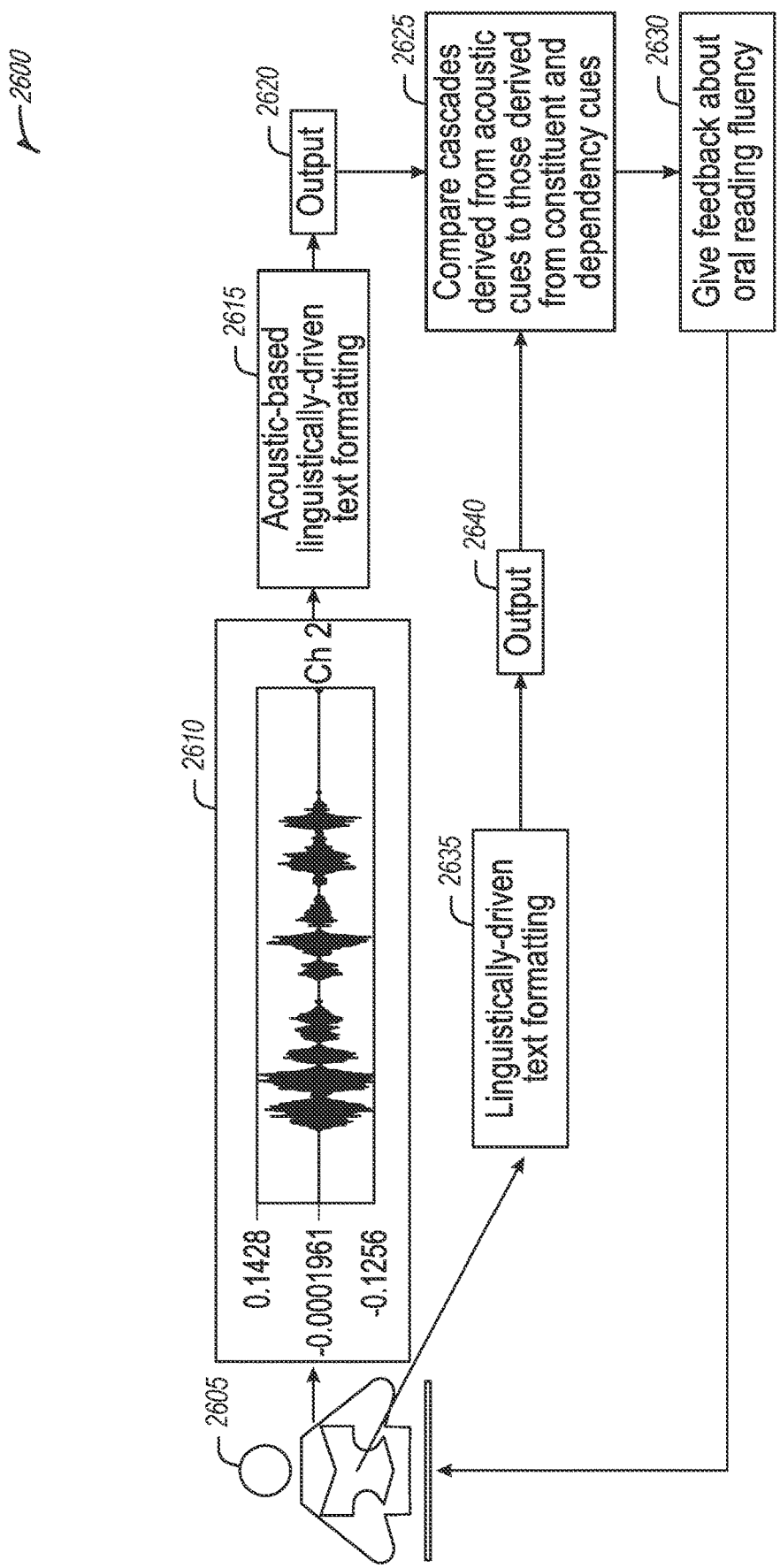
FIG. 26 illustrates a block diagram of an example of providing feedback based on linguistically-driven text formatting in response to an utterance evaluated using acoustic-based linguistically-driven text formatting, according to an embodiment.

FIG. 26 illustrates a block diagram of an example 2600 of providing feedback based on linguistically-driven text formatting 2635 in response to an utterance 2610 evaluated using acoustic-based linguistically-driven text formatting 2615, according to an embodiment. The example 2600 may provide features as described in FIGS. 1 to 3, 4A, 4B, 5, 6, 7A, 7B, and 8 to 25.

A user 2605 may make the utterance 2610 (produced by orally reading a sentence) and the utterance is evaluated using acoustic-based linguistically-driven text formatting 2615 (e.g., as described in FIG. 19, etc.) to produce cascaded text output 2620. Text of the utterance 2610 is evaluated using linguistically-driven text formatting 2635 (e.g., as described in FIG. 21, etc.) to produce cascaded output 2640. In an example, the text of the utterance may be provided by the user (i.e., of the same text that was read orally).

The cascaded output 2620 from the acoustic-based linguistically-driven text formatting 2615 is compared 2625 to the cascaded output 2640 from the linguistically-driven text formatting 2635 to provide feedback to the user regarding oral reading fluency 2630. The comparison 2625 determines acoustic properties in the utterance that resulted in incorrect constituent and dependency cues. The incorrect constituent and dependency cues lead to discrepancies between the output 2620 and the output 2640. For example, the user 2605 may place a pause in an incorrect position of the utterance 2610 resulting in incorrect identification of a constituent leading to a misplaced line break or indentation in the output 2620.

The feedback 2630 provides the user 2605 with information regarding the placement of incorrect constituent and dependency cues based on the comparison 2625. The feedback 2630 enables the user to adjust the utterance 2610 to correct the prosodic delivery of the utterance 2610. The feedback may assist non-native speakers and persons with speaking difficulties to receive feedback that assists them to identify where verbal cues are being misplaced to improve the effectiveness of oral language skills.

Figure 27:
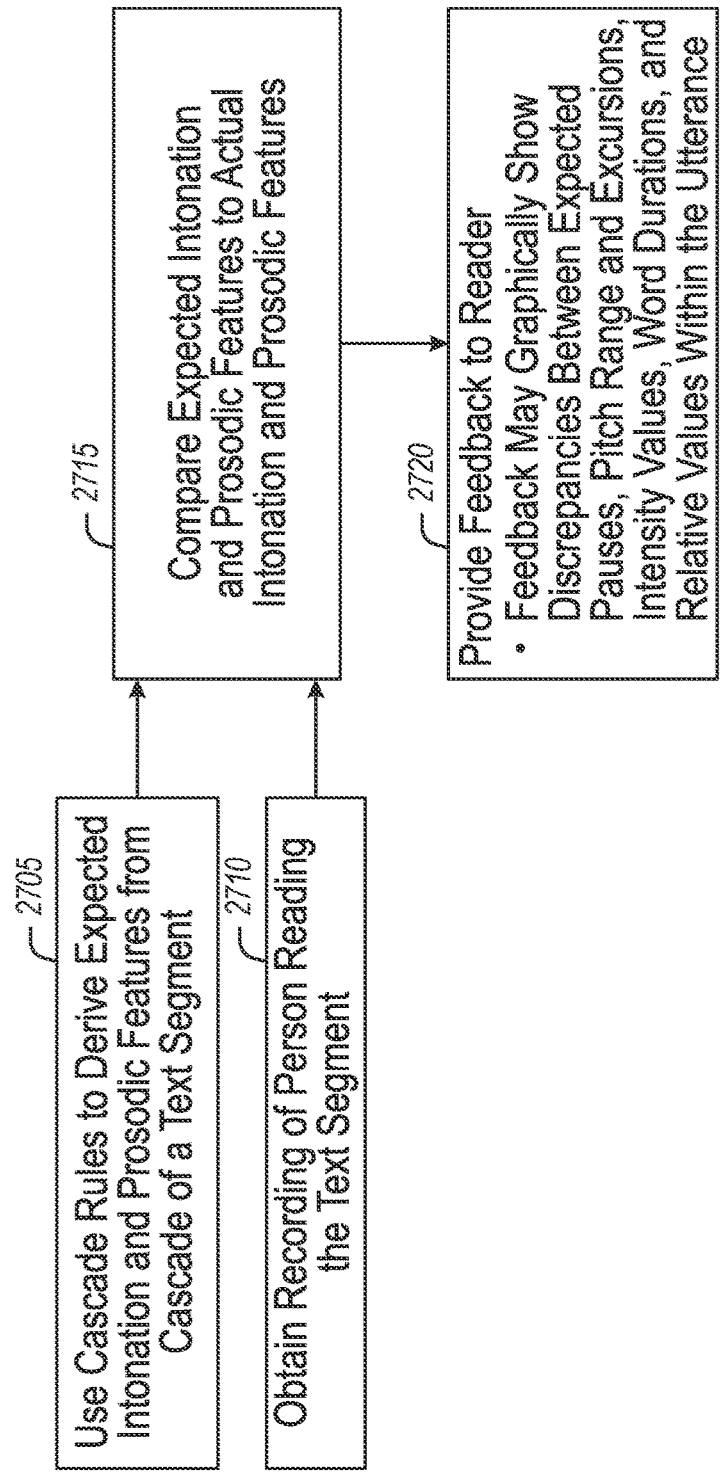
FIG. 27 illustrates a flow diagram of an example of a method for providing feedback based on linguistically-driven text formatting in response to an utterance evaluated using acoustic-based linguistically-driven text formatting, according to an embodiment.

FIG. 27 illustrates a flow diagram of an example of a method 2700 for providing feedback based on linguistically-driven text formatting in response to an utterance evaluated using acoustic-based linguistically-driven text formatting, according to an embodiment. The method 2700 may provide features as described in FIGS. 1 to 3, 4A, 4B, 5, 6, 7A, 7B, and 8 to 26.

Acoustic-based text cascade rules are used to derive an expected intonation and prosodic features from a cascade of a text segment previously generated (e.g., at operation 2705). In an example, the text segment may have been previously generated using the acoustic-based text cascade rules or may have been generated using linguistically-driven text formatting. A recording of a user reading the text segment is obtained (e.g., at operation 2710). The intonation and prosodic features are extracted from the recording and are compared to expected intonation and prosodic features (e.g., derived at operation 2705) to determine discrepancies in intonation and prosodic features between the text as spoken by the user and the expected intonation and prosodic features for the text segment (e.g., at operation 2715). Feedback is output to the user to show the discrepancies between expected acoustic properties (e.g., as derived at operation 2705) and the acoustic properties provided by the user in the spoken text of the user (e.g., obtained at operation 2710) to provide the user with an indication of errors in the verbal cues provided in the spoken text (e.g., at operation 2720).

Figure 28:
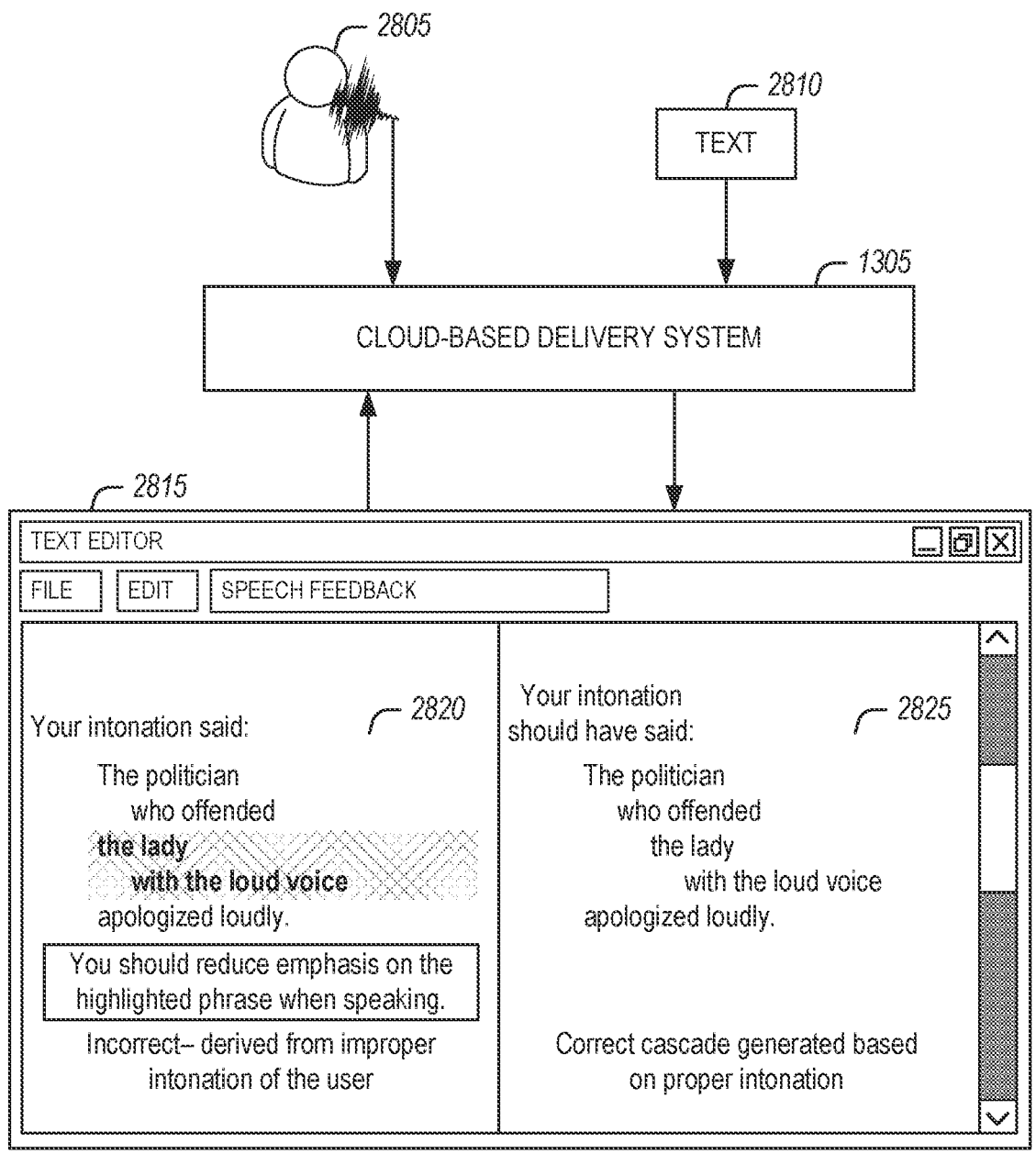
FIG. 28 illustrates an example of dual display of cascaded text for providing feedback based on linguistically-driven text formatting in response to an utterance evaluated using acoustic-based linguistically-driven text formatting, according to an embodiment.

FIG. 28 illustrates an example of dual display 2800 of cascaded text for providing feedback based on linguistically-driven text formatting in response to an utterance evaluated using acoustic-based linguistically-driven text formatting, according to an embodiment. The dual display 2800 may provide features as described in FIGS. 1 to 3, 4A, 4B, 5, 6, 7A, 7B, and 8 to 27.

Audio 2805 of a spoken portion of text 2810 and the portion of text 2810 are obtained. For example, the audio 2805 and the text may be obtained by the system 1305 as described in FIG. 13. As described above in FIGS. 26 and 27, the text is evaluated using linguistically-driven text formatting to produce an ideal cascaded output 2825 of the text. The evaluation includes identifying acoustic properties that are expected to create the cascaded text output 2825. The audio is evaluated using acoustic-based linguistically-driven text formatting to generate cascaded output 2820 for the audio 2805 of the text 2810 spoken by the user.

The cascaded text generated from the audio and generated from the text are compared to identify differences between the cascaded text. The differences may be highlighted for the user in the cascade output 2820 of the spoken text. The acoustic properties of the spoken text and the expected acoustic properties of the text may be compared to identify the acoustic properties of the spoken text that were responsible for the discrepancy. The erroneous acoustic features identified in the spoken text may be used to select feedback to be displayed to the user. The user may use the provided feedback to coach the user in the prosodic delivery of the text so that correct acoustic cues are expressed. This assists the user in adjusting speech to increase effectiveness of oral communication by delivering proper verbal cues in spoken language.

FIG. 29 illustrates an example of a method 2900 for linguistically-driven automated text formatting, according to an embodiment. The method 2900 may provide features as described in FIGS. 1 to 3, 4A to 4B, 5 to 6, 7A to 7B, and 8-28.

At operation 2905, a text portion may be obtained from an interface. In an example, the interface may be a physical keyboard, a soft keyboard, a text-to speech dictation interface, a network interface, or a disk controller interface. In an example, the text portion may be a string of text in a common format selected from the group: rich text, plain text, hypertext markup language, extensible markup language, or American Standard Code for Information Interchange.

At operation 2910, the text portion may be segmented into a plurality of dependent segments. The segmentation may be based on evaluation of the text portion using a constituency parser and a dependency parser. In an example, the constituency parser identifies complete segments that hold particular dependency roles as identified by the dependency parser.

At operation 2915, the plurality of dependent segments may be encoded according to cuing rules describing a hierarchical position of each segment. In an example, a text model of the text portion may be built using output of the constituency and dependency parsers, plus other NLP-Services, and cascade rules may be applied to the text model to generate encoded segments. In an example, the text model may be a data structure including parts of speech, lemmas, constituency chart, parse tree and a list of dependencies for each word in the text. An encoded segment may include text and metadata defining a hierarchical position for the dependent segments. In an example, the dependent segments may be segments from a sentence. In an example, the hierarchical position may correspond to an offset of the encoded segment relative to another one of the dependent segments in the user interface. In an example, the encoded segments may include line break data and indent data. In an example, segmentation of the text portion may include appending the text portion to another text portion, modifying indentation of the text portion, or inserting a line break before the text portion.

At operation 2920, the encoded plurality of dependent segments may be displayed on a user interface in accordance with user preferences. In an example, the dependent segments may be encoded using JavaScript Object Notation, extensible markup language, or American Standard Code for Information Interchange. In an example, encoding the dependent segments may include concatenating the dependent segments of several sentences to create a text composition. In an example, the combined sentences may be written to a file, communicated via cloud protocols, or displayed directly on an output device.

In an example, the encoded segments may be received. The encoded segments may be parsed to retrieve respective texts and hierarchical positions for the encoded segments and the texts may be displayed in accordance with the positions. In an example, display of the texts in accordance with the positions may include modification of offsets for portions of the texts and adjustment of line height of portions of the texts. In an example, the offsets may be from the left in a left-to-right language and from the right in a right-to-left language.

In an example, display of the texts in accordance with the positions may include appending, modification of indents, and modification of line breaks without affecting the positional arrangement of the text based on the linguistic structure.

FIG. 30 illustrates an example of a method 3000 for linguistically-driven automated text formatting, according to an embodiment. The method 3000 may provide features as described in FIGS. 1 to 3, 4A to 4B, 5 to 6, 7A to 7B, and 8-29.

The model of the text may be built (e.g., by the input processor 1410 as described in FIG. 14 etc.) from acoustic data obtained from acoustic analysis and dependency and constituency data obtained by parsing the text (e.g., at operation 3005). The cascade data structure may be generated according to cascade rules applied (e.g., by the cascade generator 1455 as described in FIG. 14, etc.) to a model (e.g., the acoustic and textual language model 1855 as described in FIG. 18, etc.) of the text (e.g., at operation 3010). Sentences of text may be displayed in response to a cascaded text data structure (e.g., at operation 3015). The data structure may specify the horizontal and vertical arrangement of the text for display.

FIG. 31 illustrates an example of a method 3100 for cascading text using a machine learning classifier for linguistically-driven automated text formatting, according to an embodiment. The method 3100 may provide features as described in FIGS. 1 to 3, 4A to 4B, 5 to 6, 7A to 7B, and 8-30.

At operation 3105, audio of a text portion is obtained from an interface. For example, a user may speak the text portion or an audio recording of an oral recitation of the text portion may be input by the user via an input device, may be obtained from a local or remote text source (e.g., a file, a publisher data source, etc.), etc. In another example, the text portion may be produced via a speech-to-text processor based on the obtained audio. At operation 3110, the audio of the text portion is processed through NLP services (e.g., NLP Services 1330 as described in FIG. 13, etc.) to obtain linguistic and acoustic encodings. For example, the text may be parsed using a variety of parsers that may include, by way of example and not limitation, a constituency parser, a dependency parser, a coreference parser, etc. to identify constituents, dependencies, coreferences, etc. In an example, the audio may be processed by an acoustic analyzer (e.g., the acoustic analyzer 1415 as described in FIG. 14. At operation 3115, a machine learning (ML) classifier is applied to the linguistic encodings and the acoustic encodings to determine a cascade (e.g., by the cascade generator 1325 as described in FIG. 13, etc.). For example, the machine learning classifier may use the information identified by the parsers (e.g., portions of the text encoded with the linguistic information identified by the parser(s), etc.) and the acoustic analyzer (e.g., acoustic properties such as pitch, pauses, pitch changes, intensity, etc.) to classify portions of the text for formatting (e.g., line breaks, indentation, etc.). At operation 3120, the cascade is displayed on a user interface in accordance with user preferences. For example, the cascade may be displayed on a screen of a computing device (e.g., standalone computer, mobile device, tablet, etc.) in an application window, web browser, text editor, etc.

Figure 32:
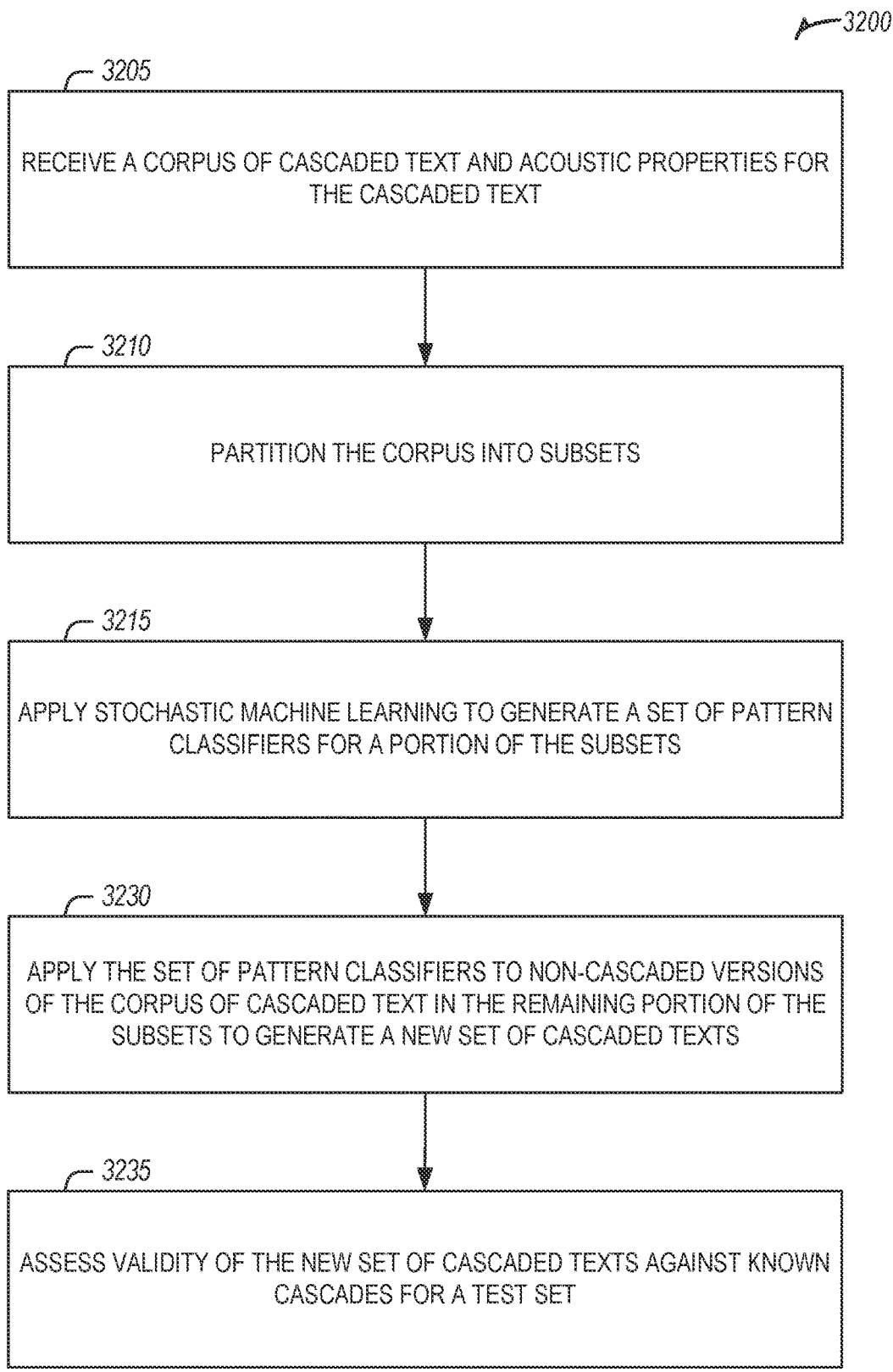
FIG. 32 illustrates a flowchart of another example method for training a machine learning classifier to cascade text for acoustic-based linguistically-driven automated text formatting, according to an embodiment.

FIG. 32 illustrates an example of a method 3000 for training a machine learning classifier to cascade text for linguistically-driven automated text formatting, according to an embodiment. The method 3200 may provide features as described in FIGS. 1 to 3, 4A to 4B, 5 to 6, 7A to 7B, and 8-31.

A machine learning service, such as machine learning service 1335 illustrated in FIG. 13, is trained with examples of cascades in order to cascade output (e.g., the output 1460 as described in FIG. 14, etc.), as an alternative to using logic and rules defined manually by human effort or via a cascade generator (e.g., the cascade generator 1455 as discussed in FIG. 14, etc.).

At operation 3205, a corpus of cascaded text and acoustic properties for the cascaded text may be obtained. The corpus is separated into a training set and a test set. At operation 3210, the corpus may be partitioned into subsets. For example, a majority portion of the corpus is designated for training and the remaining portion for validation. At operation 3215, a stochastic machine learning method (e.g., Support Vector Machines with Recursive Feature Elimination, etc.) may be applied to generate a set of pattern classifiers for a portion of the subsets (e.g., the training set, etc.). A cross-validation procedure is performed to evaluate the set of pattern classifiers by applying pattern classifiers to uncascaded examples of sentences in the test set. At operation 3220, the set of pattern classifiers may be applied to non-cascaded versions of the corpus of cascaded text in the remaining portion of the subsets to generate a new set of cascaded texts. Validity of the cascades generated by the classifier set may be assessed with respect to known cascades. At operation 3225, validity of the new set of cascaded texts may be assessed against known cascades for a test set according to accuracy, sensitivity, and specificity. For example, the corpus of cascaded text marked with acoustic properties, constituents, and dependencies serves as the training set to produce classifier functions that may be used to generate the proper cascade for a particular novel sentence (not in the training set), based on its linguistic and acoustic attributes. By way of example and not limitation, classifications may be performed using linear kernel Support Vector Machines with Recursive Feature Elimination (SVM-RFE; Guyon et al., 2002). The SVM classification algorithm (Vapnik, 1995, 1999) has been used in a wide range of applications and produces better accuracy than other methods (e.g., Asri et al., 2016; Huang et al., 2002; Black et al., 2015). SVM partitions the data into classes (e.g., cascade patterns) by identifying the optimal separation point (hyperplane) between two classes in a high dimensional feature space, such that the margin width around the hyperplane is maximized and misclassification errors are minimized. The closest cases to the hyperplane are called support vectors, and these serve as critical identifiers for distinguishing between classes. A cross-validation (CV) approach is utilized to assess the generalizability of the classification model (e.g., Arlot & Celisse, 2010; James, Witten, Hastie, and Tibshirani, 2013). This involves partitioning the data into subsets, or folds, (10 is used following convention, which is referred to as 10-fold CV), with 9 used for classifier training and the held-out set used to validate the resultant classifiers.

Cross-validation is performed using a multi-level method to validate generalizability of our classifiers across i) cases (sentences); ii) features (e.g., syntactic categories or dependencies), iii) and tuning parameters (optimization). This method protects against overfitting and avoids biased estimates of classification accuracy that may derive from using the same CV subsets to evaluate more than one aspect of the classifier simultaneously. Outcomes of each CV procedure are assessed using measures of specificity=TN/(TN+FP), sensitivity=TP/(TP+FN), and accuracy=(sensitivity+specificity)/2, where TN is the number of true negatives, FP is the number of false positives, TP is the number of true positives, FN is it the number of false negatives.

It may be understood that a variety of machine learning techniques may be used to train the classifiers to recognize cue insertion points and cue formatting using labeled or unlabeled data. Machine learning techniques that are consistent with observing and learning from the labeled data or from inherent coding based on positional structure of the training cascade corpus may be used to facilitate training of the classifiers. Thus, SVM is used as an example to further inform the training process, but it will be understood that alternative machine learning techniques with similar functionality may be used.

The process may be applied with a training set generated via alternative means and is not dependent on the cascade generator. For example, hand coded training data, etc. may be used to train ML models to generate cascaded text.

In an example, The NLP services referred to herein may use a pre-trained AI model (e.g., AMAZON® Comprehend or Stanford Parser (https://nlp.stanford.edu/software/lex-parser.shtml), GOOGLE® Natural Language, or MICROSOFT® Text Analytics, AllenNLP, Stanza, PRAAT, etc.) that may use a recurrent neural network (RNN) for text analysis. Given larger amounts of data, the RNN is able to learn a mapping from free text input to create output such as predicted entities, key phrases, parts of speech, constituent charts, acoustic properties, dependencies, etc. that may be present in the free text. In an example, additional machine learning models may be trained using key-phrase-format-rule, part-of-speech-format-rule, entity-format-rule pairs, constituency data, dependency data, acoustic properties, etc. as training data to learn to identify various parts of speech, key phrases, entities, constituencies, dependencies, acoustic properties, etc. that may then be used in future text and audio analysis operations. In another example, user preference and parts of speech, key phrase, entity pairs, constituencies, dependencies, etc. may be used to train a machine learning model to identify user preferences based on various parts of speech, key phrases, and entities. The various machine learning models may provide output based on a statistical likelihood that a given input is related to a selected output. For example an RNN including various threshold layers may be used to generate the models to filter outputs to increase the accuracy of output selection.

In an example, machine learning may be used to evaluate a corpus of cascaded text to learn cascade pattern classifiers for linguistically-driven automated text formatting and acoustic-based linguistically-driven automated text formatting. Pattern classifiers specify the actual visual cues (e.g., cascading, indentation, line breaks, color, etc.) that signal linguistic attributes contained in the text segment, according to the style of the cascade rules. In an example, the classifiers may evaluate the words, parts of speech, constituent groups or dependency labels of a text segment and produce a formatting structure consistent with the visual cues present in the cascade training set. In an example, the classifiers may evaluate the shape and display properties of the cascades in the training set directly and produce a formatting structure consistent with the visual cues present in the training set.

Figure 33:
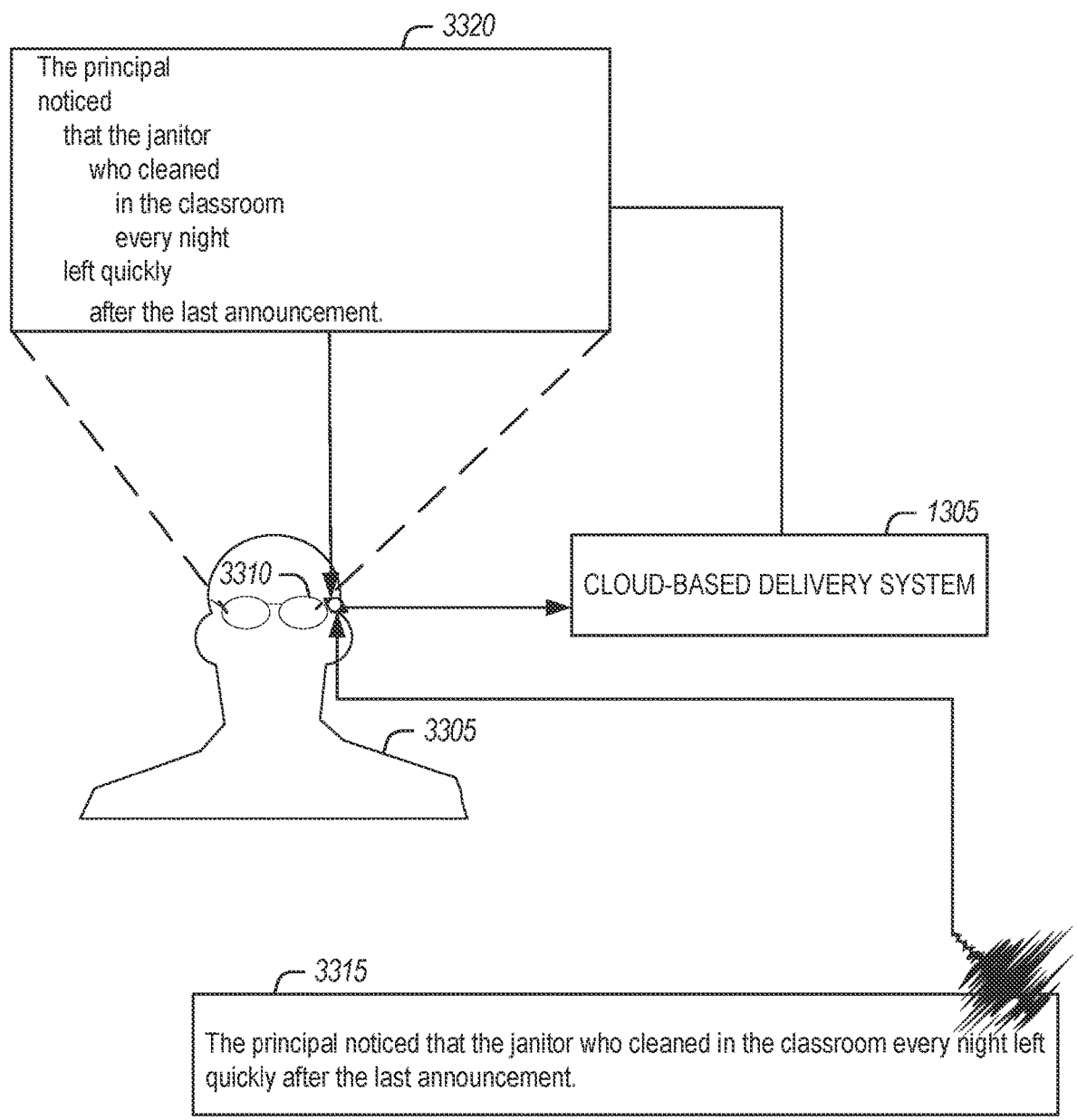
FIG. 33 illustrates an example of real-time conversion of audio to a cascade format in real-time in an eyewear device using acoustic-based linguistically-driven automated text formatting, according to an embodiment.

FIG. 33 illustrates an example 3300 of real-time conversion of audio to a cascade format in real-time in an eyewear device using acoustic-based linguistically-driven automated text formatting, according to an embodiment. The example 3300 may provide features as described in FIGS. 1 to 3, 4A to 4B, 5 to 6, 7A to 7B, and 8-32. A user 3305 may be wearing smart glasses that include an audio capture device 3310 (e.g., a microphone, etc.). The audio capture device 3310 may capture audio including spoken text 3315. The audio may be processed by an acoustic analyzer (e.g., the acoustic analyzer 1415 as described in FIG. 14, etc.) of the system 1305 to identify linguistic and acoustic attributes (e.g., part-of-speech, key phrases, constituency data, dependency data, acoustic properties, etc.) in the spoken text 3315 (e.g., to form a model 1855 as described in FIG. 18, etc.). Cascade formatting rules may be applied to a text output of the spoken text 3315 using the linguistic and acoustic attributes identified (e.g., in the model 1855, etc.) by the system 1305. The resulting cascaded output text 3320 is displayed on a display device of the smart glasses that include an imaging device 3310 for consumption by a user.

Figure 34:
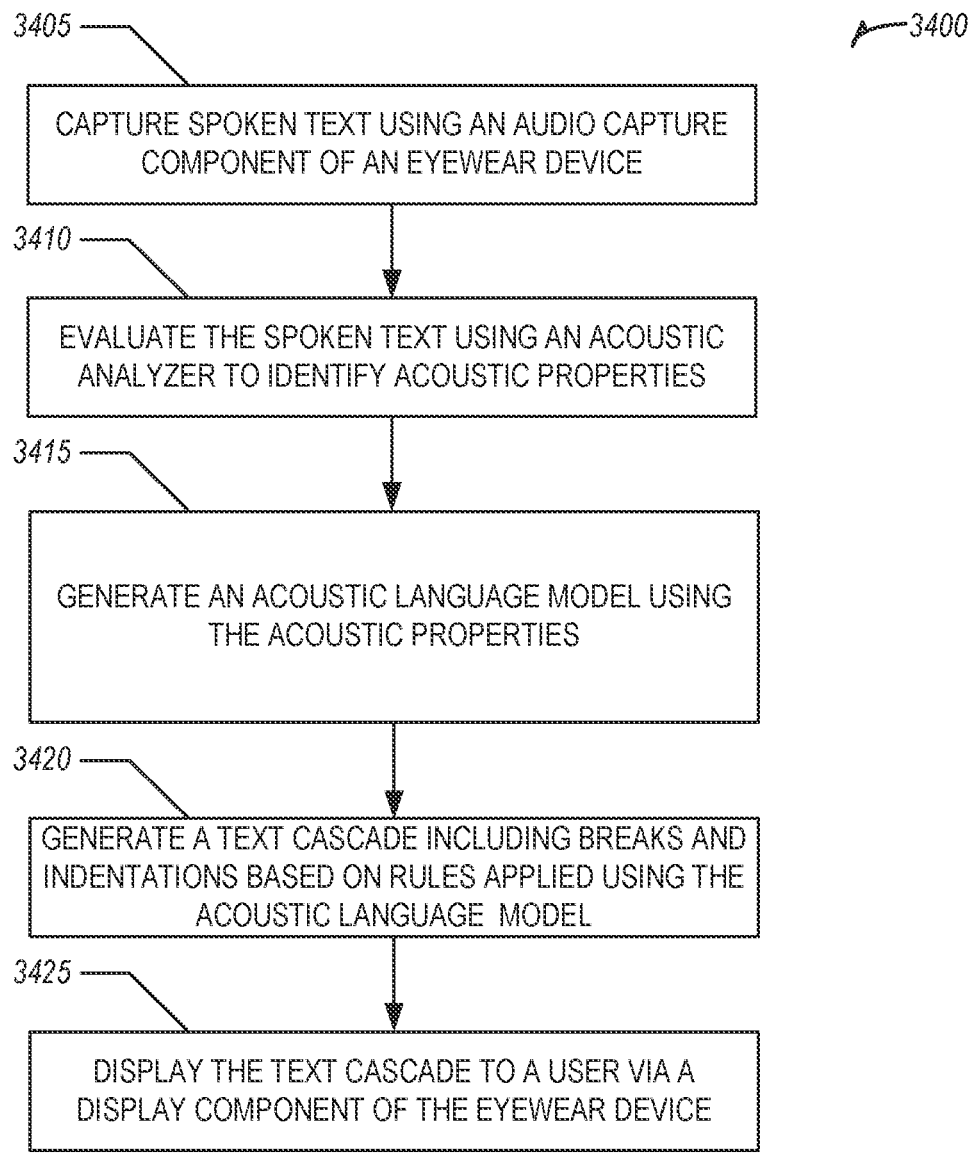
FIG. 34 illustrates a flowchart of an example method for real-time conversion of audio to a cascade format in real-time in an eyewear device using acoustic-based linguistically-driven automated text formatting, according to an embodiment.

FIG. 34 illustrates a flowchart of an example method 3400 for real-time conversion of audio to a cascade format in real-time in an eyewear device using acoustic-based linguistically-driven automated text formatting, according to an embodiment. The method 3400 may provide features as described in FIGS. 1 to 3, 4A to 4B, 5 to 6, 7A to 7B, and 8-25. At operation 3405, spoken text may be captured using an audio capture component of an eyewear device or from another source of audio. For example, a person may be speaking to a wearer of the eyewear device. In an example, the eyewear device may have memory in which the audio is stored or downloaded as a file, may have a wireless capacity whereby the audio is wirelessly acquired and then converted, etc. At operation 3410, the spoken text may be evaluated using an acoustic analyzer (e.g., the acoustic analyzer 1415 as described in FIG. 14) to identify acoustic properties of the spoken text. At operation 3415, an acoustic language model (e.g., the acoustic language model 1530 as described in FIG. 15, the acoustic and textual language model 1855 as described in FIG. 18, etc.) may be generated for the spoken text that includes, but is not limited to linguistic attributes (e.g., part-of-speech, lemma, constituency data, dependency data, coreference data, sentiment analysis, topic tracking, probabilistic inference, and prosodic structure, etc.) and acoustic properties. At operation 3420, a text cascade may be generated that includes breaks and indentations based on rules applied using the acoustic language model. In an example, the text cascade may contain sentences of text and the breaks and indentations may be applied to the sentence. In an example, the text cascade may include multiple sentences, grouped into paragraphs via visual cuing (e.g., background color, explicit markers, etc.). At operation 3425, the text cascade may be displayed to a user via a display component of the eyewear device.

Figure 35:
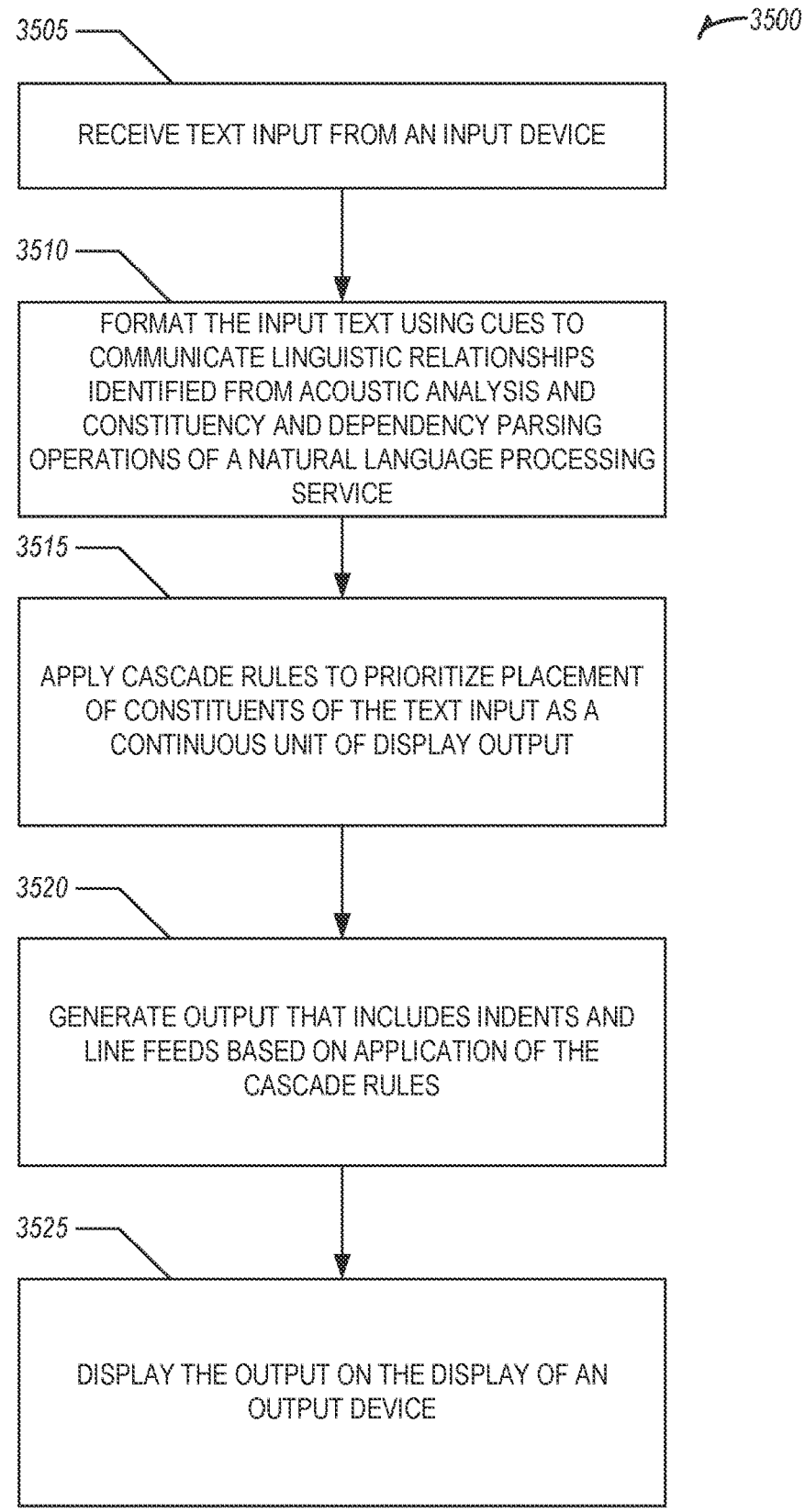
FIG. 35 illustrates a flowchart of an example method for acoustic-based linguistically-driven automated text formatting, according to an embodiment.

FIG. 35 illustrates an example of a method 3500 for linguistically-driven automated text formatting, according to an embodiment. The method 3500 may provide features as described in FIGS. 1 to 3, 4A to 4B, 5 to 6, 7A to 7B, and 8-34.

At operation 3505, text input and audio of the text may be received from an input device. At operation 3510, the input text may be formatted using cues to communicate linguistic relationships identified from acoustic analysis and constituency and dependency parsing operations of a natural language processing service.

At operation 3515, cascade rules may be applied to prioritize placement of constituents of the text input as a continuous unit of display output. For example, a display may have a limited capacity for characters on a single line. Thus, a visual indicator may be inserted if an unexpected line break is needed within a constituent to indicate the lines should be read as a single continuous element. The cascade rules may determine horizontal displacement of a constituent based on information output from an automated dependency parser and may group the constituent with other constituents based on horizontal positioning to highlight dependency relationships. An unindent may indicate completion of a constituency group. In an example, the cascade rules may further identify core arguments and non-core dependents of the input text using rules that link dependencies to constituents. These rules may indent the core arguments and the non-core dependents under a head of a linguistic phrase of the input text.

At operation 3520, output may be generated that includes indents and line feeds based on application of the cascade rules. In an example, the output may be augmented with additional linguistic feature cues provided by the natural language processing service that includes coreference information, sentiment analysis, named-entity recognition, semantic role labeling, textual entailment, topic tracking, or prosodic analysis.

At operation 3525, the output may be displayed on the display of an output device. In an example, anonymized usage data or user-specified preferences may be received, and a custom display profile may be generated that includes output display properties based on the anonymized usage data or the user-specified preferences. In an example, the output may be adjusted using the output display properties of the custom display profile. The display properties may modify display features of the output without modification of a shape of the output. In an example, the output may be generated for display on a phone, a tablet, a laptop, a monitor, a virtual reality device, or an augmented reality device. In an example, the output may be generated for display in a dual-screen format that displays a side-by-side text format, a format-while-edit format, or a cascade-and-translate format.

Figure 36:
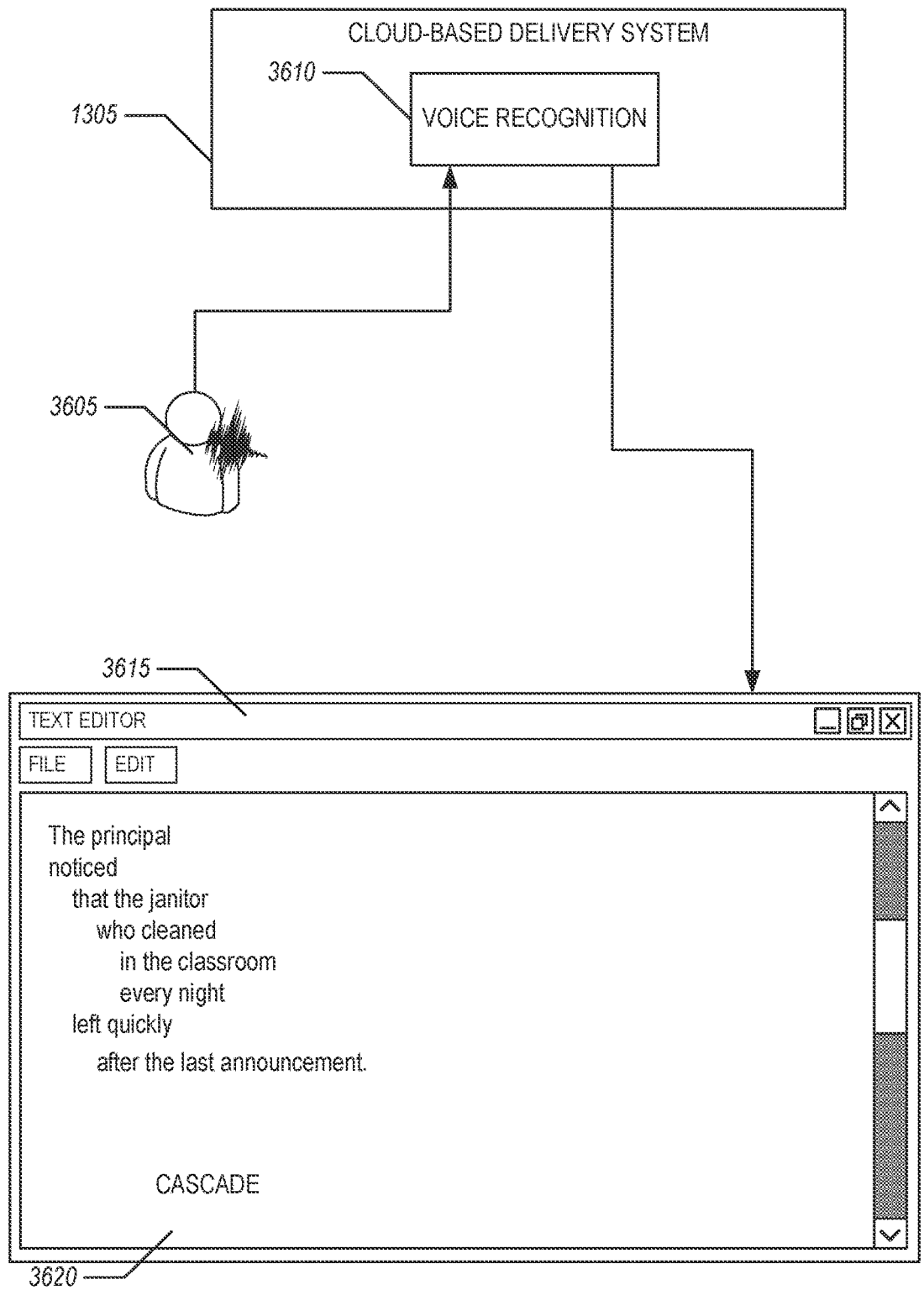
FIG. 36 illustrates an example usage of a system for acoustic-based linguistically-driven automated text formatting, according to an embodiment.

FIG. 36 illustrates an example of a system 3600 for voice-based linguistically-driven automated text formatting, according to an embodiment. The system 3600 may provide features as described in FIGS. 1 to 3, 4A to 4B, 5 to 6, 7A to 7B, and 8-35.

Voice recognition may be used to generate cascaded text for spoken language content. This may be helpful for users with hearing impairment because the content of spoken phrases may be converted to cascaded text in near real-time to be read by the user. Generating cascaded text for spoken language may also be useful for dictation or other tasks where both an auditory and written record is desired, wherein the expressive properties of speech are preserved in the written record. This is especially important because accent, intensity, or duration changes in speech carry important components of the text meaning. For example, the sentence "Tap the child with the pencil" has a different meaning when a pause is present after the word "child" vs. when it is not (e.g., in one case the child has the pencil, and in the other it is person doing the tapping who has the pencil.). Similarly, the same string of words carries a different meaning when it is pronounced as a statement (e.g., "Janey is going to the store.") vs. as a question (e.g., "Janey is going to the store?"). Stress patterns also affect meaning of specific words, such as the sound difference between the word spelled r-e-c-o-r-d when it appears as a noun (Billy loves listening to this r-e-c-o-r-d) or as a verb (Billy wants to r-e-c-o-r-d this song.). This meaning difference may affect the dependency relations between words, and hence a word's horizontal positioning in the cascade.

A speaker 3605 may speak words or phrases that may be received by a voice recognition engine 3610 of the cloud-based system 1305 to generate speech-to-text output. The speech-to-text output of the voice recognition engine 3610 may be processed by components of the cloud-based system 1305 as described above to identify constituencies and dependencies. The constituencies and dependencies may be used to determine line breaks or other formatting for the speech-to-text output to generate cascaded text 3620 for display on a graphical user interface 3615. The graphical user interface 3615 may display the cascaded text 3620 on a computing device of the speaker 3605 or another user that reads the cascaded text.

Figure 37:
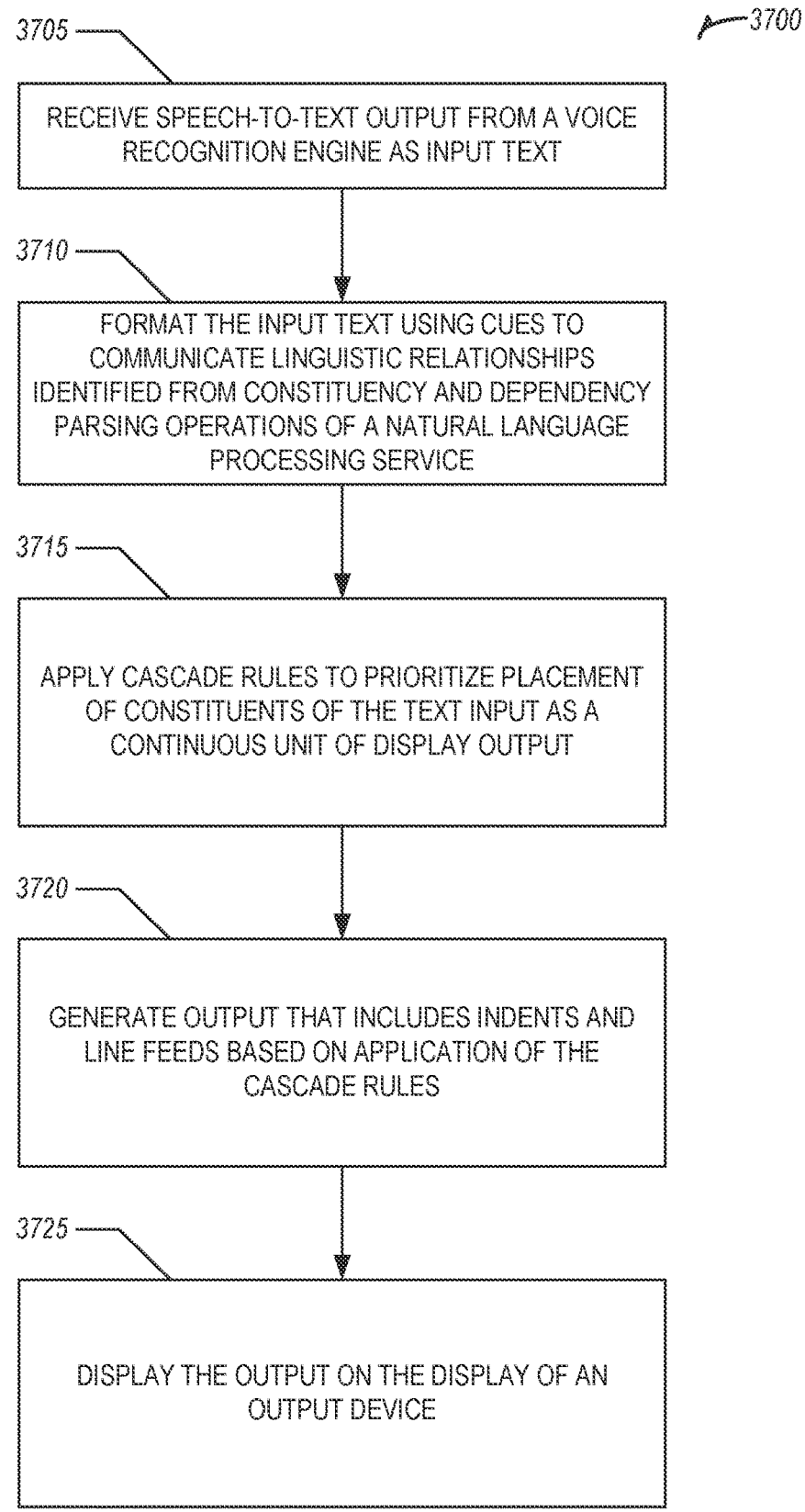
FIG. 37 illustrates a flowchart of an example method for acoustic-based linguistically-driven automated text formatting, according to an embodiment.

FIG. 37 illustrates and example of a method 3700 for voice-based linguistically-driven automated text formatting, according to an embodiment. The method 3700 may provide features as described in FIGS. 1 to 3, 4A to 4B, 5 to 6, 7A to 7B, and 8-36.

At operation 3705, speech-to-text output may be received from a voice recognition engine (e.g., the voice recognition engine 3610 as described in FIG. 36, etc.) as input text to the cloud-based delivery system (e.g., 1305). At operation 3710, the input text may be formatted using cues to communicate linguistic relationships identified from constituency and dependency parsing operations of a natural language processing service.

At operation 3715, cascade rules may be applied to prioritize placement of constituents of the text input as a continuous unit of display output. The cascade rules may determine horizontal displacement of a constituent of the constituents based on information output from an automated dependency parser and may group the constituent with other constituents based on horizontal positioning to highlight dependency relationships. An unindent may indicate completion of a constituency group. In an example, the cascade rules may further identify core arguments and non-core dependents of the input text using rules that link dependencies to constituents. These rules may indent the core arguments and the non-core dependents under a head of a linguistic phrase of the input text.

At operation 3720, output may be generated that includes indents and line feeds based on application of the cascade rules. In an example, the output may be augmented with additional linguistic feature cues provided by the natural language processing service that includes coreference information, sentiment analysis, named-entity recognition, semantic role labeling, textual entailment, topic tracking, or prosodic analysis.

At operation 3725, the output may be displayed on the display of an output device. In an example, anonymized usage data or user-specified preferences may be received, and a custom display profile may be generated that includes output display properties based on the anonymized usage data or the user-specified preferences. In an example, the output may be adjusted using the output display properties of the custom display profile. The display properties may modify display features of the output without modification of a shape of the output. In an example, the output may be generated for display on a phone, a tablet, a laptop, a monitor, a virtual reality device, or an augmented reality device. In an example, the output may be generated for display in a dual-screen format that displays a side-by-side text format, a format-while-edit format, or a cascade-and-translate format.

Figure 38:
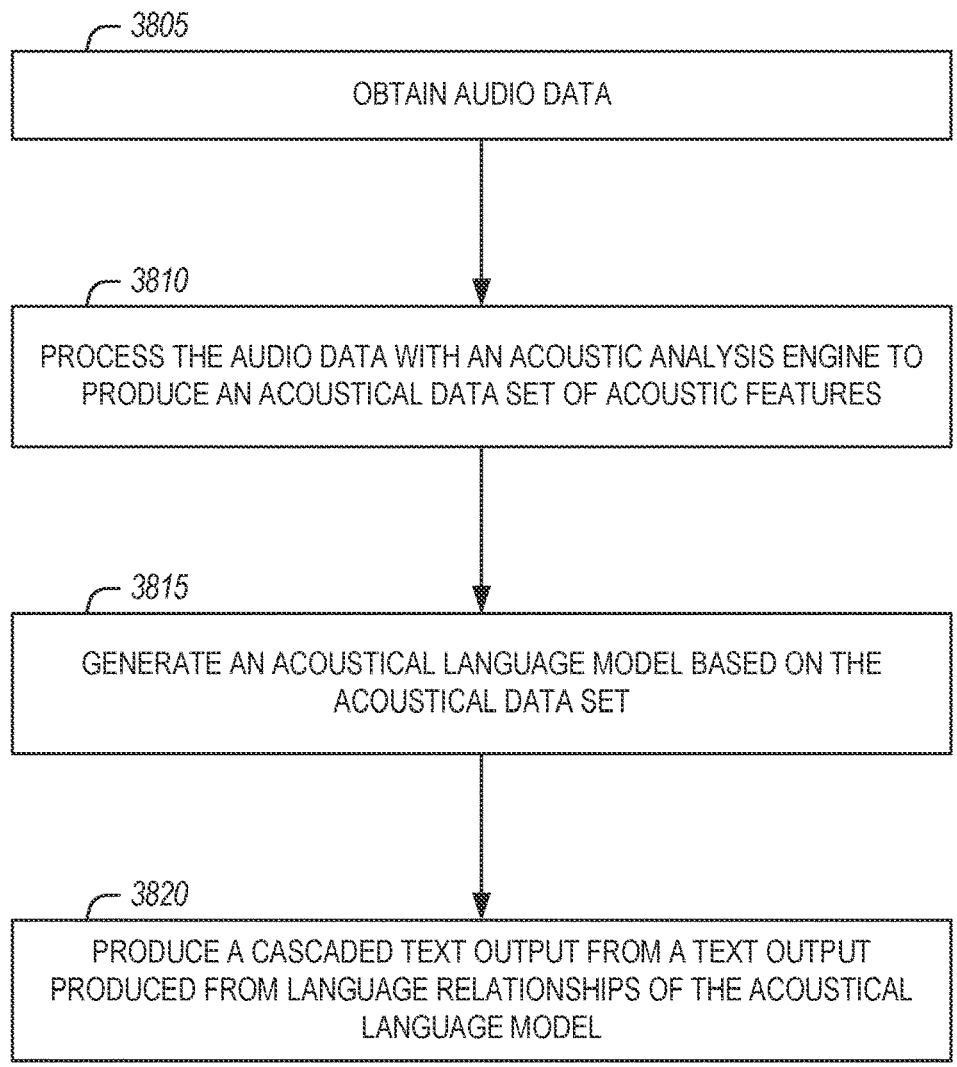
FIG. 38 illustrates a flowchart of an example method for acoustic feature extraction and linguistically-driven automated text formatting based on analysis of the acoustic features in an acoustic model, according to an embodiment.

FIG. 38 illustrates an example of a method 3800 for audio feature extraction and linguistically-driven automated text formatting based on analysis of the audio features with an acoustic model, according to an embodiment. The method 3800 may provide features as described in FIGS. 1 to 3, 4A to 4B, 5 to 6, 7A to 7B, and 8-37.

At operation 3805, audio data may be obtained that corresponds to an audio segment. In an example, the audio data may be obtained in real-time from a human.

At operation 3810, the audio data may be processed with an acoustic analysis engine to produce an acoustical data set of acoustic features of the audio segment. In an example, the acoustic analysis engine may perform feature detection and feature extraction on the audio data to produce the acoustic features. In an example, the acoustic features may be related to at least one of: pitch values, pitch change and directional slope, pitch duration and intensity, intonations, duration, intensity, or pauses.

At operation 3815, an acoustical language model may be generated based on the acoustical data set. The acoustical language model may define language relationships among the acoustic features of the audio segment. In an example, the language relationships of the acoustical language model may include constituency relationships and the constituency relationships for the text segment may be further based on the acoustic features. In another example, the language relationships of the acoustical language model may include dependency relationships and the dependency relationships for the text segment may be further based on the acoustic features.

At operation 3820, a cascaded text output may be produced from a text output produced from the language relationships of the acoustical language model. In an example, the cascaded text output may be displayed in a graphical user interface.

Figure 39:
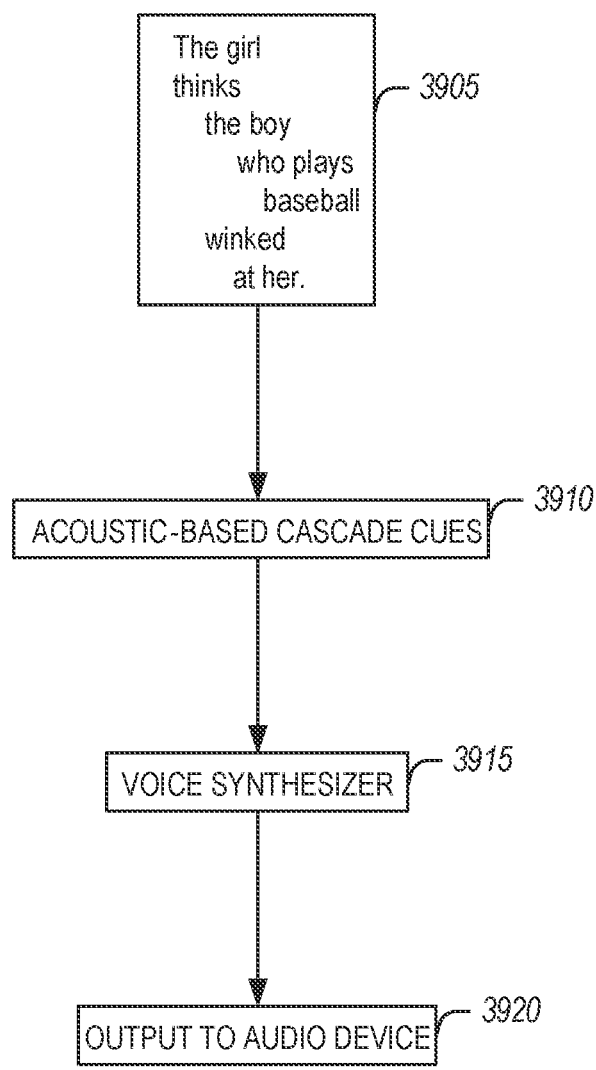
FIG. 39 illustrates an example of using voice synthesis to produce an utterance with correct prosodic phrasing based on a form of a cascade, according to an embodiment.

FIG. 39 illustrates an example 3900 of using voice synthesis to produce an utterance with correct prosodic phrasing based on a form of a cascade, according to an embodiment. The example 3900 may provide features as described in FIGS. 1 to 3, 4A to 4B, 5 to 6, 7A to 7B, and 8-38.

A text cascade is be obtained (e.g., at operation 3905) to be output by a voice synthesizer. In an example, the text cascade may include vertical horizontal formatting that illustrates linguistic relationships between words and phrases of the text in the text cascade. The text cascade is evaluated to predict acoustic properties for the text in the text cascade. For example, the acoustic properties may include pauses, pitch, pitch changes, intensity, intensity changes, etc. for portions of the text. The vertical and horizontal arrangement of the words and phrases in the text cascade informs the prediction of the acoustic properties based on linguistic relationships represented by the formatting. The linguistic relationships are correlated with acoustic properties to determine acoustic-based cascade cues for the spoken text (e.g., at operation 3910).

The acoustic-based cascade cues are embedded in output of the text provided to the voice synthesizer (e.g., at operation 3915). The voice synthesizer uses the embedded acoustic-based cascade cues to generate output instructions that alter the prosodic delivery of the text. The voice synthesizer outputs the audio output with the applied prosodic information to an audio device (e.g., at operation 3920).

Figure 40:
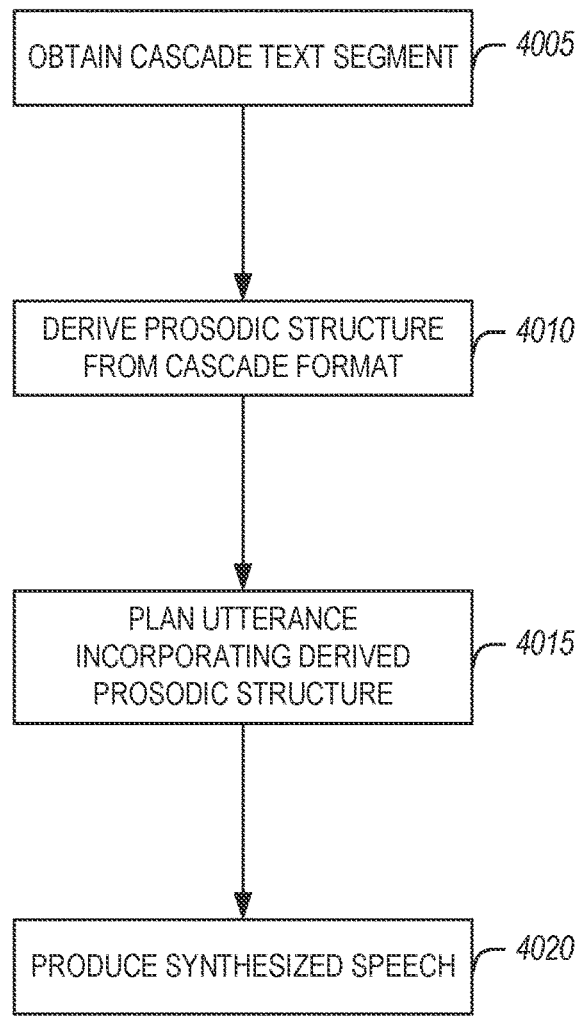
FIG. 40 illustrates a flowchart of an example method for using cascade formatted text to produce natural synthesized speech, according to an embodiment.

FIG. 40 illustrates a flowchart of an example method 4000 for using cascade formatted text to produce natural synthesized speech, according to an embodiment. The method 4000 may provide features as described in FIGS. 1 to 3, 4A to 4B, 5 to 6, 7A to 7B, and 8-39.

A cascade of a text segment is obtained (e.g., at operation 4005). A prosodic structure is derived from the cascade format (e.g., at operation 4010). In an example, the prosodic structure may be derived based on vertical and horizontal alignment of words and phrases in the cascaded text segment and relative vertical and horizontal alignment among words and phrases of the cascaded text segment. An utterance of the text segment is planned by incorporating the derived prosodic structure into the text segment (e.g., at operation 4015). The planned utterance is transmitted to a voice synthesizer and audio device to produce synthesized speech output of the text segment (e.g., at operation 4020).

Figure 41:
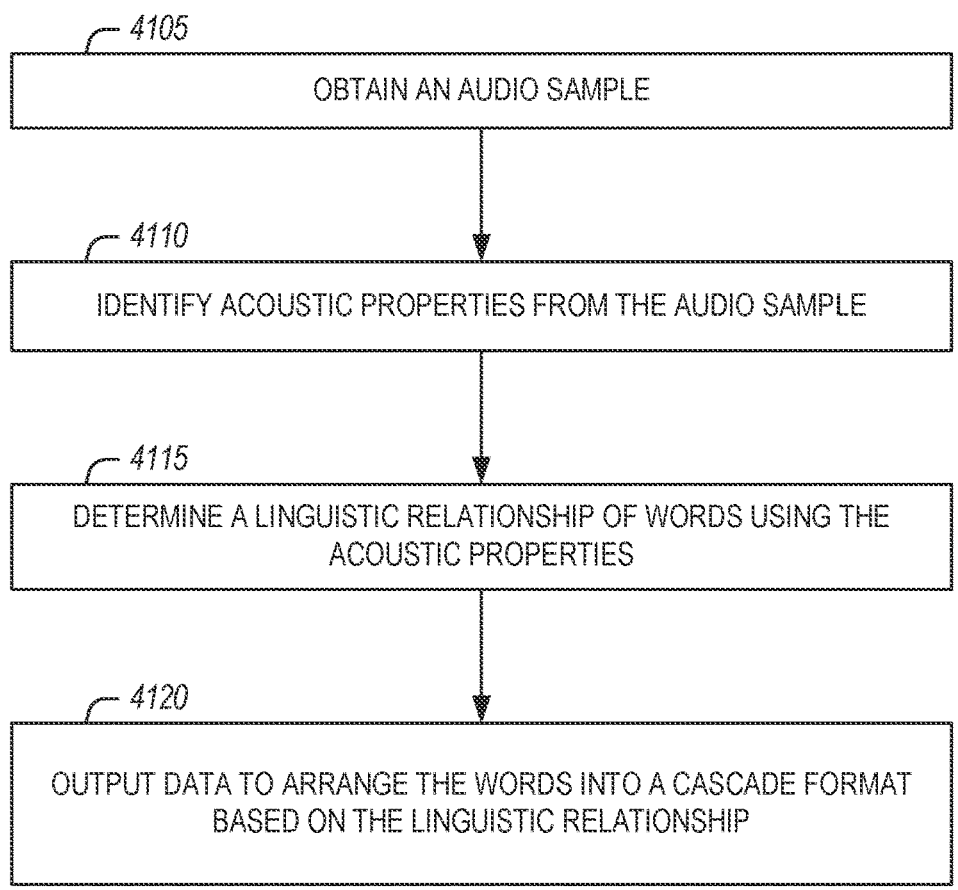
FIG. 41 illustrates a flowchart of an example method for acoustic-based linguistically-driven automated text formatting of textual output of an audio segment using merged acoustical data and linguistic data via a machine learning engine, according to an embodiment.

FIG. 41 illustrates an example of a method 4100 for acoustic-based linguistically-driven automated text formatting of textual output of an audio segment using merged acoustical data and linguistic data, according to an embodiment. The method 4100 may provide features as described in FIGS. 1 to 3, 4A to 4B, 5 to 6, 7A to 7B, and 8-40.

An audio sample is obtained that includes multiple words from human speech (e.g., at operation 4105).

Acoustic properties of the words are identified from the audio sample (e.g., at operation 4110). In an example, the acoustic properties of the words include at least one of: pitch values; intensity; duration; or pauses between the words. In an example, a respective property of the acoustic properties is used to determine constituency and dependency of respective words in at least one sentence of the words.

A linguistic relationship of the words is determined using the acoustic properties of the words from the audio sample (e.g., at operation 4115). In an example, determination of the linguistic relationship of the words includes applying at least one acoustically-defined cuing rule to respective words, based on the acoustic properties of the respective words.

Data is output to arrange the words into a cascade format based on the determined linguistic relationship (e.g., at operation 4120). In an example, the cascade format establishes horizontal displacement and vertical displacement among the multiple words.

In an example, a text sample may be obtained that includes a text string of the words. The text string may be aligned to waveforms of the audio sample and the multiple words may be identified from the audio sample based on the aligning. In an example, speech recognition may be performed on the audio sample to generate the text sample. In an example, the speech recognition identifies boundaries of multiple sentences and constituents among the words. In an example, determination of the linguistic relationship of the words may include using constituency parsing and dependency parsing of the text string. In an example, the constituency parsing generates constituency data for the text string that defines constituents of the text string based on an X-bar schema and the constituency data is used to arrange the words into the cascade format. In an example, the dependency parsing generates dependency data for the text string that defines dependencies of the text string based on sentence structure and the words are arranged into the cascade format using the dependency data.

In an example, values for pitch, slope, normalized duration, and normalized intensity may be computed for each of the words. The computed values may be derived from the acoustic properties of the words and the linguistic relationship among each of the words may be determined using the computed values for each of the words. In an example, values for pause durations between words, pitch slope changes, word elongations, and intensity changes, between at least two of the words or text segments may be computed and the linguistic relationship among each of the words or text segments may be determined using the computed values between the at least two of the words.

In an example, the relationships are encoded into a language model, which may be combined with information from additional NLP services (e.g., constituency parser, dependency parser, etc.) to create a cascade format that uses line breaks to encode constituents and indentations to encode dependency relations as described in the Language Model.

Figure 42:
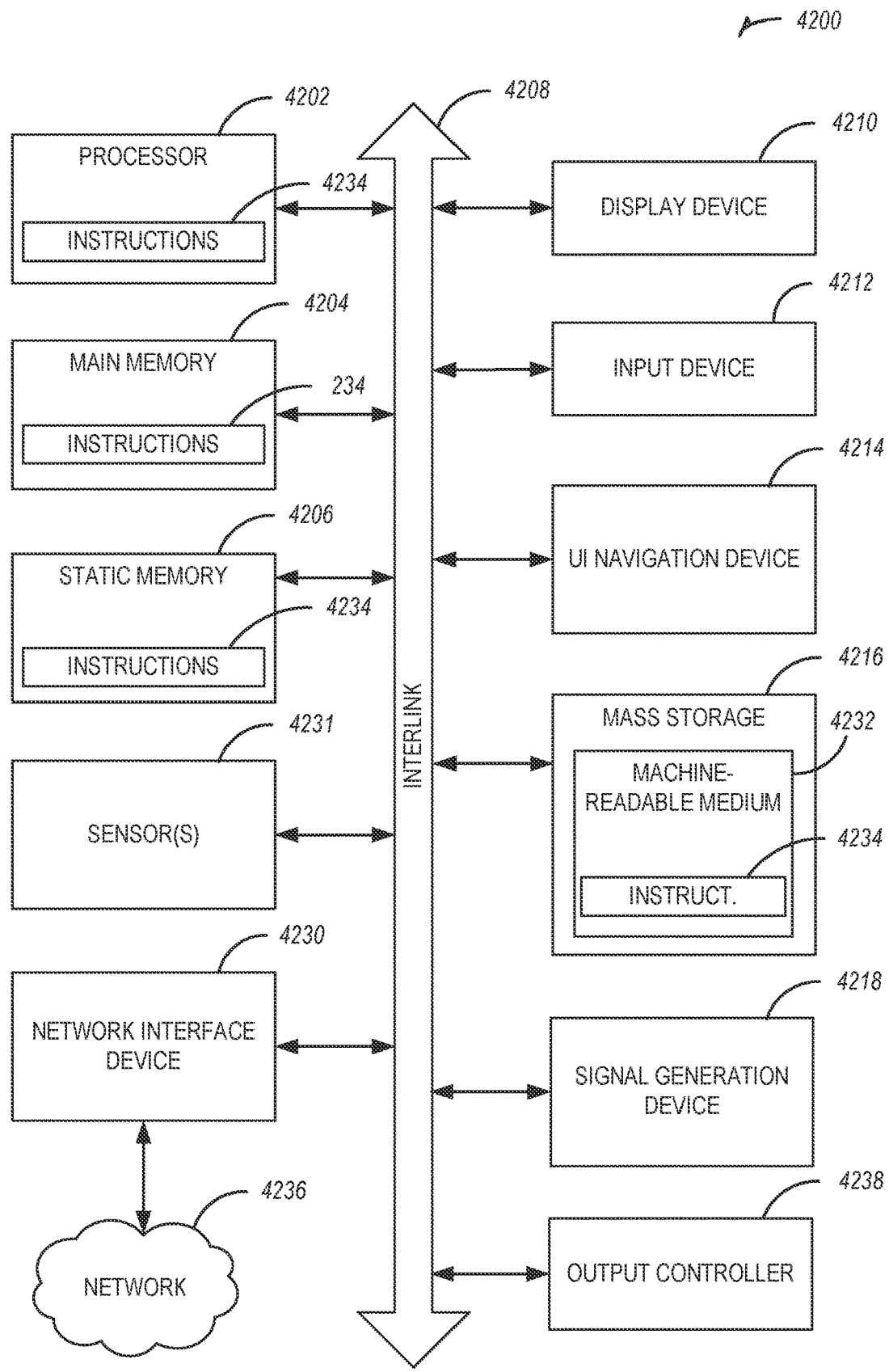
FIG. 42 is a block diagram illustrating an example of a machine upon which one or more embodiments may be implemented.

FIG. 42 illustrates a block diagram of an example machine 4200 upon which any one or more of the techniques (e.g., methodologies) discussed herein may perform. In alternative embodiments, the machine 4200 may operate as a standalone device or may be connected (e.g., networked) to other machines. In a networked deployment, the machine 4200 may operate in the capacity of a server machine, a client machine, or both in server-client network environments. In an example, the machine 4200 may act as a peer machine in a peer-to-peer (P2P) (or other distributed) network environment. The machine 4200 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 4200 may include a hardware processor 4202 (e.g., a central processing unit (CPU), a graphics processing unit (GPU), a hardware processor core, or any combination thereof), a main memory 4204 and a static memory 4206, some or all of which may communicate with each other via an interlink (e.g., bus) 4208. The machine 4200 may further include a display unit 4210, an alphanumeric input device 4212 (e.g., a keyboard), and a user interface (UI) navigation device 4214 (e.g., a mouse). In an example, the display unit 4210, input device 4212 and UI navigation device 4214 may be a touch screen display. The machine 4200 may additionally include a storage device (e.g., drive unit) 4216, a signal generation device 4218 (e.g., a speaker), a network interface device 4220, and one or more sensors 4221, such as a global positioning system (GPS) sensor, compass, accelerometer, or other sensors. The machine 4200 may include an output controller 4228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 4216 may include a machine readable medium 4222 on which is stored one or more sets of data structures or instructions 4224 (e.g., software) embodying or utilized by any one or more of the techniques or functions described herein. The instructions 4224 may also reside, completely or at least partially, within the main memory 4204, within static memory 4206, or within the hardware processor 4202 during execution thereof by the machine 4200. In an example, one or any combination of the hardware processor 4202, the main memory 4204, the static memory 4206, or the storage device 4216 may constitute machine readable media.

While the machine readable medium 4222 is illustrated as a single medium, the term "machine readable medium" may include a single medium or multiple media (e.g., a centralized or distributed database, and/or associated caches and servers) configured to store the one or more instructions 4224.

The term "machine readable medium" may include any medium that is capable of storing, encoding, or carrying instructions for execution by the machine 4200 and that cause the machine 4200 to perform any one or more of the techniques of the present disclosure, or that is capable of storing, encoding or carrying data structures used by or associated with such instructions. Non-limiting machine-readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 4224 may further be transmitted or received over a communications network 4226 using a transmission medium via the network interface device 4220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, LoRa®/LoRaWAN® LPWAN standards, etc.), IEEE 802.15.4 family of standards, peer-to-peer (P2P) networks, 3$^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 4220 may include one or more physical jacks (e.g., Ethernet, coaxial, or phone jacks) or one or more antennas to connect to the communications network 4226. In an example, the network interface device 4220 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 4200, and includes digital or analog communications signals or other intangible medium to facilitate communication of such software.

ADDITIONAL NOTES

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A method for generating a text arrangement from acoustic input, comprising:
    obtaining an audio sample that includes multiple speech segments providing words from human speech;
    identifying acoustic properties of the words from the audio sample using an acoustic analyzer provided by an audio processing service, wherein the acoustic properties are identified from an acoustic signal of the audio sample, and wherein the acoustic analyzer extracts at least one waveform from the acoustic signal;
    computing respective measurements of the acoustic properties for each of the words, using the acoustic analyzer, based on direct measurement of the acoustic signal or comparisons within the acoustic signal captured from the at least one waveform;
    generating an acoustic language model in a computer-readable data structure to represent a linguistic relationship of the words, based on the acoustic properties of the words from the audio sample, wherein the linguistic relationship of the words is determined from the respective measurements of the acoustic properties; and
    outputting data to arrange the words into a cascade format, based on the linguistic relationship, wherein the cascade format establishes horizontal displacement and vertical displacement among the words.

2. The method of claim 1, wherein the linguistic relationship of the words is determined by applying at least one acoustically-defined cuing rule to respective words, based on the acoustic properties of the respective words.

3. The method of claim 1, wherein the acoustic properties of the words include at least one of: pitch values; intensity; duration; or pauses between the words.

4. The method of claim 3, wherein a respective property of the acoustic properties is used to determine constituency and dependency of respective words in at least one sentence of the words.

5. The method of claim 1, further comprising:
obtaining a text sample that includes a text string of the words;
aligning the text string to the at least one waveform; and
identifying the words from the audio sample based on the aligning.

6. The method of claim 5, further comprising:
performing speech recognition on the audio sample to generate the text sample.

7. The method of claim 6, wherein the speech recognition identifies boundaries of multiple sentences among the words.

8. The method of claim 5, wherein the linguistic relationship of the words is determined using constituency parsing and dependency parsing of the text string.

9. The method of claim 8, wherein the constituency parsing generates constituency data for the text string that defines constituents of the text string based on an X-bar schema, and
wherein to arrange the words into the cascade format includes use of the constituency data.

10. The method of claim 8, wherein the dependency parsing generates dependency data for the text string that defines dependencies of the text string based on sentence structure, and
wherein to arrange the words into the cascade format includes use of the dependency data.

11. The method of claim 1, wherein computing the respective measurements of the acoustic properties for each of the words includes computing measurement values for pitch, slope, normalized duration, and normalized intensity for each of the words, wherein the computed measurement values are derived from the acoustic properties of the words; and
wherein the linguistic relationship among each of the words is determined using the computed measurement values for each of the words.

12. The method of claim 11, wherein computing the respective measurements of the acoustic properties for each of the words includes computing measurement values for pause durations between words, pitch slope changes, word elongations, and intensity changes, between at least two of the words; and
wherein the linguistic relationship among each of the words is determined using the computed measurement values between the at least two of the words.

13. The method of claim 1, further comprising:
displaying feedback for the audio sample, based on comparison of the cascade format to a target cascade format, the target cascade format generated from linguistically-driven text formatting.

14. The method of claim 1, further comprising:
causing a display of the words in the cascade format, wherein the horizontal displacement is provided in the display from the use of indentation, and wherein the vertical displacement is provided in the display from the use of line breaks.

15. The method of claim 1, further comprising:
generating a new audio sample, based on the cascade format, using a voice synthesis engine.

16. A non-transitory computer-readable storage medium comprising instructions, wherein the instructions, when executed by a computing device, cause the computing device to perform operations comprising:
obtaining an audio sample that includes multiple speech segments providing words from human speech;
identifying acoustic properties of the words from the audio sample using an acoustic analyzer provided by an audio processing service, wherein the acoustic properties are identified from an acoustic signal of the audio sample, and wherein the acoustic analyzer extracts at least one waveform from the acoustic signal;
computing respective measurements of the acoustic properties for each of the words, using the acoustic analyzer, based on direct measurement of the acoustic signal or comparisons within the acoustic signal captured from the at least one waveform;
generating an acoustic language model in a computer-readable data structure to represent a linguistic relationship of the words, based on the acoustic properties of the words from the audio sample, wherein the linguistic relationship of the words is determined from the respective measurements of the acoustic properties; and
outputting data to arrange the words into a cascade format, based on the linguistic relationship, wherein the cascade format establishes horizontal displacement and vertical displacement among the words.

17. The non-transitory computer-readable storage medium of claim 16, the operations further comprising:
obtaining a text sample that includes a text string of the words;
aligning the text string to the at least one waveform; and
identifying the words from the audio sample based on the aligning.

18. The non-transitory computer-readable storage medium of claim 17, the operations further comprising:
performing speech recognition on the audio sample to generate the text sample;
wherein the speech recognition identifies boundaries of multiple sentences among the words.

19. The non-transitory computer-readable storage medium of claim 17,
wherein the linguistic relationship of the words is determined using constituency parsing and dependency parsing of the text string;
wherein the constituency parsing generates constituency data for the text string that defines constituents of the text string based on an X-bar schema, and wherein to arrange the words into the cascade format includes use of the constituency data;
wherein the dependency parsing generates dependency data for the text string that defines dependencies of the text string based on sentence structure, and
wherein to arrange the words into the cascade format includes use of the dependency data.

20. The non-transitory computer-readable storage medium of claim 16, wherein computing the respective measurements of the acoustic properties for each of the words includes computing measurement values for pitch, slope, normalized duration, and normalized intensity for each of the words, wherein the computed measurement values are derived from the acoustic properties of the words;
wherein the acoustic properties of the words include at least one of: pitch values; intensity; duration; or pauses between the words; and
wherein the linguistic relationship among each of the words is determined using the computed measurement values for each of the words.

21. A device, comprising:
processing circuitry; and
a memory device including instructions embodied thereon, wherein the instructions, which when executed by the processing circuitry, configure the processing circuitry to:
- obtain an audio sample that includes multiple speech segments providing words from human speech;
- identify acoustic properties of the words from the audio sample using an acoustic analyzer provided by an audio processing service, wherein the acoustic properties are identified from least one waveform an acoustic signal of the audio sample, and wherein the acoustic analyzer extracts at least one waveform from the acoustic signal;
- compute respective measurements of the acoustic properties for each of the words, using the acoustic analyzer, based on direct measurement of the acoustic signal or comparisons within the acoustic signal captured from the at least one waveform;
- generate an acoustic language model in a computer-readable data structure to represent a linguistic relationship of the words, based on the acoustic properties of the words from the audio sample, wherein the linguistic relationship of the words is determined from the respective measurements of the acoustic properties; and
- output data to arrange the words into a cascade format, based on the linguistic relationship, wherein the cascade format establishes horizontal displacement and vertical displacement among the words.

22. The device of claim 21, wherein the instructions further configure the processing circuitry to:
- obtain a text sample that includes a text string of the words;
- align the text string to the at least one waveform; and
- identify the words from the audio sample based on the aligning.

23. The device of claim 22, wherein the instructions further configure the processing circuitry to:
- perform speech recognition on the audio sample to generate the text sample;
- wherein the speech recognition identifies boundaries of multiple sentences among the words.

24. The device of claim 22,
- wherein the linguistic relationship of the words is determined using constituency parsing and dependency parsing of the text string;
- wherein the constituency parsing generates constituency data for the text string that defines constituents of the text string based on an X-bar schema, and wherein to arrange the words into the cascade format includes use of the constituency data;
- wherein the dependency parsing generates dependency data for the text string that defines dependencies of the text string based on sentence structure, and
- wherein to arrange the words into the cascade format includes use of the dependency data.

25. The device of claim 21, wherein to compute the respective measurements of the acoustic properties for each of the words includes to compute measurement values for pitch, slope, normalized duration, and normalized intensity for each of the words, wherein the computed measurement values are derived from the acoustic properties of the words;
- wherein the acoustic properties of the words include at least one of: pitch values; intensity; duration; or pauses between the words; and
- wherein the linguistic relationship among each of the words is determined using the computed measurement values for each of the words.

* * * * *